United States Patent
Wang et al.

(10) Patent No.: US 12,538,294 B2
(45) Date of Patent: Jan. 27, 2026

(54) SOUNDING REFERENCE SIGNAL CONFIGURATION

(71) Applicant: QUALCOMM Incorporated, San Diego, CA (US)

(72) Inventors: Runxin Wang, San Diego, CA (US); Yu Zhang, San Diego, CA (US); Muhammad Sayed Khairy Abdelghaffar, San Jose, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 17/951,822

(22) Filed: Sep. 23, 2022

(65) Prior Publication Data

US 2023/0239863 A1  Jul. 27, 2023

Related U.S. Application Data

(60) Provisional application No. 63/303,436, filed on Jan. 26, 2022.

(51) Int. Cl.
  *H04W 72/1263* (2023.01)
  *H04L 5/00* (2006.01)
  *H04L 27/26* (2006.01)

(52) U.S. Cl.
  CPC ....... *H04W 72/1263* (2013.01); *H04L 5/0051* (2013.01); *H04L 27/2605* (2013.01)

(58) Field of Classification Search
  CPC ............. H04W 72/1263; H04L 5/0051; H04L 27/2605; H04L 5/0048; H04L 25/0224;
  (Continued)

(56) References Cited

U.S. PATENT DOCUMENTS

| | | |
|---|---|---|
| 2012/0014349 A1 | 1/2012 | Chung et al. |
| 2022/0166583 A1 | 5/2022 | Si et al. |

(Continued)

FOREIGN PATENT DOCUMENTS

| | | |
|---|---|---|
| EP | 3591881 A1 | 1/2020 |
| WO | 2021027513 A1 | 2/2021 |

(Continued)

OTHER PUBLICATIONS

International Search Report and Written Opinion—PCT/US2022/053728—ISA/EPO—Jul. 4, 2023.

(Continued)

*Primary Examiner* — Chae S Lee

(74) *Attorney, Agent, or Firm* — Loza & Loza, LLP

(57) ABSTRACT

Aspects relate to transmission of a sounding reference signal (SRS). A scheduling entity such as a base station may configure the transmission of an SRS by a scheduled entity such as a user equipment (UE). In some aspects, this configuration may be based on the number of antenna ports that the UE will use to transmit the SRS. For example, the scheduling entity may specify that the scheduled entity is to use a first table or a second table to map transmission combs to the maximum number of cyclic shifts. In some aspects, the selection of the first table or the second table may be based on the number of antenna ports that the scheduled entity will use to transmit the SRS.

26 Claims, 23 Drawing Sheets

(58) Field of Classification Search
CPC ............... H04L 27/261; H04L 5/0094; H04L 27/26134; H04L 5/0023
See application file for complete search history.

(56) References Cited

U.S. PATENT DOCUMENTS

| | | | | |
|---|---|---|---|---|
| 2022/0174613 A1* | 6/2022 | Liu | ..................... | H04W 52/242 |
| 2023/0300016 A1* | 9/2023 | Cai | ....................... | H04L 5/0007 |
| 2024/0372667 A1* | 11/2024 | Jacobsson | ............. | H04L 5/0051 |
| 2024/0380549 A1* | 11/2024 | Zheng | ................. | H04L 27/2613 |
| 2025/0125927 A1* | 4/2025 | Nilsson | ................. | H04L 5/0094 |

FOREIGN PATENT DOCUMENTS

| | | |
|---|---|---|
| WO | 2021034250 A1 | 2/2021 |
| WO | WO-2023011613 A1 * | 2/2023 |

OTHER PUBLICATIONS

Ericsson: "Finalizing SRS", 3GPP TSG-RAN WG1 Meeting #107bis-e, R1-2110947, 3rd Generation Partnership Project (3GPP), Mobile Competence Centre, 650, Route Des Lucioles, F-06921, Sophia-Antipolis Cedex, France, vol. RAN WG1, No. eMeeting, Nov. 11, 2021-Nov. 19, 2021, Nov. 5, 2021, pp. 1-12, XP052074090, p. 1-6.
Ericsson: "Potential Positioning Enhancements", [Online] 3GPP Draft, 3GPP TSG-RAN WG1 Meeting #102-e, R1-2006916, 3rd Generation Partnership Project (3GPP), Mobile Competence Centre, 650, Route Des Lucioles, F-06921 Sophia-Antipolis Cedex, France, Aug. 7, 2020 (Aug. 7, 2020), XP051915537, 33 Pages, Section 2.3.4.3, Table 1 and Table 2, p. 9, p. 19-23.
MCC Support: "Draft Report of 3GPP TSG RAN WG1 #102-e V0.1.0 (Online Meeting, Aug. 17-28, 2020)", 3GPP Draft, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Sep. 10, 2020, pp. 1-198, XP051934139, p. 138-139.
Partial International Search Report—PCT/US2022/053728—ISA/EPO—May 8, 2023.

* cited by examiner

SOUNDING REFERENCE SIGNAL CONFIGURATION
===

CROSS-REFERENCE TO RELATED APPLICATIONS
---

The present application for patent claims priority to and the benefit of U.S. Provisional Application No. 63/303,436, titled "SOUNDING REFERENCE SIGNAL CONFIGURATION" filed Jan. 26, 2022, and assigned to the assignee hereof and hereby expressly incorporated by reference herein as if fully set forth below in its entirety and for all applicable purposes.

TECHNICAL FIELD
---

The technology discussed below relates generally to wireless communication and, more particularly, to configuring a sounding reference signal.

INTRODUCTION
---

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station. A base station may schedule access to a cell to support access by multiple UEs. For example, a base station may allocate different resources (e.g., time domain and frequency domain resources) for different UEs operating within a cell of the base station.

A UE may transmit reference signals to a base station. For example, a UE may generate a sounding reference signal (SRS) based on a known sequence and transmit the SRS on resources allocated by the base station. The base station may then estimate the quality of an uplink channel from the UE based on the SRS and/or determine other information based on the SRS. The base station may use this channel estimate or other information to, for example, more efficiently allocate resources and/or specify transmission parameters for communication over one or more channels.

BRIEF SUMMARY OF SOME EXAMPLES
---

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a scheduled entity may include a transceiver, a memory, and a processor coupled to the transceiver and the memory. The processor and the memory may be configured to receive a sounding reference signal configuration via the transceiver, the sounding reference signal configuration indicating whether the scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. The processor and the memory may also be configured to transmit the sounding reference signal transmission via the transceiver based on the sounding reference signal configuration.

In some examples, a method for wireless communication at a scheduled entity is disclosed. The method may include receiving a sounding reference signal configuration, the sounding reference signal configuration indicating whether the scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. The method may also include transmitting the sounding reference signal transmission based on the sounding reference signal configuration.

In some examples, a scheduled entity may include means for receiving a sounding reference signal configuration, the sounding reference signal configuration indicating whether the scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. The scheduled entity may also include means for transmitting the sounding reference signal transmission based on the sounding reference signal configuration.

In some examples, an article of manufacture for use by a scheduled entity includes a non-transitory computer-readable medium having stored therein instructions executable by one or more processors of the scheduled entity to receive a sounding reference signal configuration, the sounding reference signal configuration indicating whether the scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. The computer-readable medium may also have stored therein instructions executable by one or more processors of the scheduled entity to transmit the sounding reference signal transmission based on the sounding reference signal configuration.

In some examples, a scheduling entity may include a transceiver, a memory, and a processor coupled to the transceiver and the memory. The processor and the memory may be configured to transmit a sounding reference signal configuration via the transceiver, the sounding reference signal configuration indicating whether a scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. The processor and the memory may also be configured to receive the sounding reference signal transmission via the transceiver based on the sounding reference signal configuration.

In some examples, a method for wireless communication at a scheduling entity is disclosed. The method may include transmitting a sounding reference signal configuration, the sounding reference signal configuration indicating whether a scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. The method may also include receiving the sounding reference signal transmission based on the sounding reference signal configuration.

In some examples, a scheduling entity may include means for transmitting a sounding reference signal configuration, the sounding reference signal configuration indicating whether a scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. The scheduling entity may also include means for receiving the sounding reference signal transmission based on the sounding reference signal configuration.

In some examples, an article of manufacture for use by a scheduling entity includes a non-transitory computer-readable medium having stored therein instructions executable by one or more processors of the scheduling entity to transmit a sounding reference signal configuration, the sounding reference signal configuration indicating whether a scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. The computer-readable medium may also have stored therein instructions executable by one or more processors of the scheduling entity to receive the sounding reference signal transmission based on the sounding reference signal configuration.

In some examples, a scheduled entity may include a transceiver, a memory, and a processor coupled to the transceiver and the memory. The processor and the memory may be configured to receive a sounding reference signal configuration via the transceiver, the sounding reference signal configuration indicating whether the scheduled entity is to code division multiplex three (3), six (6), or eight (8) antenna port signals on at least one sounding reference signal transmission comb resource. The processor and the memory may also be configured to transmit a sounding reference signal transmission via the transceiver based on the sounding reference signal configuration.

In some examples, a method for wireless communication at a scheduled entity is disclosed. The method may include receiving a sounding reference signal configuration, the sounding reference signal configuration indicating whether the scheduled entity is to code division multiplex three (3), six (6), or eight (8) antenna port signals on at least one sounding reference signal transmission comb resource. The method may also include transmitting a sounding reference signal transmission based on the sounding reference signal configuration.

In some examples, a scheduled entity may include means for receiving a sounding reference signal configuration via the transceiver, the sounding reference signal configuration indicating whether the scheduled entity is to code division multiplex three (3), six (6), or eight (8) antenna port signals on at least one sounding reference signal transmission comb resource. The scheduled entity may also include means for transmitting a sounding reference signal transmission via the transceiver based on the sounding reference signal configuration.

In some examples, an article of manufacture for use by a scheduled entity includes a non-transitory computer-readable medium having stored therein instructions executable by one or more processors of the scheduled entity to receive a sounding reference signal configuration, the sounding reference signal configuration indicating whether the scheduled entity is to code division multiplex three (3), six (6), or eight (8) antenna port signals on at least one sounding reference signal transmission comb resource. The computer-readable medium may also have stored therein instructions executable by one or more processors of the scheduled entity to transmit a sounding reference signal transmission based on the sounding reference signal configuration.

In some examples, a scheduling entity may include a transceiver, a memory, and a processor coupled to the transceiver and the memory. The processor and the memory may be configured to transmit a sounding reference signal configuration via the transceiver, the sounding reference signal configuration indicating whether a scheduled entity is to code division multiplex three (3), six (6), or eight (8) antenna port signals on at least one sounding reference signal transmission comb resource. The processor and the memory may also be configured to receive a sounding reference signal transmission via the transceiver based on the sounding reference signal configuration.

In some examples, a method for wireless communication at a scheduling entity is disclosed. The method may include transmitting a sounding reference signal configuration, the sounding reference signal configuration indicating whether a scheduled entity is to code division multiplex three (3), six (6), or eight (8) antenna port signals on at least one sounding reference signal transmission comb resource. The method may also include receiving a sounding reference signal transmission based on the sounding reference signal configuration.

In some examples, a scheduling entity may include means for transmitting a sounding reference signal configuration, the sounding reference signal configuration indicating whether a scheduled entity is to code division multiplex three (3), six (6), or eight (8) antenna port signals on at least one sounding reference signal transmission comb resource. The scheduling entity may also include means for receiving a sounding reference signal transmission based on the sounding reference signal configuration.

In some examples, an article of manufacture for use by a scheduling entity includes a non-transitory computer-readable medium having stored therein instructions executable by one or more processors of the scheduling entity to transmit a sounding reference signal configuration, the sounding reference signal configuration indicating whether a scheduled entity is to code division multiplex three (3), six (6), or eight (8) antenna port signals on at least one sounding reference signal transmission comb resource. The computer-readable medium may also have stored therein instructions executable by one or more processors of the scheduling entity to receive a sounding reference signal transmission based on the sounding reference signal configuration.

In some examples, a scheduled entity may include a transceiver, a memory, and a processor coupled to the transceiver and the memory. The processor and the memory may be configured to receive a sounding reference signal configuration via the transceiver, the sounding reference signal configuration indicating one sounding reference signal resource of a plurality of sounding reference signal resources that is mapped to a first antenna port. The processor and the memory may also be configured to transmit a sounding reference signal transmission via the transceiver based on the sounding reference signal configuration.

In some examples, a method for wireless communication at a scheduled entity is disclosed. The method may include receiving a sounding reference signal configuration, the sounding reference signal configuration indicating one sounding reference signal resource of a plurality of sounding reference signal resources that is mapped to a first antenna port. The method may also include transmitting a sounding reference signal transmission based on the sounding reference signal configuration.

In some examples, a scheduled entity may include means for receiving a sounding reference signal configuration, the sounding reference signal configuration indicating one sounding reference signal resource of a plurality of sounding reference signal resources that is mapped to a first antenna port. The scheduled entity may also include means for transmitting a sounding reference signal transmission based on the sounding reference signal configuration.

In some examples, an article of manufacture for use by a scheduled entity includes a non-transitory computer-readable medium having stored therein instructions executable by one or more processors of the scheduled entity to receive a sounding reference signal configuration, the sounding reference signal configuration indicating one sounding reference signal resource of a plurality of sounding reference signal resources that is mapped to a first antenna port. The computer-readable medium may also have stored therein instructions executable by one or more processors of the scheduled entity to transmit a sounding reference signal transmission based on the sounding reference signal configuration.

In some examples, a scheduling entity may include a transceiver, a memory, and a processor coupled to the transceiver and the memory. The processor and the memory may be configured to transmit a sounding reference signal configuration via the transceiver, the sounding reference signal configuration indicating one sounding reference signal resource of a plurality of sounding reference signal resources that is mapped to a first antenna port. The processor and the memory may also be configured to receive a sounding reference signal transmission via the transceiver based on the sounding reference signal configuration.

In some examples, a method for wireless communication at a scheduling entity is disclosed. The method may include transmitting a sounding reference signal configuration, the sounding reference signal configuration indicating one sounding reference signal resource of a plurality of sounding reference signal resources that is mapped to a first antenna port. The method may also include receiving a sounding reference signal transmission based on the sounding reference signal configuration.

In some examples, a scheduling entity may include means for transmitting a sounding reference signal configuration, the sounding reference signal configuration indicating one sounding reference signal resource of a plurality of sounding reference signal resources that is mapped to a first antenna port. The scheduling entity may also include means for receiving a sounding reference signal transmission based on the sounding reference signal configuration.

In some examples, an article of manufacture for use by a scheduling entity includes a non-transitory computer-readable medium having stored therein instructions executable by one or more processors of the scheduling entity to transmit a sounding reference signal configuration, the sounding reference signal configuration indicating one sounding reference signal resource of a plurality of sounding reference signal resources that is mapped to a first antenna port. The computer-readable medium may also have stored therein instructions executable by one or more processors of the scheduling entity to receive a sounding reference signal transmission based on the sounding reference signal configuration.

In some examples, a scheduled entity may include a transceiver, a memory, and a processor coupled to the transceiver and the memory. The processor and the memory may be configured to receive a sounding reference signal configuration via the transceiver, the sounding reference signal configuration including a restricted set of sounding reference signal resource indicators. The processor and the memory may also be configured to transmit a sounding reference signal transmission via the transceiver based on the sounding reference signal configuration.

In some examples, a method for wireless communication at a scheduled entity is disclosed. The method may include receiving a sounding reference signal configuration, the sounding reference signal configuration including a restricted set of sounding reference signal resource indicators. The method may also include transmitting a sounding reference signal transmission based on the sounding reference signal configuration.

In some examples, a scheduled entity may include means for receiving a sounding reference signal configuration, the sounding reference signal configuration including a restricted set of sounding reference signal resource indicators. The scheduled entity may also include means for transmitting a sounding reference signal transmission based on the sounding reference signal configuration.

In some examples, an article of manufacture for use by a scheduled entity includes a non-transitory computer-readable medium having stored therein instructions executable by one or more processors of the scheduled entity to receive a sounding reference signal configuration, the sounding reference signal configuration including a restricted set of sounding reference signal resource indicators. The computer-readable medium may also have stored therein instructions executable by one or more processors of the scheduled entity to transmit a sounding reference signal transmission based on the sounding reference signal configuration.

In some examples, a scheduling entity may include a transceiver, a memory, and a processor coupled to the transceiver and the memory. The processor and the memory may be configured to transmit a sounding reference signal configuration via the transceiver, the sounding reference signal configuration including a restricted set of sounding reference signal resource indicators. The processor and the memory may also be configured to receive a sounding reference signal transmission via the transceiver based on the sounding reference signal configuration.

In some examples, a method for wireless communication at a scheduling entity is disclosed. The method may include transmitting a sounding reference signal configuration, the sounding reference signal configuration including a restricted set of sounding reference signal resource indicators. The method may also include receiving a sounding reference signal transmission based on the sounding reference signal configuration.

In some examples, a scheduling entity may include means for transmitting a sounding reference signal configuration, the sounding reference signal configuration including a restricted set of sounding reference signal resource indicators. The scheduling entity may also include means for receiving a sounding reference signal transmission based on the sounding reference signal configuration.

In some examples, an article of manufacture for use by a scheduling entity includes a non-transitory computer-readable medium having stored therein instructions executable by one or more processors of the scheduling entity to transmit a sounding reference signal configuration, the sounding reference signal configuration including a restricted set of sounding reference signal resource indicators. The computer-readable medium may also have stored therein instructions executable by one or more processors of the scheduling entity to receive a sounding reference signal transmission based on the sounding reference signal configuration.

In some examples, a scheduled entity may include a transceiver, a memory, and a processor coupled to the transceiver and the memory. The processor and the memory may be configured to receive a sounding reference signal configuration for a codebook-based sounding reference signal via the transceiver, the sounding reference signal configuration including sounding reference signal resource indicator values for six (6) antenna ports or eight (8) antenna ports. The processor and the memory may also be configured to transmit a sounding reference signal transmission via the transceiver based on the sounding reference signal configuration.

In some examples, a method for wireless communication at a scheduled entity is disclosed. The method may include receiving a sounding reference signal configuration for a codebook-based sounding reference signal, the sounding reference signal configuration including sounding reference signal resource indicator values for six (6) antenna ports or eight (8) antenna ports. The method may also include transmitting a sounding reference signal transmission based on the sounding reference signal configuration.

In some examples, a scheduled entity may include means for receiving a sounding reference signal configuration for a codebook-based sounding reference signal, the sounding reference signal configuration including sounding reference signal resource indicator values for six (6) antenna ports or eight (8) antenna ports. The scheduled entity may also include means for transmitting a sounding reference signal transmission based on the sounding reference signal configuration.

In some examples, an article of manufacture for use by a scheduled entity includes a non-transitory computer-readable medium having stored therein instructions executable by one or more processors of the scheduled entity to receive a sounding reference signal configuration for a codebook-based sounding reference signal, the sounding reference signal configuration including sounding reference signal resource indicator values for six (6) antenna ports or eight (8) antenna ports. The computer-readable medium may also have stored therein instructions executable by one or more processors of the scheduled entity to transmit a sounding reference signal transmission based on the sounding reference signal configuration.

In some examples, a scheduling entity may include a transceiver, a memory, and a processor coupled to the transceiver and the memory. The processor and the memory may be configured to transmit a sounding reference signal configuration for a codebook-based sounding reference signal via the transceiver, the sounding reference signal configuration including sounding reference signal resource indicator values for six (6) antenna ports or eight (8) antenna ports. The processor and the memory may also be configured to receive a sounding reference signal transmission via the transceiver based on the sounding reference signal configuration.

In some examples, a method for wireless communication at a scheduling entity is disclosed. The method may include transmitting a sounding reference signal configuration for a codebook-based sounding reference signal, the sounding reference signal configuration including sounding reference signal resource indicator values for six (6) antenna ports or eight (8) antenna ports. The method may also include receiving a sounding reference signal transmission based on the sounding reference signal configuration.

In some examples, a scheduling entity may include means for transmitting a sounding reference signal configuration for a codebook-based sounding reference signal, the sounding reference signal configuration including sounding reference signal resource indicator values for six (6) antenna ports or eight (8) antenna ports. The scheduling entity may also include means for receiving a sounding reference signal transmission based on the sounding reference signal configuration.

In some examples, an article of manufacture for use by a scheduling entity includes a non-transitory computer-readable medium having stored therein instructions executable by one or more processors of the scheduling entity to transmit a sounding reference signal configuration for a codebook-based sounding reference signal, the sounding reference signal configuration including sounding reference signal resource indicator values for six (6) antenna ports or eight (8) antenna ports. The computer-readable medium may also have stored therein instructions executable by one or more processors of the scheduling entity to receive a sounding reference signal transmission based on the sounding reference signal configuration.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
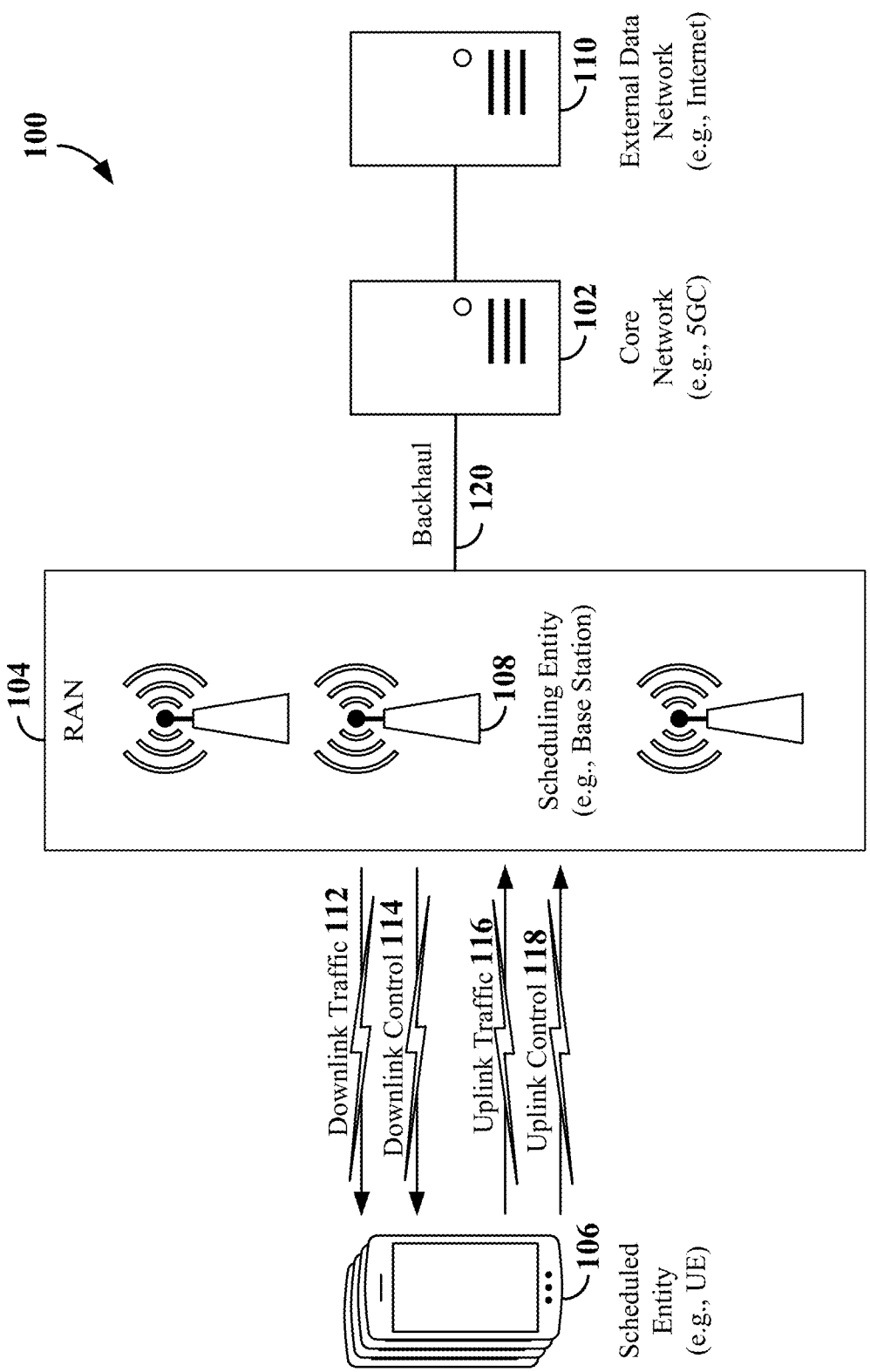
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to transmission of a sounding reference signal (SRS). A scheduling entity such as a base station may configure the transmission of an SRS by a scheduled entity such as a user equipment (UE).

In some examples, an SRS configuration may be based on the number of antenna ports that the UE will use to transmit the SRS. For example, the scheduling entity may specify that the scheduled entity is to use a first table or a second table to map transmission combs to the maximum number of cyclic shifts. In some aspects, the selection of the first table or the second table may be based on the number of antenna ports that the scheduled entity will use to transmit the SRS.

In some examples, a scheduled entity may code division multiplex three (3), six (6), or eight (8) antenna port signals on at least one SRS transmission comb resource. For example, the signals for three (3) antenna ports may be code division multiplexed on one SRS transmission comb resource. As another example, the signals for six (6) antenna ports or eight (8) antenna ports may be code division multiplexed across multiple SRS transmission comb resources.

In some examples, an SRS configuration may indicate one SRS resource of a plurality of SRS resources that is mapped to a particular antenna port. For example, the SRS configuration may include a bit map that indicates a first set of candidate SRS resources for a first antenna port.

In some examples, an SRS configuration may include a restricted list of SRS resource indicators (SRIs). For example, SRIs for a particular layer (rank) or a range of layers (ranks) may be excluded from the list. As another example, a particular SRS resource indicator (SRI) or a range of SRIs may be excluded from the list.

In some examples, an SRS configuration for a codebook-based SRS may include SRIs for six (6) antenna ports or eight (8) antenna ports. Here, a maximum of six (6) SRIs may be specified in a resource set for six (6) antenna ports and/or a maximum of eight (8) SRIs may be specified in a resource set for eight (8) antenna ports.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
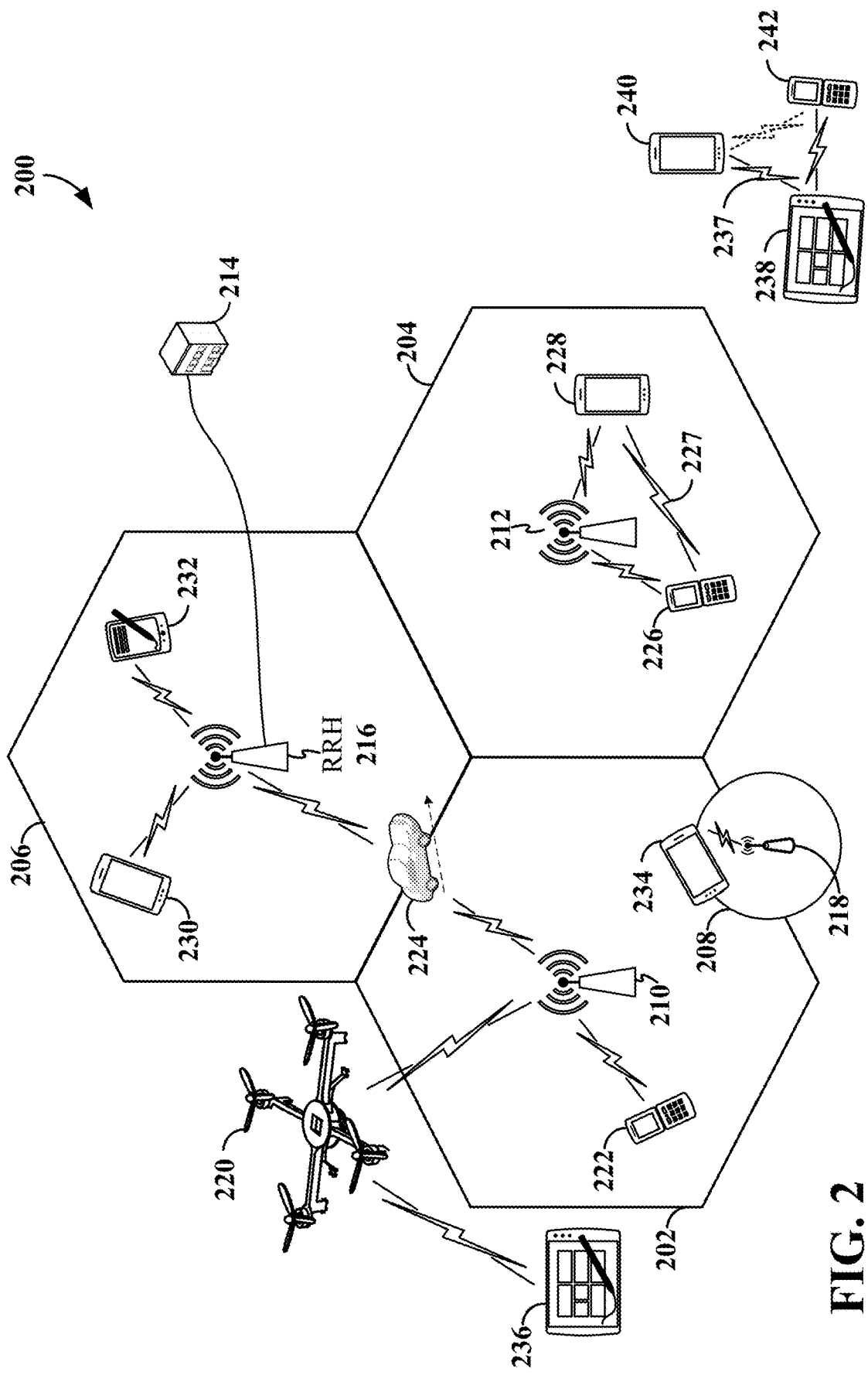
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
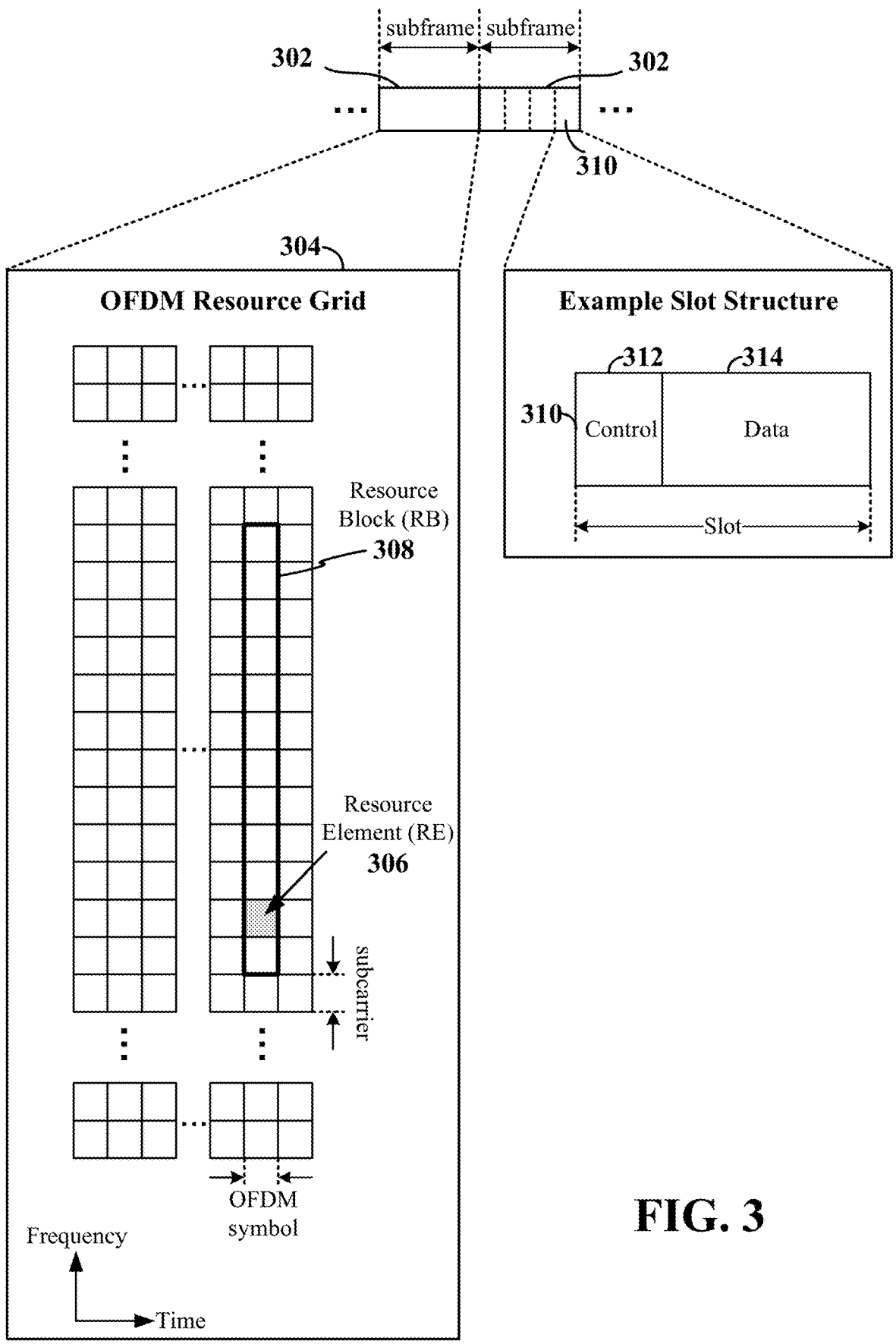
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TB S), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

As mentioned above, a scheduled entity (e.g., a UE) may transmit reference signals that a receiving device (e.g., a scheduling entity in some examples) may use for various purposes including, for example, channel estimation, positioning, codebook generation, cross-link interference measurements, and beam selection. For example, for a channel estimation operation, a scheduled entity may transmit a reference signal to a scheduling entity over a specified bandwidth to enable the scheduling entity to estimate the uplink channel over that bandwidth. In this way, the scheduling entity may better schedule transmissions from the scheduled entity (e.g., the scheduling entity may select the frequency band and transmission parameters the scheduled entity is to use for an uplink transmission).

The disclosure relates in some aspects to the transmission of a sounding reference signal (SRS) between different types of devices. For example, a UE may transmit an SRS to a base station, a sidelink device may transmit a sidelink SRS to another sidelink device, or a scheduled entity may transmit an SRS to a scheduling entity. Other examples are possible. For purposes of explanation, the discussion that follows describes a scenario where a scheduled entity transmits an SRS to a scheduling entity. It should be understood that this discussion is applicable to the transmission of an SRS between other types of devices as well.

A scheduling entity may transmit to a scheduled entity SRS configuration information that specifies the SRS resources and other parameters to be used by the scheduled entity to transmit an SRS. For example, the scheduling entity may configure one or more SRS resource sets for the scheduled entity. In some examples, the scheduled entity may use different resource sets for transmitting on different symbols. A defined number of antenna ports may be used for each SRS resource.

In some examples, an antenna port is a logical entity used to map data streams to one or more antennas. Each antenna port may be associated with a reference signal (e.g., which may allow a receiver to distinguish data streams associated with the different antenna ports in a received transmission). For example, logical antenna ports 1000-1999 may be used for SRS transmissions in some networks. An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from MIMO layers may be combined and re-distributed to each of the antenna ports, then precoding is applied, and the precoded data symbols are applied to corresponding REs for OFDM signal generation and transmission via one or more physical antenna elements.

In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

As mentioned above, a scheduling entity may configure multiple SRS resource sets for an SRS transmission by a scheduled entity. Each SRS resource set may be configured to be periodic, aperiodic, or semi-persistent, such that each of the SRS resources within the corresponding SRS resource set are periodic, aperiodic, or semi-persistent, respectively. Each SRS resource includes a set of SRS resource parameters configuring the SRS resource. For example, the SRS resource parameters may include a set of antenna port(s) (e.g., uplink beam), number of consecutive symbols, time domain allocation, repetition, transmission comb structure, bandwidth, and other suitable parameters. Each SRS may further be quasi co-located (QCL'ed) with another reference signal, such as an SSB, CSI-RS, or an SRS. The respective sets of SRS resource parameters for each of the SRS resources in a particular SRS resource set collectively form the SRS resource set parameters for the SRS resource set. In addition, the SRS resource set itself may further include additional SRS resource set parameters.

Transmission of an uplink SRS may occur periodically (e.g., as configured via radio resource control (RRC) signaling by a base station), semi-persistently (e.g., as configured via RRC signaling and activated/deactivated via medium access control-control element (MAC-CE) signaling by the base station), or aperiodically (e.g., as triggered by the base station via downlink control information (DCI)). The SRS resource set parameters for an aperiodic SRS resource set may include an aperiodic trigger state (e.g., codepoint) for the aperiodic SRS resource set (e.g., up to three trigger states may be possible in some cases, each mapping to an aperiodic SRS resource set), a slot offset between the slot including a DCI triggering an aperiodic SRS resource and transmission of the SRS (e.g., an SRS is transmitted k slot(s) after the slot carrying the DCI containing the trigger state), and a CSI-RS resource identifier (CRI) associated with an aperiodic SRS resource set for precoder estimation of the aperiodic SRSs. As another example, the SRS configuration for a periodic SRS resource set or a semi-persistent SRS resource set may indicate the periodicity of the SRS resources (e.g., the periodicity of transmission of SRSs).

For a sidelink SRS transmission, a set of sidelink SRS resources, such as a set of symbols in a sidelink slot or a full sidelink slot may be allocated for the transmission of SL-SRSs. The SL-SRS transmission may be independent of any data transmission and may be periodic, semi-persistent, or aperiodic. In examples in which the SL-SRS transmission is periodic, a SL-SRS periodicity between consecutive SL-SRS transmissions of a transmitting device (e.g., a Tx sidelink device) may be defined. For example, the SL-SRS periodicity may be defined via semi-persistent scheduling (SPS) signaling, radio resource control (RRC) signaling, a medium access control (MAC) control element (MAC-CE), or other suitable signaling.

Figure 4:
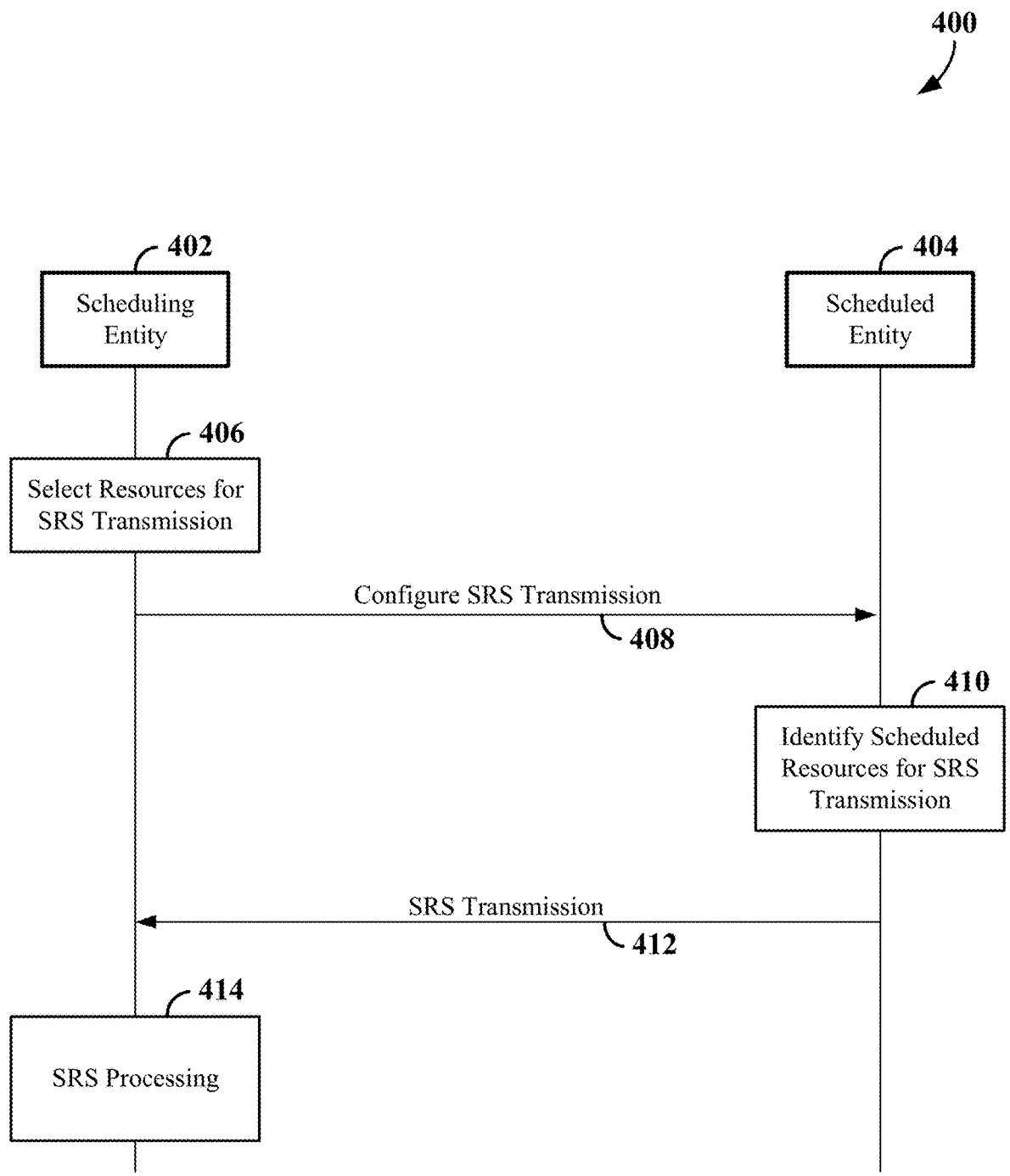
FIG. 4 is a signaling diagram illustrating an example of signaling for scheduling a sounding reference signal (SRS) transmission according to some aspects.

FIG. 4 is a signaling diagram 400 illustrating an example of scheduling an SRS transmission in a wireless communication system including a scheduling entity (e.g., a base station) 402 and a scheduled entity (e.g., a UE) 404. In some examples, the scheduling entity 402 may correspond to any of the network entities, base stations, central units, distributed units, radio units, or scheduling entities shown in any of FIGS. 1, 2, 10, 17, and 23. In some examples, the scheduled entity 404 may correspond to any of the UEs or scheduled entities shown in any of FIGS. 1, 2, 8, 10, and 11.

At 406 of FIG. 4, the scheduling entity 402 selects resources for an SRS transmission by the scheduled entity 404. For example, the scheduling entity 402 may allocate resources for different SRS resource sets under different BWPs under different cells. As another example, the scheduling entity 402 may allocate SL-SRS resources.

At 408, the scheduling entity 402 configures the SRS transmission for the scheduled entity 404. For example, for an uplink SRS transmission, the scheduling entity 402 (e.g., a base station) may send an RRC message or some other type of message to the scheduled entity 404, where the message specifies the resources and other information to be used by the scheduled entity 404 for the SRS transmission.

For a sidelink SRS transmission, the scheduling entity 402 (e.g., a scheduling sidelink UE or a base station) may allocate resources for the transmission of an SL-SRS from the scheduled entity 404 (e.g., a sidelink UE) to the scheduling entity or to another sidelink UE. In some examples, the resource set may be configured via an RRC message, and a DCI or other signaling may be used to activate SRS transmissions (e.g., for aperiodic SRS resources). In some examples, the scheduling entity 402 may transmit an SL-SRS request indicating the allocated periodic, aperiodic, or semi-persistent SL-RS resources. In some examples, the SL-SRS resources may be configured via an RRC message, and the SL-SRS request may be included within SCI or a MAC-CE to activate the SL-SRS resources (e.g., periodic SL-SRS resources).

At 410, the scheduled entity 404 identifies the scheduled resources for the SRS transmission. For example, for an uplink SRS transmission, the scheduled entity 404 may identify the periodic, aperiodic, or semi-persistent SRS resources within a corresponding SRS resource set. For a sidelink SRS transmission, the scheduled entity 404 may identify the periodic, aperiodic, or semi-persistent SL-SRS resources indicated in the SL-SRS request.

At 412, the scheduled entity 404 transmits the SRS transmission on the scheduled resources. For example, for an uplink SRS transmission, the scheduled entity 404 (e.g., a UE) may transmit an SRS to the scheduling entity 402 (e.g., a base station). For a sidelink SRS transmission, the scheduled entity 404 (e.g., a scheduled sidelink UE) may transmit an SL-SRS to the scheduling entity 402 (e.g., a sidelink UE) or to another sidelink UE (not shown in FIG. 4). For triggered or activated SRS transmissions, the scheduled entity 404 transmits the SRS transmission according to the trigger or activation (e.g., indicated by a MAC-CE, a DCI, etc.)

At 414, the scheduling entity 402 processes the SRS transmission received at 412. For example, the scheduling entity 402 may estimate a channel between the scheduling entity 402 and the scheduled entity 404, estimate a position of the scheduled entity 404, generate a codebook for communication with the scheduled entity 404, estimate cross-link interference for communication with the scheduled entity 404, or select a beam for communication with the scheduled entity 404.

In some examples, SRS transmissions may be sub-band transmissions where an SRS is transmitted over one or more sub-bands of the allocated SRS bandwidth. For example, a scheduling entity may configure a scheduled entity to use frequency hopping to transmit SRSs over different sub-bands. In some examples, the scheduling entity may configure a hopping scheme for each SRS resource set for a scheduled entity. For frequency hopping, the SRS bandwidth may refer to the total bandwidth that will be hopped across all hops (e.g., during a slot, a set of slots, a set of symbols, or some other time span). For example, a set of SRS bandwidth configurations ($C_{SRS}$) may be defined that specifies, for different values of $C_{SRS}$, different SRS hopping bandwidth values for different RB groupings (e.g., 4 RBs per hop, 8 RBs per hop, etc.). Thus, a scheduling entity may send an SRS bandwidth configuration (e.g., a particular $C_{SRS}$ value) to a scheduled entity to configure SRS transmissions by the scheduled entity.

In various examples, an SRS transmission may be a codebook-based transmission or a non-codebook-based transmission. In some examples, for a non-codebook-based SRS transmission, a UE may determine a precoder matrix for the SRS transmission based, at least in part, on a PUSCH precoder. In some examples, for a non-codebook-based SRS transmission, a UE may determine a precoder matrix for the SRS transmission based, at least in part, on a designated subset of a configured codebook. In some aspects, a codebook may map a set of values (e.g., zeros, ones, etc.) to another set of values (e.g., a set of complex values) for transmission. The UE may select the particular codebook subset to use based on, for example, the number of antenna ports and/or the number of MIMO layers to be used for the SRS transmission.

In some examples, the transmission of an SRS may be based on a so-called transmission comb. The transmission comb parameter specifies the density of the SRS in the frequency domain.

Figure 5:
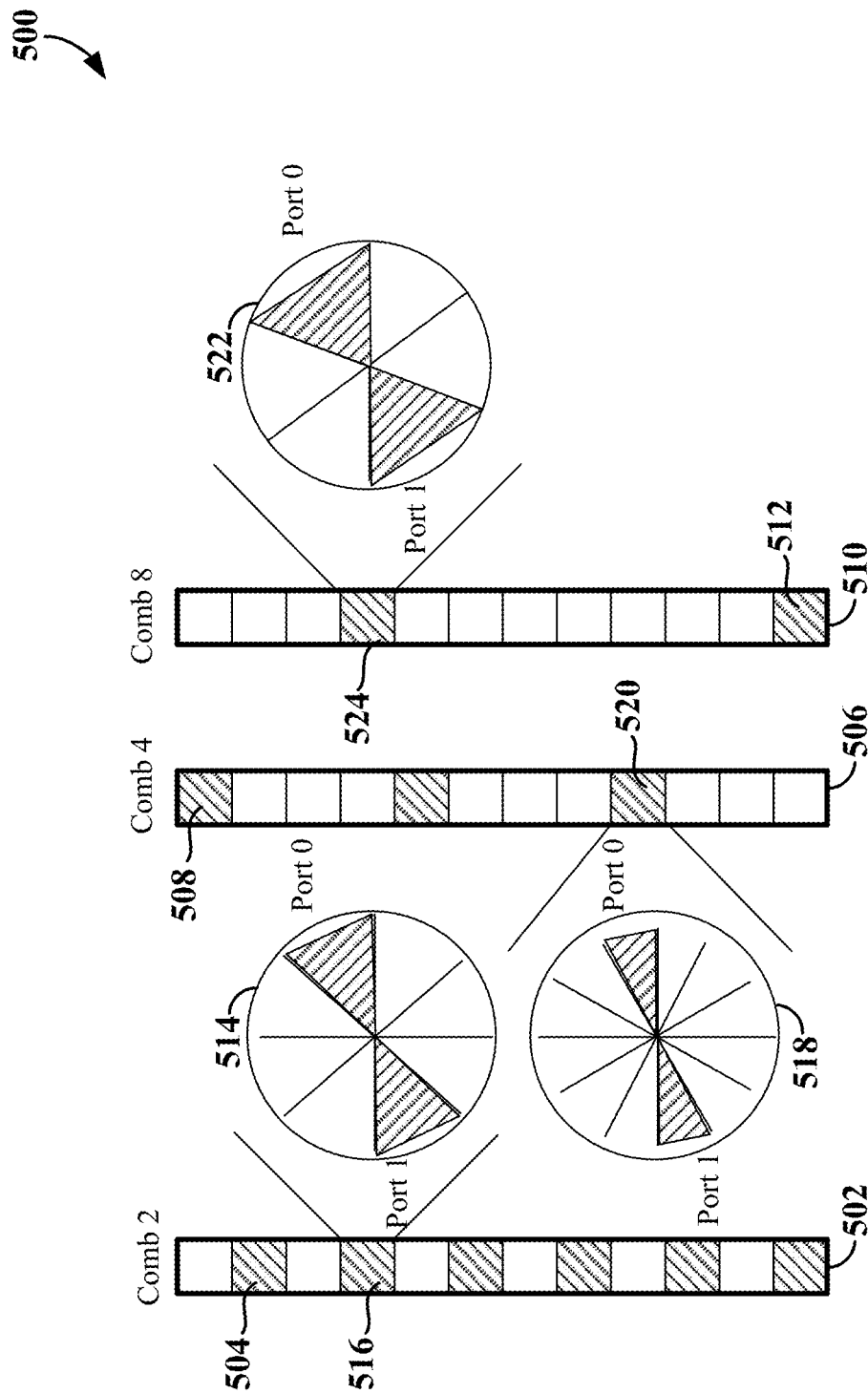
FIG. 5 is a conceptual illustration of example mappings of SRS antenna ports to SRS transmission combs according to some aspects.

FIG. 5 illustrates an example of different SRS transmission comb values. A transmission comb value of two (comb 2 502) may indicate that the SRS is transmitted every two REs (e.g., including RE 504). A transmission comb value of four (comb 4 506) may indicate that the SRS is transmitted every four REs (e.g., including RE 508). A transmission comb value of eight (comb 8 510) may indicate that the SRS is transmitted every eight REs (e.g., including RE 512).

Some communication system may use one (1), two (2), or four (4) antenna ports per SRS resource. To maintain orthogonality between SRS transmissions on different antenna ports, different cyclic shifts may be applied to the SRS sequences transmitted via different antenna ports. In the example of Equation 1 below, the cyclic shift ($n_{SRS}^{cs,i}$) for each SRS antenna port depends on the port index ($p_i$), the number of antenna ports ($N_{ap}^{SRS}$), and the maximum cyclic shift ($n_{SRS}^{cs,max}$) that may be applied to the SRS sequence.

$$n_{SRS}^{cs,i} = \left( n_{SRS}^{cs} + \frac{n_{SRS}^{cs,max}(p_i - 1000)}{N_{ap}^{SRS}} \right) \bmod n_{SRS}^{cs,max} \quad \text{EQUATION 1}$$

Table 1 illustrates an example of how the maximum cyclic shift parameter ($n_{SRS}^{cs,max}$) may be defined for different transmission combs. Here, the parameter $K_{TC}$ refers to the transmission combs (comb 2, comb 4, and comb 8).

TABLE 1

| $K_{TC}$ | $n_{SRS}^{cs,max}$ |
|---|---|
| 2 | 8 |
| 4 | 12 |
| 8 | 6 |

In some examples, the SRS antenna ports of one UE may be mapped to the same transmission comb using different cyclic shifts. In some examples, the SRS antenna ports of one UE may be mapped to multiple transmission combs using one or more cyclic shifts.

FIG. 5 illustrates an example mapping of SRS antenna ports to SRS transmission combs (for comb 2, comb 4, and comb 8 scenarios). The mapping 514 illustrates how port 0 and port 1 may be mapped to a resource 516 for comb 2 502 for a scenario involving eight (8) cyclic shifts. The mapping 518 illustrates how port 0 and port 1 may be mapped to a resource 520 for comb 4 506 for a scenario involving twelve (12) cyclic shifts. Ports 2 and 3 may be mapped to another resource in this case. The mapping 522 illustrates how port 0 and port 1 may be mapped to a resource 524 for comb 8 510 for a scenario involving six (6) cyclic shifts. Ports 2-7 may be mapped to another resource in this case.

Figure 6:
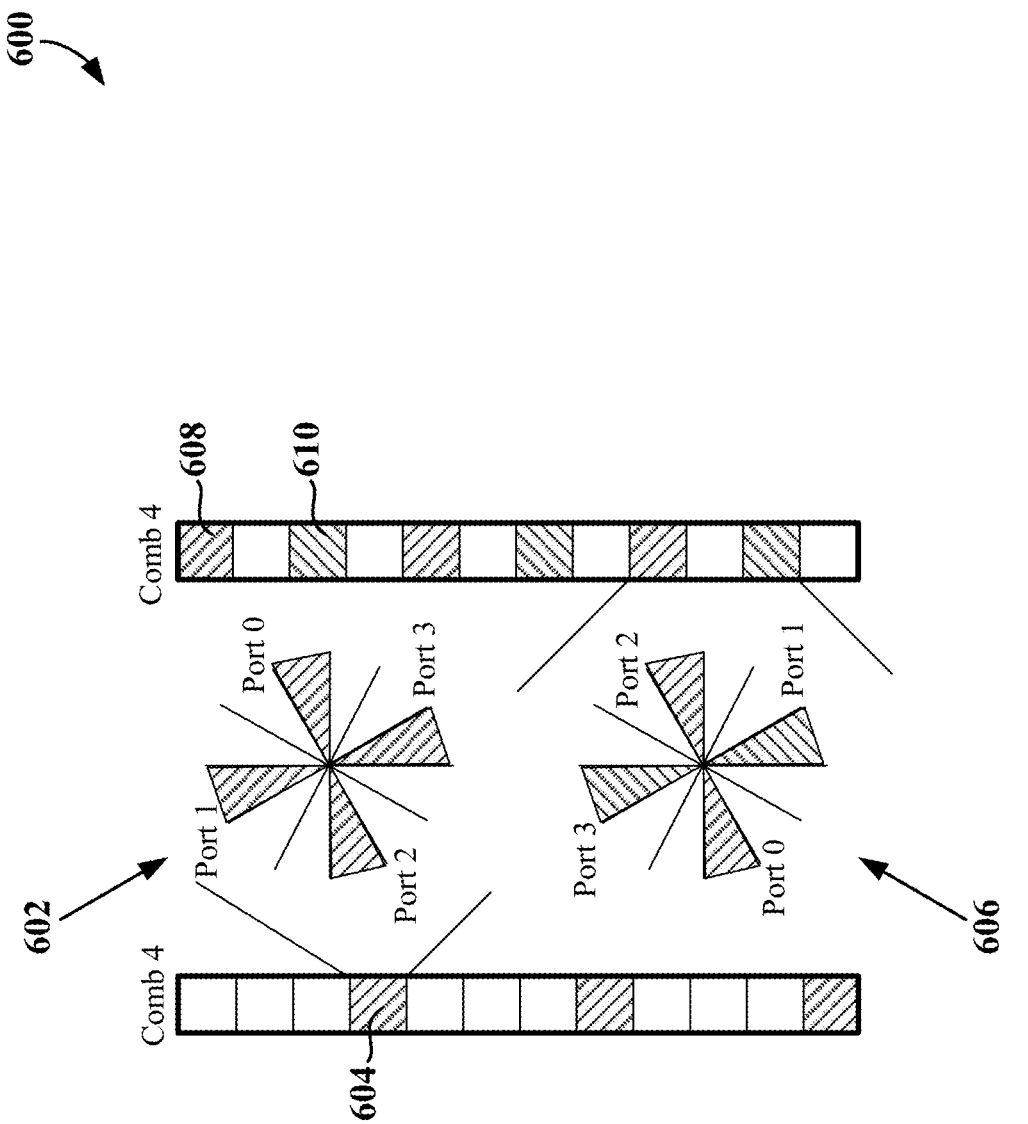
FIG. 6 is a conceptual illustration of an example of a mapping of SRS antenna ports to SRS transmission combs according to some aspects.

FIG. 6 illustrates another example of mapping SRS antenna ports to SRS transmission combs (for a comb 4 scenario). The mapping 602 illustrates, for $N_{ap}^{SRS}=4$, how port 0, port 1, port 2, and port 3 may be mapped to a single resource (e.g., a resource 604) for a comb 4 configuration for a scenario involving twelve (12) cyclic shifts. The mapping 606 illustrates how port 0, port 1, port 2, and port 3 may be mapped to two different resources (e.g., ports 0 and 2 mapped to a resource 608 and ports 1 and 3 mapped to a resource 610) for a comb 4 configuration for a scenario involving twelve (12) cyclic shifts.

Equation 1 and Table 1 may not support the use of three (3), six (6), or eight (8) antenna ports in some cases. For example, Equation 1 may compute a non-integer cyclic shift in these cases when the maximum number of cyclic shifts ($n_{SRS}^{cs,max}$) is not an integer multiple of the number of antenna ports ($N_{ap}^{SRS}$). For example, in Table 1, $n_{SRS}^{cs,max}=8$ not an integer multiple of $N_{ap}^{SRS}=3$. In this case, the cyclic shift ($n_{SRS}^{cs,i}$) provided by Equation 1 would be a non-integer value which is not a valid input for the mod operation.

The disclosure relates in some aspects to increasing the maximum number of cyclic shifts used for SRS transmissions. In some examples a limitation is applied on the usable cyclic shifts. For example, the parameter $n_{SRS}^{cs,max}$ may be restricted to be an integer multiple of $N_{ap}^{SRS}$. As shown in table 2 below, in contrast with Table 1, the parameter $n_{SRS}^{cs,max}$ is set to a value of 12 (for $K_{TC}=2$). Thus, Table 2 can support SRS transmissions with three (3) or six (6) antenna ports for $K_{TC}=2$.

TABLE 2

| $K_{TC}$ | $n_{SRS}^{cs,max}$ |
|---|---|
| 2 | 12 |
| 4 | 12 |
| 8 | 6 |

In some examples, a scheduling entity (e.g., a base station) may configure a scheduled entity (e.g., a UE) with one or more tables that the scheduled entity may use to determine the $n_{SRS}^{cs,max}$ parameter (e.g., Table 1, Table 2, and/or other similar tables) for a scheduled SRS transmission. In addition, in some examples, the scheduling entity may send to the scheduled entity (e.g., via an RRC message, a MAC-CE, or some other signaling) an indication of which table the scheduled entity is to use for the SRS transmission.

The disclosure relates in some aspect to SRS antenna ports to transmission comb mapping for the scenario where the number of antenna ports ($N_{ap}^{SRS}$) is three (3) antenna ports, six (6) antenna ports, or eight (8) antenna ports.

Figure 7:
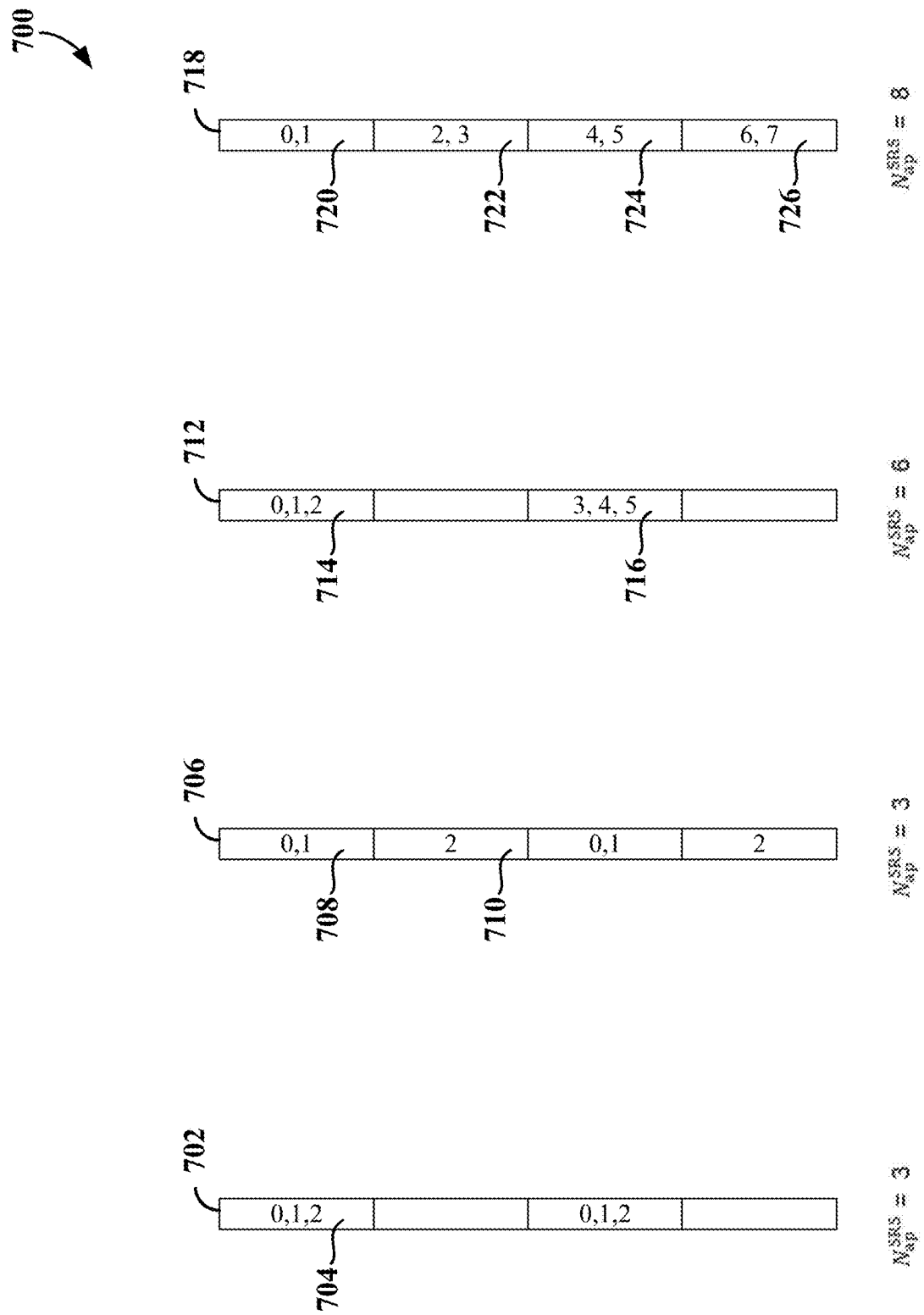
FIG. 7 is a conceptual illustration of example mappings of SRS antenna ports to SRS transmission combs according to some aspects.

FIG. 7 illustrates an example mapping of SRS antenna ports to SRS transmission combs for comb 3, comb 6, and comb 8 scenarios. The mapping 702 illustrates, for $N_{ap}^{SRS}=3$, how port 0, port 1, and port 2 may be mapped to the same transmission comb resource (e.g., a resource 704). The mapping 706 illustrates, for $N_{ap}^{SRS}=3$, how port 0, port 1, and port 2 may be mapped to two (2) transmission comb resources. For example, ports 0 and 1 may be mapped to a resource 708 and port 2 mapped to a resource 710. The mapping 712 illustrates, for $N_{ap}^{SRS}=6$, how port 0, port 1, port 2, port 3, port 4, and port 5 may be mapped over four (4) transmission comb resources. For example, ports 0, 1, and 2 may be mapped to a resource 714 and ports 3, 4, and 5 mapped to a resource 716. The mapping 718 illustrates, for $N_{ap}^{SRS}=8$, how port 0, port 1, port 2, port 3, port 4, port 5, port 6, and port 7 may be mapped over four (4) transmission comb resources. For example, ports 0 and 1 may be mapped to a resource 720, ports 2 and 3 may be mapped to a resource 722, ports 4 and 5 may be mapped to a resource 724, and ports 6 and 7 may be mapped to a resource 726. Other mappings may be used in other examples.

In some examples, the signals for the antenna ports may be code division multiplexed to reduce the amount of frequency domain resources used for an SRS transmission. For example, when the number of antenna ports (Nap)=three (3), the three (3) antenna ports may be mapped to the same comb, using different cyclic shifts. In some examples, the SRS antenna ports to transmission comb mapping may involve CDM as well as frequency division multiplexing (FDM) (e.g., more frequency domain resources may be used for a more frequency selective channel). Also, antenna ports may be code division multiplexed across multiple transmission combs (i.e., one subset of the antenna ports are mapped to one transmission comb while the other subset of the ports is mapped to a different transmission comb).

The frequency domain starting position ($k_0^{(pi)}$) for an SRS transmission may be determined using Equation 2 in some examples. As indicated, different values of $k_{TC}^{pi}$ are used for the scenarios where the number of SRS antenna ports ($N_{ap}^{SRS}$) is four (4) as compared to the scenarios where the number of SRS antenna ports ($N_{ap}^{SRS}$) is not four (4). For example, the top equation $$\left(\overline{k}_{TC} + \frac{K_{TC}}{2}\right)$$

mod $K_{TC}$) of Equation 2 may be used for the case of four (4) antenna ports using comb 4 and two (2) circular shifts (e.g., code division multiplexed), or four (4) antenna ports using comb 2 and four (4) circular shifts, or four (4) antenna ports using comb 1 and four (4) circular shifts. As further indicated, this top equation may be applicable to specific antenna ports (e.g., 1001, 1003) in some examples. Conversely, the bottom equation ($k_{TC}$) of Equation 2 may be used, for example, for the case of one (1) antenna port or two (2) antenna ports.

$$\overline{k}_0^{(pi)} = n_{shift} N_{sc}^{RB} + \left(k_{TC}^{(pi)} + k_{offset}^{i'}\right) \bmod K_{TC}$$

EQUATION 2

$$k_{TC}^{(pi)} = \begin{cases} \left(\overline{k}_{TC} + K_{TC}/2\right) \bmod K_{TC} & \text{if } n_{SRS}^{cs} \in \{n_{STS}^{cs,max}/2, \ldots, n_{SRS}^{cs,max} - 1\} \text{ and } N_{ap}^{SRS} = 4 \text{ and } p_i \in \{1001, 1003\} \\ \overline{k}_{TC} & \text{otherwise} \end{cases}$$

The disclosure relates in some aspects to a modification of Equation 2 for the scenario where the number of SRS antenna ports ($N_{ap}^{SRS}$) is eight (8). For example, the top equation $$\left(\overline{k}_{TC} + \frac{K_{TC}}{4}\right)$$

mod $K_{TC}$) of Equation 3 may be used for the case of eight (8) antenna ports using comb 4 and two (2) circular shifts (e.g., code division multiplexed), or eight (8) antenna ports using comb 2 and four (4) circular shifts, or eight (8) antenna ports using comb 1 and eight (8) circular shifts. In some examples, this top equation may be applicable to specific antenna ports (e.g., 1002, 1004, etc.). Other configurations may be used in other examples.

$$k_{TC}^{pi} = \begin{cases} \left(\overline{k}_{TC} + \frac{K_{TC}}{4}\right) \bmod K_{TC} \\ \left(\overline{k}_{TC} + \frac{K_{TC}}{2}\right) \bmod K_{TC} \\ \overline{k}_{TC} \end{cases} \qquad \text{EQUATION 3}$$

Figure 8:
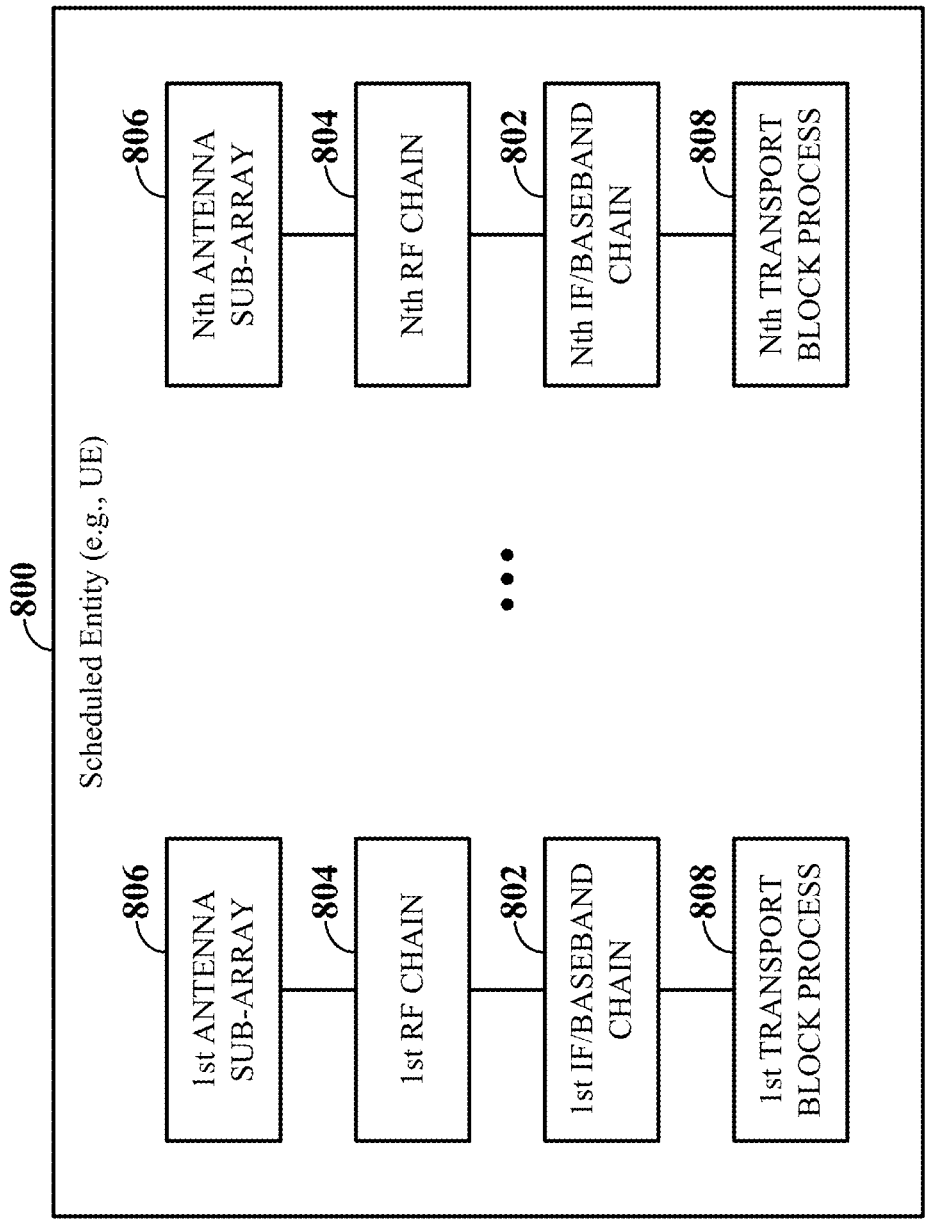
FIG. 8 is a block diagram of an example of a scheduled entity with multiple antenna panels according to some aspects.

In some examples, an SRS may be transmitted via multiple antenna panels. FIG. 8 illustrates a scheduled entity 800 that includes multiple antenna panels (e.g., antenna sub-arrays). In some examples, the scheduled entity 800 may correspond to any of the UEs or scheduled entities shown in any of FIGS. 1, 2, 4, 10, and 11.

The scheduled entity 800 has "N" intermediate frequency (IF)/baseband chains 802. N could be 2 or more. Each IF chain can be connected to multiple RF chains 804 (M). M may be one or more. Each RF chain may connect to one antenna element (e.g., antenna sub-array) 806. Thus, each IF/baseband chain 802 (e.g., used for a corresponding transport block process 808) can be connected to different antenna sub-arrays of the scheduled entity 800.

Multiple sub-arrays may be used to cover different beam directions. In some examples, rank 2 reception (e.g., two MIMO layers) at the scheduled entity 800 may be achieved by dual polarization at one sub-array (e.g., a patch antenna). In some implementations, rank 2 reception at the scheduled entity 800 may be achieved by {H,H}, {V,V}, {H,V}, {V,H} polarization where the H (horizontal) or V (vertical) polarizations are at different sub-arrays (e.g., dipole antennas). Other antenna configurations may be used in other examples.

For a scheduled entity with two (2) antenna panels (e.g., antenna sub-arrays) and simultaneous SRS transmissions, two SRS resources may be configured. In some examples, one of these SRS resources may be used for communicating with one TRP via one antenna panel and the other SRS resource used for communicating with another TRP via the other antenna panel. Each SRS resource has up to N SRS antenna ports. For an eight (8) antenna port configuration (which may be referred to as 8T), each SRS resource may have four (4) antenna ports, using a configuration where the four (4) antenna ports can be mapped to same comb 4 using four (4) cyclic shifts or to the same comb 2 using two (2) cyclic shifts. In some examples, the antenna ports of each SRS resource may be mapped to different transmission combs. For a six (6) antenna port configuration (which may be referred to as 6T), the SRS resources may each be configured for three (3) antenna ports in some cases. As another example, for 6T, one of the SRS resources may be configured for four (4) antenna ports and the other SRS resource may be configured for two (2) antenna ports.

Figure 9:
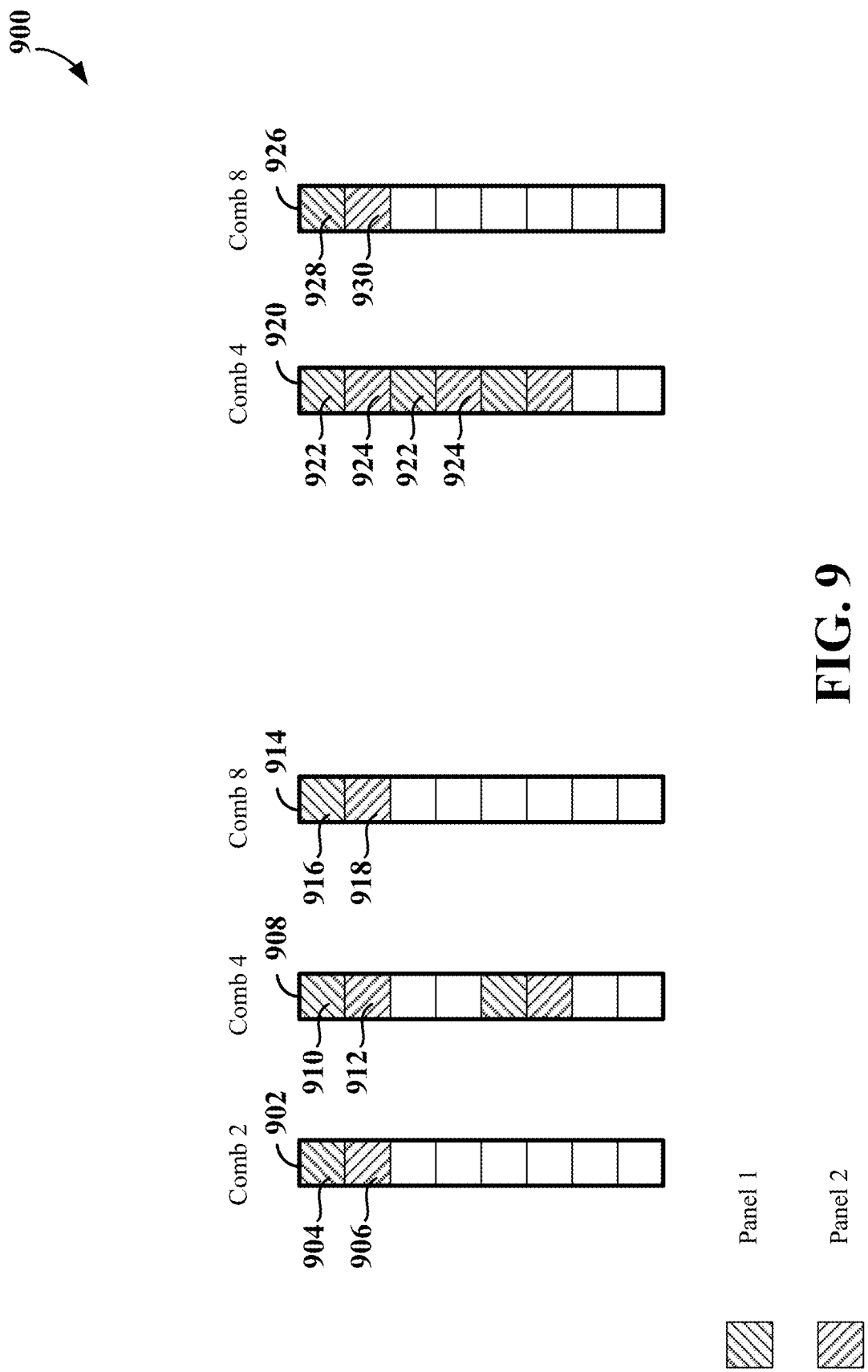
FIG. 9 is a conceptual illustration of example mappings of SRS antenna ports to antenna panels according to some aspects.

FIG. 9 illustrates an example of different mappings of SRS antenna ports to different antenna panels for an eight (8) antenna port scenario. The mapping 902 illustrates how four (4) antenna ports may be mapped to panel 1 904 and four (4) other antenna ports may be mapped to panel 2 906 for a comb 2 scenario that uses four (4) cyclic shifts where four (4) antenna ports are on the same transmission comb and each panel is mapped to a different transmission comb. The mapping 908 illustrates how four (4) antenna ports may be mapped to panel 1 910 and four (4) other antenna ports may be mapped to panel 2 912 for a comb 4 scenario that uses four (4) cyclic shifts where four (4) antenna ports are on the same transmission comb and each panel is mapped to a different transmission comb. The mapping 914 illustrates how four (4) antenna ports may be mapped to panel 1 916 and four (4) other antenna ports may be mapped to panel 2 918 for a comb 8 scenario that uses four (4) cyclic shifts where four (4) antenna ports are on the same transmission comb and each panel is mapped to a different transmission comb. The mapping 920 illustrates how four (4) antenna ports may be mapped to panel 1 922 and four (4) other antenna ports may be mapped to panel 2 924 for a comb 4 scenario that uses four (4) cyclic shifts where two (2) antenna ports are on the same transmission comb and each panel is mapped to a different transmission comb. The mapping 926 illustrates how four (4) antenna ports may be mapped to panel 1 928 and four (4) other antenna ports may be mapped to panel 2 for a comb 8 scenario that uses four (4) cyclic shifts where two (2) antenna ports are on the same transmission comb and each panel is mapped to a different transmission comb. Other mappings may be used in other examples.

The disclosure relates in some aspects to SRS resource indicator (SRI) tables. In some examples, SRI tables may be defined for non-codebook-based SRS transmissions. In some examples, SRI tables may be defined for codebook-based SRS transmissions.

For some non-codebook-based SRS transmissions, one SRS antenna port may be configured for each SRS resource. That is, there is strict one-to-one mapping between an indicated SRS antenna port and an SRI index. In this case, one corresponding non-codebook SRS resource set may be configured. In some examples, a maximum of four (4) SRS resources may be configured for a non-codebook based SRS transmission.

Tables 3-6 illustrate examples of SRI tables that may be used for scenarios that use one (1), two (2), three (3), or four (4) MIMO layers (e.g., which may also be referred to as ranks) for non-codebook-based SRS transmissions. Table 3 indicates the SRI resources to be used when the maximum number of MIMO layers ($L_{max}$) is one (1) for scenarios where $N_{SRS}$ is 2, 3, or 4. Table 4 indicates the SRI resources to be used when the maximum number of MIMO layers ($L_{max}$) is two (2) for scenarios where $N_{SRS}$ is 2, 3, or 4. Table 5 indicates the SRI resources to be used when the maximum number of MIMO layers ($L_{max}$) is three (3) for scenarios where $N_{SRS}$ is 2, 3, or 4. Table 6 indicates the SRI resources to be used when the maximum number of MIMO layers ($L_{max}$) is four (4) for scenarios where $N_{SRS}$ is 2, 3, or 4.

TABLE 3

SRI indication for non-codebook based PUSCH transmission, $L_{max} = 1$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
|   |   | 2 | 2 | 2 | 2 |
|   |   | 3 | reserved | 3 | 3 |

TABLE 4

SRI indication for non-codebook based PUSCH transmission, $L_{max} = 2$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6-7 | reserved | 6 | 0, 3 |
|   |   |   |   | 7 | 1, 2 |
|   |   |   |   | 8 | 1, 3 |
|   |   |   |   | 9 | 2, 3 |
|   |   |   |   | 10-15 | reserved |

TABLE 5

SRI indication for non-codebook based PUSCH transmission, $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14-15 | reserved |

TABLE 6

SRI indication for non-codebook based PUSCH transmission, $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |

TABLE 6-continued

SRI indication for non-codebook based PUSCH transmission, $L_{max} = 3$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14 | 0, 1, 2, 3 |
|   |   |   |   | 15 | reserved |

The disclosure relates in some aspects to SRI tables (e.g., extensions of existing tables) for three (3) antenna port (3T), six antenna port (6T), and eight antenna port (8T) scenarios for non-codebook-based SRS transmissions. In contrast to the strict one-to-one mapping between the indicated antenna port and the SRI index used in Tables 3-6, these SRI tables support the mapping of any one of a set of SRS resources to an antenna port.

For a given SRS resource set, with three (3), six (6), or eight (8) SRS resources, a one-to-one mapping may be used between an indicated antenna port and SRI index. This may take the form of a bitmap where one bit indicates one SRS resource per antenna port. Thus, each index corresponds to one port combination (e.g., 6T, etc.). For example, a first bit of the bitmap may map the antenna port to a first SRS resource, a second bit of the bitmap may map the antenna port to a second SRS resource, a third bit of the bitmap may map the antenna port to a third SRS resource, and so on. Thus, by setting a particular bit in the bitmap, a scheduling entity may indicate which SRS resource a scheduled entity is to use for an SRS transmission.

Tables 7-10 illustrate examples of SRI tables that may be used for scenarios that use up to eight (8) MIMO layers for non-codebook-based SRS transmissions. Table 7 indicates the SRI resources that may be used when the maximum number of MIMO layers ($L_{max}$) is one (1) for scenarios where $N_{SRS}$ is 4, 5, or 6. Table 8 indicates the number of combinations of SRS resources to antenna ports that may be supported for scenarios where the maximum number of MIMO layers ($L_{max}$) is between one (1) and eight (8), inclusive. Table 9 indicates the number of bits that may be used for indicating the possible combinations of SRS resources to antenna ports for scenarios where the maximum number of MIMO layers ($L_{max}$) is between one (1) and eight (8), inclusive. Table 10 indicates the number of reserved bits that may be defined in conjunction with the possible combinations of SRS resources to antenna ports for scenarios where the maximum number of MIMO layers ($L_{max}$) is between one (1) and eight (8), inclusive.

TABLE 7

SRI indication for non-codebook based PUSCH transmission, $L_{max} = 1$

| Bit field mapped to index | SRI(s), $N_{SRS} = 4$ | Bit field mapped to index | SRI(s), $N_{SRS} = 5$ | Bit field mapped to index | SRI(s), $N_{SRS} = 6$ |
|---|---|---|---|---|---|
| 0 | 0 | 0 | 0 | 0 | 0 |
| 1 | 1 | 1 | 1 | 1 | 1 |

TABLE 7-continued

SRI indication for non-codebook based PUSCH transmission, $L_{max} = 1$

| Bit field mapped to index | SRI(s), $N_{SRS} = 4$ | Bit field mapped to index | SRI(s), $N_{SRS} = 5$ | Bit field mapped to index | SRI(s), $N_{SRS} = 6$ |
|---|---|---|---|---|---|
| 2 | 2 | 2 | 2 | 2 | 2 |
| 3 | 3 | 3 | 3 | 3 | 3 |
|   |   | 4 | 4 | 4 | 4 |
|   |   | 5-7 | reserved | 5 | 5 |
|   |   |   |   | 6-7 | reserved |

TABLE 8

Number of combinations

| | $L_{max} = 1$ | $L_{max} = 2$ | $L_{max} = 3$ | $L_{max} = 4$ | $L_{max} = 5$ | $L_{max} = 6$ | $L_{max} = 7$ | $L_{max} = 8$ |
|---|---|---|---|---|---|---|---|---|
| 3 T | 3 | 6 | 7 | | | | | |
| 6 T | 6 | 21 | 41 | 56 | 62 | 63 | | |
| 8 T | 8 | 36 | 92 | 162 | 218 | 246 | 254 | 255 |

TABLE 9

Number of bits

| | $L_{max} = 1$ | $L_{max} = 2$ | $L_{max} = 3$ | $L_{max} = 4$ | $L_{max} = 5$ | $L_{max} = 6$ | $L_{max} = 7$ | $L_{max} = 8$ |
|---|---|---|---|---|---|---|---|---|
| 3 T | 2 | 3 | 3 | | | | | |
| 6 T | 3 | 4 | 6 | 6 | 6 | 6 | | |
| 8 T | 3 | 6 | 7 | 8 | 8 | 8 | 8 | 8 |

TABLE 10

Number of reserved bits

| | $L_{max} = 1$ | $L_{max} = 2$ | $L_{max} = 3$ | $L_{max} = 4$ | $L_{max} = 5$ | $L_{max} = 6$ | $L_{max} = 7$ | $L_{max} = 8$ |
|---|---|---|---|---|---|---|---|---|
| 3 T | 1 | 2 | 1 | | | | | |
| 6 T | 2 | 11 | 23 | 8 | 2 | 1 | | |
| 8 T | 0 | 28 | 36 | 94 | 38 | 10 | 2 | 1 |

The disclosure relates in some aspects to SRI tables for codebook-based SRS transmissions. In some examples, one SRS resource set may be associated with 3, 6, or 8 SRS resources (e.g. for 3T, 6T, or 8T).

In some examples, the number of permissible combinations in an SRI table may be limited (e.g., to reduce signaling overhead). In some examples, this limitation may be a pre-defined limitation. For example, a scheduling entity may configure a scheduled entity with such a limited table. In some examples, this limitation may be a configurable limitation. For example, the scheduling entity may send to the scheduled entity an indication of how the table is to be limited (e.g., for a particular SRS transmission or multiple SRS transmissions). For example, the indication may specify a particular value or range of values to be limited. As another example, an indication may specify an entire table. In some examples, this indication may be sent via a MAC-CE or via other suitable signaling.

In some examples, a table limitation may correspond to a rank parameter (e.g., the number of MIMO layers or $L_{max}$). For example, for 6T or 8T, only a rank of two (2) or higher may be supported. As another example, for 6T or 8T, only a rank that is less than or equal to four (4) may be supported. Table 11 illustrates an example of a table that only supports rank 2 (for index 0-5) and rank 4 (for index 6). Other table configurations may be used in other examples.

TABLE 11

$N_{SRS} = 4$, rank = {2, 4}

| Bit field mapped to index | SRI(s), $N_{SRS} = 4$ |
|---|---|
| 0 | 0, 1 |
| 1 | 0, 2 |
| 2 | 0, 3 |
| 3 | 1, 2 |
| 4 | 1, 3 |
| 5 | 2, 3 |
| 6 | 0, 1, 2, 3 |
| 7 | reserved |

In some examples, a scheduling entity may send an indication of a specific rank value or a rank range to a scheduled entity. In some examples, the scheduling entity may send a MAC-CE that includes this indication. For different rank ranges or specific rank values, the mapping table can be different. In some examples, a MAC-CE may indicate an antenna port to SRI range or a specific antenna port to SRI mapping. For different antenna port ranges or specific antenna port values, the mapping tables can be different.

A table limitation may correspond to parameters other than rank. For example, Table 12 illustrates an example of a table that does not support SRI=2.

TABLE 12

$N_{SRS} = 4$, SRI = {0, 1, 3}

| Bit field mapped to index | SRI(s), $N_{SRS} = 4$ |
|---|---|
| 0 | 0 |
| 1 | 1 |
| 2 | 3 |
| 3 | 0, 1 |
| 4 | 0, 3 |
| 5 | 1, 3 |
| 6 | 0, 1, 3 |
| 7 | reserved |

As discussed above, the limitation of Table 12 (or any other table limitation) may be pre-configured or dynamically configured. In some examples, a scheduling entity may send an indication of a specific SRI value or an SRI range to a scheduled entity. In some examples, the scheduling entity may send a MAC-CE that includes this indication. For different SRI ranges or specific SRI values, the mapping table can be different.

Some wireless communication systems may use an SRI indication as described in Tables 13-15 for codebook-based SRS transmissions. Table 13 illustrates an SRI indication for a codebook-based PUSCH transmission where an ul-FullPowerTransmission parameter is not configured, or an ul-FullPowerTransmission parameter=fullpowerMode1, or an ul-FullPowerTransmission parameter=fullpowerMode2, or an ul-FullPowerTransmission parameter=fullpower and an $N_{SRS}$ parameter=2. Table 14 illustrates an SRI indication for a codebook-based PUSCH transmission where an ul-FullPowerTransmission parameter=fullpowerMode2 and an $N_{SRS}$ parameter=3. Table 15 illustrates an SRI indication for a codebook-based PUSCH transmission where an ul-FullPowerTransmission parameter=fullpowerMode2 and an $N_{SRS}$ parameter=4.

TABLE 13

| Bit field mapped to index | SRI(s), $N_{SRS} = 2$ |
|---|---|
| 0 | 0 |
| 1 | 1 |

TABLE 14

| Bit field mapped to index | SRI(s), $N_{SRS} = 2$ |
|---|---|
| 0 | 0 |
| 1 | 1 |
| 2 | 2 |
| 3 | reserved |

TABLE 15

| Bit field mapped to index | SRI(s), $N_{SRS} = 2$ |
|---|---|
| 0 | 0 |
| 1 | 1 |
| 2 | 2 |
| 3 | 3 |

In some examples, when the higher layer parameter ul-FullPowerTransmission is set to fullpowerMode2, a scheduled entity (e.g., a UE) may be configured with one SRS resource or multiple SRS resources with the same or a different number of SRS antenna ports within an SRS resource set with usage set to codebook. In addition, up to two (2) different spatial relations can be configured for all SRS resources in the SRS resource set with usage set to codebook when multiple SRS resources are configured in the SRS resource set. In some examples, these configurations may be subject to the capability of the scheduled entity (e.g., a maximum of two (2) or four (4) SRS resources are supported in an SRS resource set with usage set to codebook).

In some examples, the parameter ul-FullPwrMode2-SRSConfig-diffNumSRSPorts-r16 indicates the scheduled entity (e.g., UE) supported SRS configuration with a different number of antenna ports per SRS resource for uplink full power Mode 2 operation. The possible different number of antenna ports that can be configured for a SRS resource are as follow in some examples. A value p1-2 may mean that each SRS resource can be configured with 1 antenna port or 2 antenna ports, a value p1-4 may mean that each SRS resource can be configured with 1 antenna port or 4 antenna ports, and value p1-2-4 may mean that each SRS resource can be configured with 1 antenna port or 2 antenna ports or 4 antenna ports. A scheduled entity that indicates support of this feature may also indicate support for ul-FullPwrMode2-MaxSRS-ResInSet. In some examples, the values p1-2, p1-4 or p1-2-4 can be used if the parameter ul-FullPwrMode2-MaxSRS-ResInSet is reported as n2 or n4.

In some examples, the parameter ul-FullPwrMode2-MaxSRS-ResInSet-r16 may indicate that a scheduled entity (e.g., UE) supports the maximum number of SRS resources in one SRS resource set with usage set to codebook for uplink full power Mode 2 operation. If the scheduled entity indicates this capability the scheduled entity may also indicate support of codebook-based PUSCH MIMO transmission using mimo-CB-PUSCH and the support of PUSCH codebook coherency subsets using pusch-TransCoherence. A scheduled entity that supports this feature may also support at least full power operation with a single antenna port.

The disclosure relates in some aspects to an SRI table for codebook-based SRS transmissions, where SRI indications are supported for the scenarios where the number of SRSs ($N_{SRS}$) is five (5), six (6), seven (7), or eight (8). For example, an SRI table may support up to $N_{SRS}$=8. Table 16 indicates the SRI resources that may be used for scenarios where $N_{SRS}$ is 5, 6, 7, or 8. In some examples, the number of antenna ports for each SRS resource may be 1, 2, 4, 6, or 8. Here, for $N_{SRS}$=4, more than 4 antenna port SRS resources may be supported.

TABLE 16

| Bit field mapped to index | SRI(s), $N_{SRS} = 5$ | Bit field mapped to index | SRI(s), $N_{SRS} = 6$ | Bit field mapped to index | SRI(s), $N_{SRS} = 7$ | Bit field mapped to index | SRI(s), $N_{SRS} = 8$ |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| 4 | 4 | 4 | 4 | 4 | 4 | 4 | 4 |
| 5-7 | reserved | 5 | 5 | 5 | 5 | 5 | 5 |
| | | 6-7 | reserved | 6 | 6 | 6 | 6 |
| | | | | 7 | reserved | 7 | 7 |

For an ul-FullPowerTransmission, subject to scheduled entity (e.g., UE) capability, a maximum of 2 or 4 SRS resources may be supported in an SRS resource set with usage set to codebook in some examples. Also subject to scheduled entity capability, a maximum of 2, 4, 6, or 8 SRS resources may be supported in an SRS resource set with usage set to codebook.

The parameter ul-FullPwrMode2-SRSConfig-diffNumSRSPorts-r16 may indicate the scheduled entity supported SRS configuration with a different number of antenna ports per SRS resource for uplink full power Mode 2 operation. The possible different number of antenna ports that can be configured for a SRS resource may be as follows in some examples. A value p1-2 may mean that each SRS resource can be configured with 1 antenna port or 2 antenna ports, a value p1-4 may mean that each SRS resource can be configured with 1 antenna port or 4 antenna ports, a value p1-2-4 may mean that each SRS resource can be configured with 1 antenna port or 2 antenna ports or 4 antenna ports.

The disclosure relates in some aspect to supporting all combinations for the above scenario. For example, a value p1-6 means that each SRS resource can be configured with 1 antenna port or 6 antenna ports, a value p1-8 may mean that each SRS resource can be configured with 1 antenna port or 8 antenna ports, a value p1-2-6 may mean that each SRS resource can be configured with 1 antenna port or 2 antenna ports or 6 antenna ports, a value p1-2-8 may mean that each SRS resource can be configured with 1 antenna port or 2 antenna ports or 8 antenna ports, a value p1-4-6 may mean that each SRS resource can be configured with 1 antenna port or 4 antenna ports or 6 antenna ports, a value p1-4-8 may mean that each SRS resource can be configured with 1 antenna port or 4 antenna ports or 8 antenna ports, a value p1-6-8 may mean that each SRS resource can be configured with 1 antenna port or 6 antenna ports or 8 antenna ports, a value p1-2-4-6 may mean that each SRS resource can be configured with 1 antenna port or 2 antenna ports or 4 antenna ports or 6 antenna ports, a value p1-2-4-8 may mean that each SRS resource can be configured with 1 antenna port or 2 antenna ports or 4 antenna ports or 8 antenna ports, and a value p1-2-4-6-8 may mean that each SRS resource can be configured with 1 antenna port or 2 antenna ports or 4 antenna ports or 6 antenna ports or 8 antenna ports. Other combinations are possible.

A scheduled entity may indicate support of this feature and also indicate support of ul-FullPwrMode2-MaxSRS-ResInSet. The values p1-2, p1-4 or p1-2-4 can be used if ul-FullPwrMode2-MaxSRS-ResInSet is reported as n2 or n4 or n6 or n8 in some examples.

Figure 10:
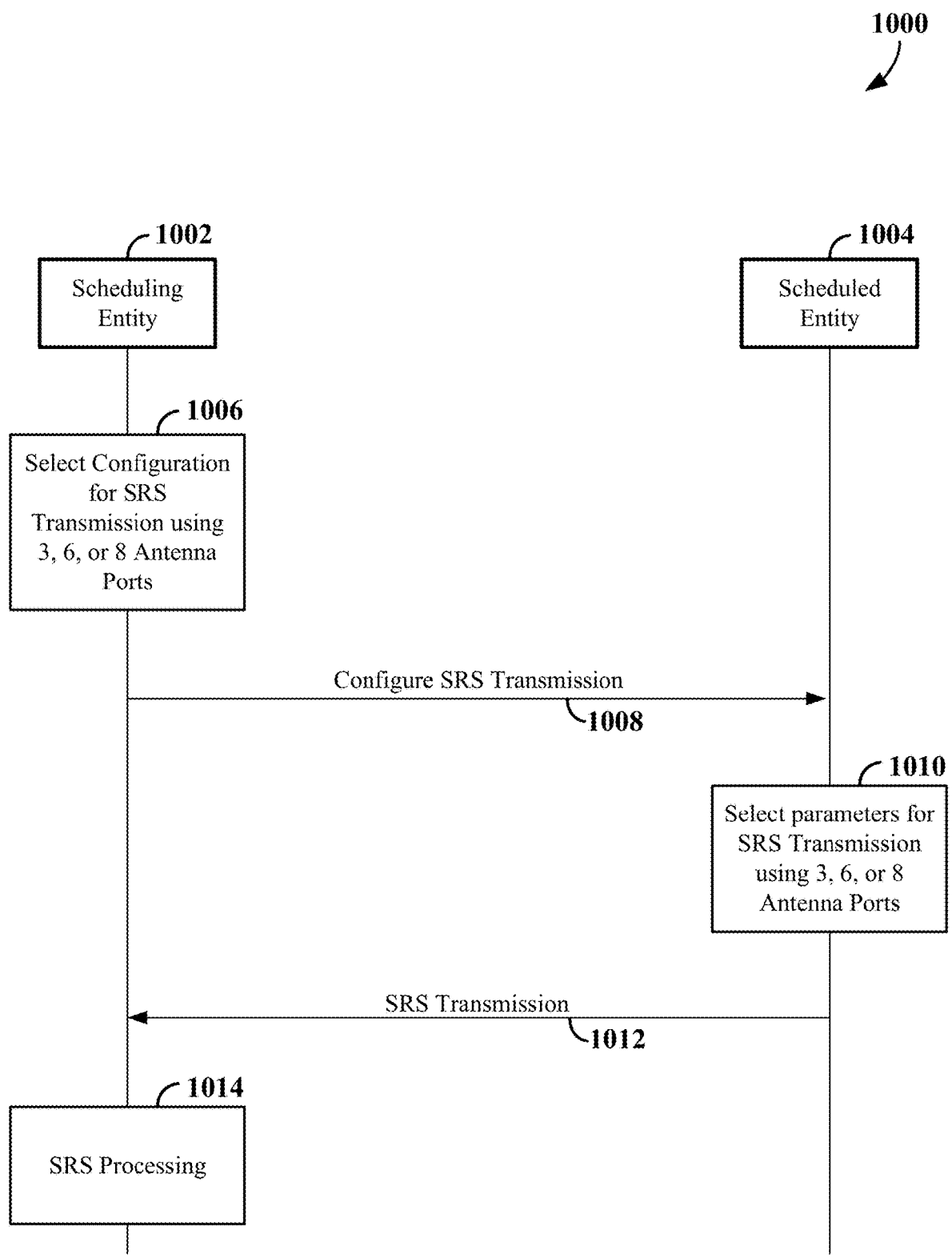
FIG. 10 is a signaling diagram illustrating an example of signaling for configuring a sounding reference signal (SRS) transmission according to some aspects.

FIG. 10 is a signaling diagram 1000 illustrating an example of configuring an SRS transmission in a wireless communication system including a scheduling entity 1002 and a scheduled entity 1004. In some examples, the scheduling entity 1002 may correspond to any of the network entities, base stations, central units, distributed units, radio units, or scheduling entities shown in any of FIGS. 1, 2, 4, 17, and 23. In some examples, the scheduled entity 1004 may correspond to any of the UEs or scheduled entities shown in any of FIGS. 1, 2, 4, 8, and 11.

At 1006 of FIG. 10, the scheduling entity 1002 selects a configuration for an SRS transmissions that is to use 3, 6, or 8 antenna ports (or some other number of antenna ports). For example, the scheduling entity 1002 may allocate resources for different SRS resource sets, select the number of antenna ports that the scheduled entity 1004 is to use, select one or more tables (e.g., Table 1, Table 2, Table 7, Table 11, Table 12, Table 16, and so on), or select some other SRS-related information.

At 1008, the scheduling entity 1002 configures the SRS transmission for the scheduled entity 1004. For example, for an UL SRS transmission, the scheduling entity 1002 (e.g., a base station) may send an RRC message or some other type of message to the scheduled entity 1004, where the message specifies the resources and other information to be used by the scheduled entity 1004 for the SRS transmission. In some examples, the scheduling entity 1002 may send a MAC-CE to configure an SRS transmission or change a previous SRS configuration.

At 1010, the scheduled entity 1004 selects parameters for the SRS transmission.

For example, for an UL SRS transmission, the scheduled entity 1004 may identify the periodic, aperiodic, or semi-persistent SRS resources within a corresponding SRS resource set. As another example, the scheduled entity 1004 may determine the number of antenna ports to use and/or one or more tables to be used for the SRS transmission.

At 1012, the scheduled entity 1004 transmits the SRS transmission on the scheduled resources using the configured SRS parameters. For example, the scheduled entity 1004 (e.g., a UE) may transmit an SRS to the scheduling entity 1002 (e.g., a base station) using the specified number of ports, etc. For triggered or activated SRS transmissions, the scheduled entity 1004 transmits the SRS transmission according to the trigger or activation (e.g., indicated by a MAC-CE, a DCI, etc.)

At 1014, the scheduling entity 1002 processes the SRS transmission received at 1012. For example, the scheduling entity 1002 may estimate a channel between the scheduling entity 1002 and the scheduled entity 1004, estimate a position of the scheduled entity 1004, generate a codebook for communication with the scheduled entity 1004, estimate cross-link interference for communication with the scheduled entity 1004, or select a beam for communication with the scheduled entity 1004.

Figure 11:
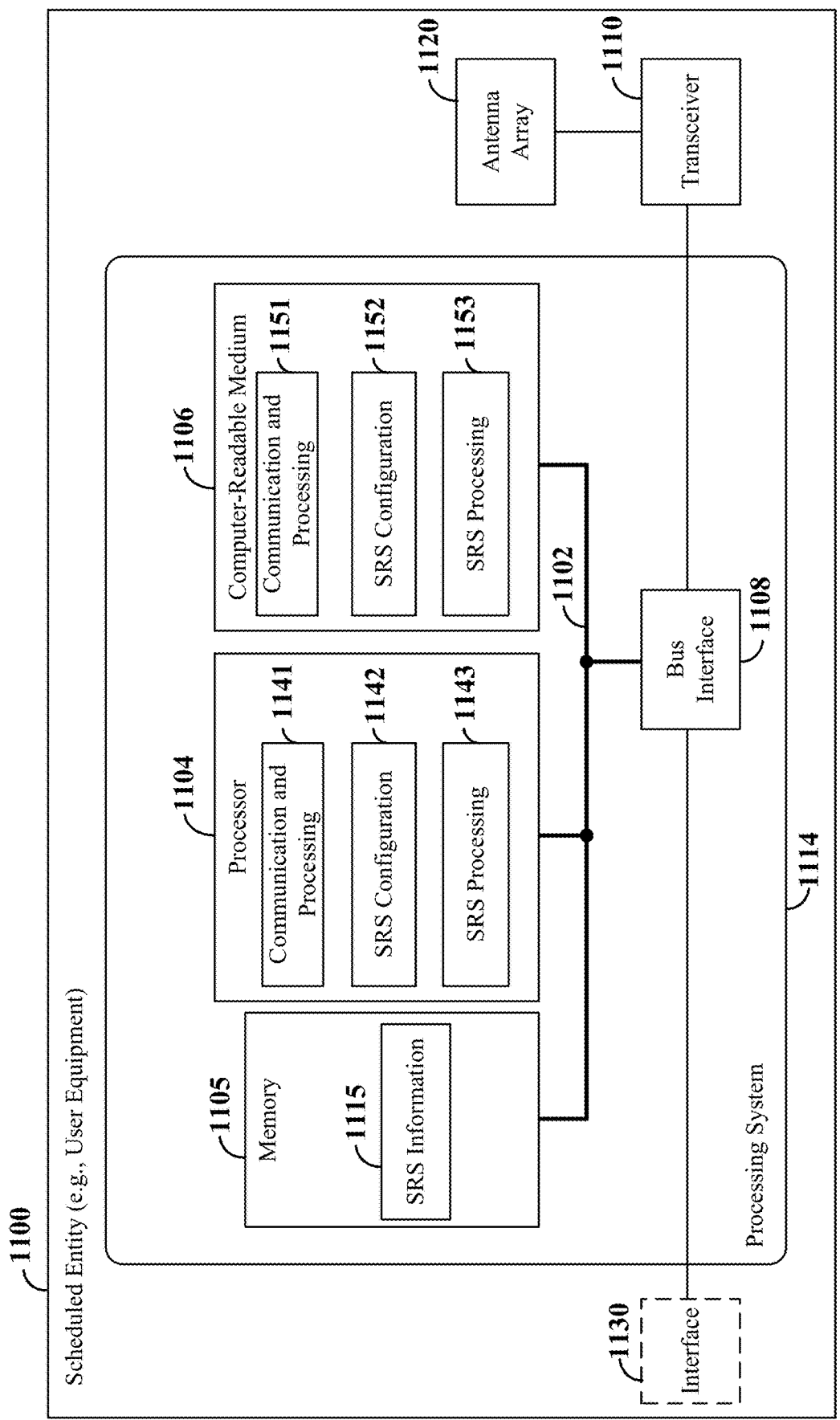
FIG. 11 is a block diagram conceptually illustrating an example of a hardware implementation for a scheduled entity employing a processing system according to some aspects.

FIG. 11 is a block diagram illustrating an example of a hardware implementation for a scheduled entity 1100 employing a processing system 1114. For example, the scheduled entity 1100 may be a device configured to wirelessly communicate with a scheduling entity, as discussed in any one or more of FIGS. 1-10. In some implementations, the scheduled entity 1100 may correspond to any of the UEs or scheduled entities shown in any of FIGS. 1, 2, 4, 8, and 10.

In accordance with various aspects of the disclosure, an element, or any portion of an element, or any combination of elements may be implemented with the processing system 1114. The processing system 1114 may include one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 1100 may be configured to perform any one or more of the functions described herein. That is, the processor 1104, as utilized in a scheduled entity 1100, may be used to implement any one or more of the processes and procedures described herein.

The processor 1104 may in some instances be implemented via a baseband or modem chip and in other implementations, the processor 1104 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102, a transceiver 1110 and an antenna array 1120 and between the bus 1102 and an interface 1130. The transceiver 1110 provides a communication interface or means for communicating with various other apparatus over a wireless transmission medium. The interface 1130 provides a communication interface or means of communicating with various other apparatuses and devices (e.g., other devices housed within the same apparatus as the scheduled entity or other external apparatuses) over an internal bus or external transmission medium, such as an Ethernet cable. Depending upon the nature of the apparatus, the interface 1130 may include a user interface (e.g., keypad, display, speaker, microphone, joystick). Of course, such a user interface is optional, and may be omitted in some examples, such as an IoT device.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store SRS information 1115 (e.g., table information) used by the processor 1104 for the SRS-related operations described herein.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The scheduled entity 1100 may be configured to perform any one or more of the operations described herein (e.g., as described above in conjunction with FIGS. 1-10 and as described below in conjunction with FIGS. 12-16). In some aspects of the disclosure, the processor 1104, as utilized in the scheduled entity 1100, may include circuitry configured for various functions.

The processor 1104 may include communication and processing circuitry 1141. The communication and processing circuitry 1141 may be configured to communicate with a scheduling entity, such as a gNB. The communication and processing circuitry 1141 may be configured to communicate with a base station and one or more other wireless communication devices over a common carrier shared between a cellular (e.g., Uu) interface and a sidelink (e.g., PC5) interface. The communication and processing circuitry 1141 may include one or more hardware components that provide the physical structure that performs various processes related to wireless communication (e.g., signal reception and/or signal transmission) as described herein. The communication and processing circuitry 1141 may further include one or more hardware components that provide the physical structure that performs various processes related to signal processing (e.g., processing a received signal and/or processing a signal for transmission) as described herein. In some examples, the communication and processing circuitry 1141 may include two or more transmit/receive chains (e.g., one chain to communicate with a base station and another chain to communicate with a sidelink device). The communication and processing circuitry 1141 may further be configured to execute communication and processing software 1151 included on the computer-readable medium 1106 to implement one or more functions described herein.

In some implementations where the communication involves receiving information, the communication and processing circuitry 1141 may obtain information from a component of the scheduled entity 1100 (e.g., from the transceiver 1110 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1105, or to the bus interface 1108. In some examples, the communication and processing circuitry 1141 may receive one or more of signals, messages, other information, or any combination thereof. In some examples, the communication and processing circuitry 1141 may receive information via one or more channels. In some examples, the communication and processing circuitry 1141 may receive one or more of signals, messages, SCIs, feedback, other information, or any combination thereof. In some examples, the communication and processing circuitry 1141 may receive information via one or more of a PSCCH, a PSSCH, a PSFCH, some other type of channel, or any combination thereof. In some examples, the communication and processing circuitry 1141 may include functionality for a means for receiving. In some examples, the communication and processing circuitry 1141 may include functionality for a means for decoding.

In some implementations where the communication involves sending (e.g., transmitting) information, the communication and processing circuitry 1141 may obtain information (e.g., from another component of the processor 1104, the memory 1105, or the bus interface 1108), process (e.g., encode) the information, and output the processed information. For example, the communication and processing circuitry 1141 may output the information to the transceiver 1110 (e.g., that transmits the information via radio frequency signaling or some other type of signaling suitable for the applicable communication medium). In some examples, the communication and processing circuitry 1141 may send one or more of signals, messages, other information, or any combination thereof. In some examples, the communication and processing circuitry 1141 may send information via one or more channels. In some examples, the communication and processing circuitry 1141 may send one or more of signals, messages, SCIs, feedback, other information, or any combination thereof. In some examples, the communication and processing circuitry 1141 may send information via one or more of a PSCCH, a PSSCH, a PSFCH, some other type of channel, or any combination thereof. In some examples, the communication and processing circuitry 1141 may include functionality for a means for sending (e.g., a means for transmitting). In some examples, the communication and processing circuitry 1141 may include functionality for a means for encoding.

The SRS configuration circuitry 1142 may include functionality for a means for receiving an SRS configuration (e.g., as described above in conjunction with FIGS. 7-10). For example, the SRS configuration circuitry 1142 together with the communication and processing circuitry 1141 and the transceiver 1110 may receive an RRC message on a PDSCH including an SRS resource allocation and/or other SRS configuration information. As another example, the SRS configuration circuitry 1142 together with the communication and processing circuitry 1141 and the transceiver 1110 may receive a MAC-CE including an SRS configuration.

The SRS configuration circuitry 1142 may include functionality for a means for receiving an indication (e.g., as described above in conjunction with FIGS. 7-10). For example, the SRS configuration circuitry 1142 together with the communication and processing circuitry 1141 and the transceiver 1110 may receive a MAC-CE including an indication specifying an SRS resource indicator table that the scheduled entity 1100 is to use.

The processor 1104 may include SRS processing circuitry 1143 configured to perform SRS processing-related operations as discussed herein (e.g., one or more of the operations described above in conjunction with FIGS. 7-10). The SRS processing circuitry 1143 may be configured to execute SRS processing software 1154 included on the computer-readable medium 1106 to implement one or more functions described herein.

The SRS processing circuitry 1143 may include functionality for a means for generating an SRS. For example, the SRS processing circuitry 1143 may perform a specified sequence generating algorithm (e.g., an algorithm specified by a communication standard such as a 3GPP specification) to generate a series of bits for a reference signal.

The SRS processing circuitry 1143 may include functionality for a means for transmitting an SRS (e.g., as described above in conjunction with FIGS. 7-10). For example, the SRS processing circuitry 1143 may cooperate with the communication and processing circuitry 1141 to encode reference signal bits and transmit the encoded bits to a gNB via an uplink resource allocated for the reference signal. As another example, for a sidelink SRS transmission, the SRS processing circuitry 1143 may cooperate with the communication and processing circuitry 1141 to encode the reference signal bits and transmit the encoded bit to a sidelink device via a sidelink resource allocated for the reference signal.

Figure 12:
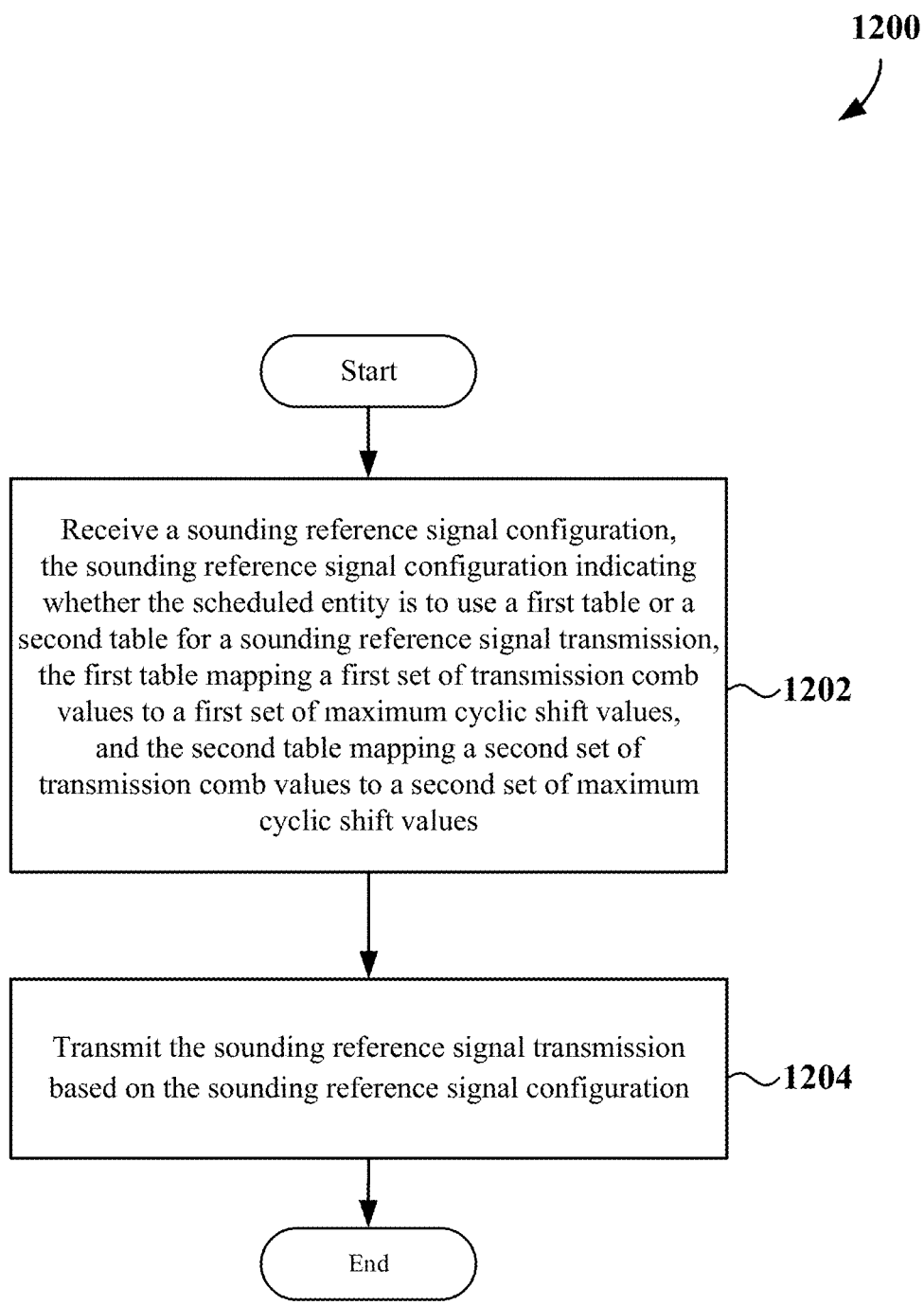
FIG. 12 is a flow chart illustrating an example wireless communication method for transmitting an SRS according to some aspects.

FIG. 12 is a flow chart illustrating an example method 1200 for a scheduled entity in accordance with some aspects of the present disclosure. As described below, some or all illustrated features may be omitted in a particular implementation within the scope of the present disclosure, and some illustrated features may not be required for implementation of all examples. In some examples, the method 1200 may be carried out by the scheduled entity 1100 illustrated in FIG. 11. In some examples, the method 1200 may be carried out by any suitable apparatus or means for carrying out the functions or algorithm described below.

At block 1202, a scheduled entity may receive a sounding reference signal configuration, the sounding reference signal configuration indicating whether the scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. In some examples, the SRS configuration circuitry 1142 in cooperation with the communication and processing circuitry 1141 and the transceiver 1110, shown and described in FIG. 11, may provide a means to receive a sounding reference signal configuration.

At block 1204, the scheduled entity may transmit the sounding reference signal transmission based on the sounding reference signal configuration. In some examples, the SRS processing circuitry 1143 in cooperation with the communication and processing circuitry 1141 and the transceiver 1110, shown and described in FIG. 11, may provide a means to transmit the sounding reference signal transmission based on the sounding reference signal configuration.

In some examples, the first table is associated with a first quantity of antenna ports. In some examples, the second table is associated with a second quantity of antenna ports that is different from the first quantity of antenna ports. In some examples, the second quantity of antenna ports is three (3), six (6), or eight (8).

In some examples, the scheduled entity may transmit the sounding reference signal transmission via a quantity of antenna ports. In some examples, each maximum cyclic shift value in the second table is an integer multiple of the quantity of antenna ports. In some examples, the sounding reference signal configuration may include an indication of the quantity of antenna ports.

In some examples, the scheduled entity may transmit the sounding reference signal transmission via three (3) antenna port signals code division multiplexed on at least one sounding reference signal transmission comb resource. In some examples, the scheduled entity may transmit the sounding reference signal transmission via six (6) antenna port signals code division multiplexed on at least one sounding reference signal transmission comb resource. In some examples, the scheduled entity may transmit the sounding reference signal transmission via eight (8) antenna port signals code division multiplexed on at least one sounding reference signal transmission comb resource.

In some examples, the sounding reference signal configuration indicates whether the scheduled entity is to code division multiplex three (3), six (6), or eight (8) antenna port signals on at least one sounding reference signal transmission comb resource. In some examples, the sounding reference signal configuration indicates one sounding reference signal resource of a plurality of sounding reference signal resources that is mapped to a first antenna port. In some examples, the sounding reference signal configuration may include a restricted set of sounding reference signal resource indicators. In some examples, the sounding reference signal configuration is for a codebook-based sounding reference signal and may include sounding reference signal resource indicator values for six (6) antenna ports or eight (8) antenna ports.

Figure 13:
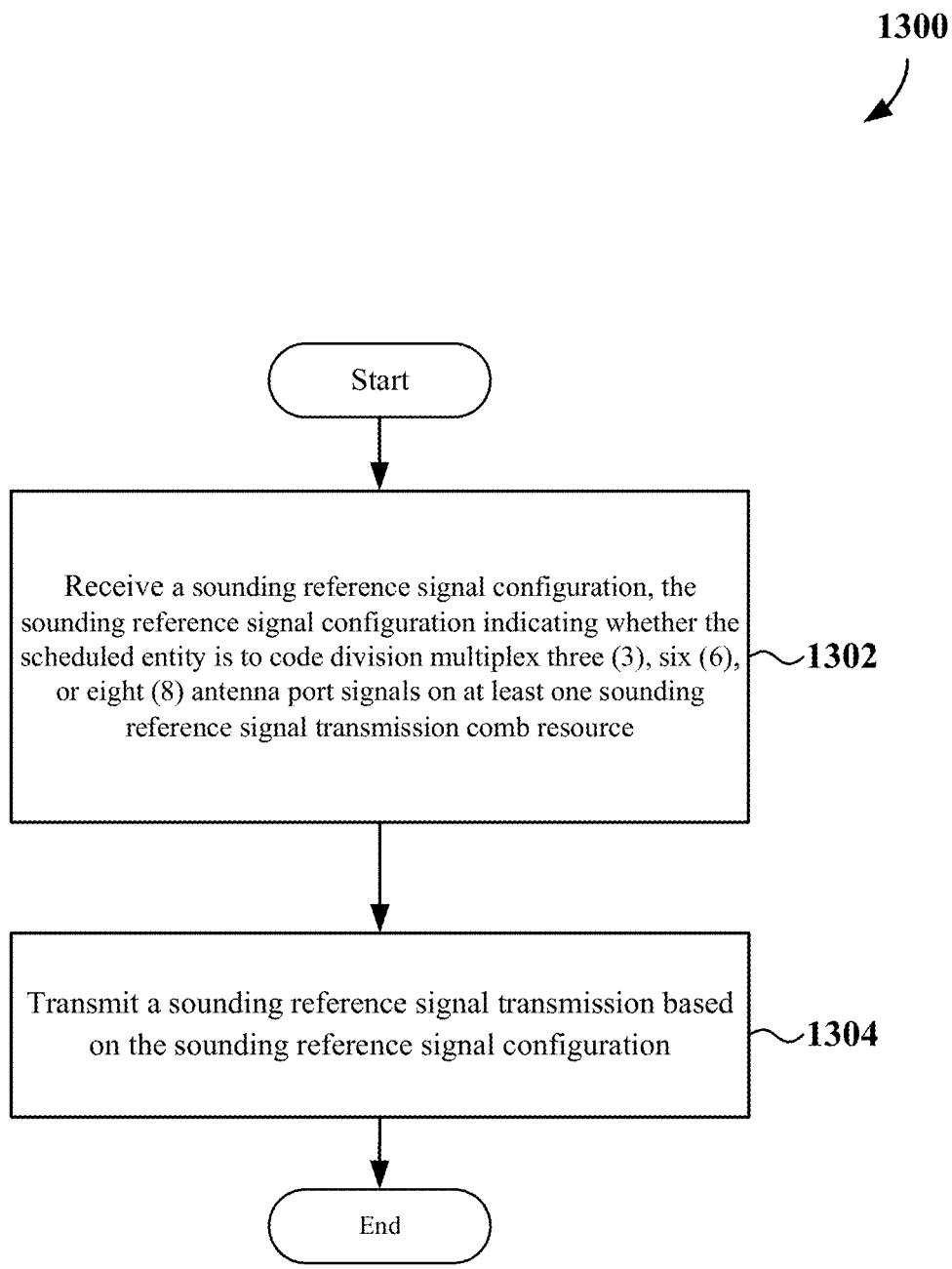
FIG. 13 is a flow chart illustrating an example wireless communication method for transmitting an SRS according to some aspects.

FIG. 13 is a flow chart illustrating an example method 1300 for a scheduled entity in accordance with some aspects of the present disclosure. As described below, some or all illustrated features may be omitted in a particular implementation within the scope of the present disclosure, and some illustrated features may not be required for implementation of all examples. In some examples, the method 1300 may be carried out by the scheduled entity 1100 illustrated in FIG. 11. In some examples, the method 1300 may be carried out by any suitable apparatus or means for carrying out the functions or algorithm described below.

At block 1302, a scheduled entity may receive a sounding reference signal configuration, the sounding reference signal configuration indicating whether the scheduled entity is to code division multiplex three (3), six (6), or eight (8) antenna port signals on at least one sounding reference signal transmission comb resource. In some examples, the SRS configuration circuitry 1142 in cooperation with the communication and processing circuitry 1141 and the transceiver 1110, shown and described in FIG. 11, may provide a means to receive a sounding reference signal configuration.

At block 1304, the scheduled entity may transmit a sounding reference signal transmission based on the sounding reference signal configuration. In some examples, the SRS processing circuitry 1143 in cooperation with the communication and processing circuitry 1141 and the transceiver 1110, shown and described in FIG. 11, may provide a means to transmit a sounding reference signal transmission based on the sounding reference signal configuration.

In some examples, the scheduled entity may transmit the sounding reference signal transmission via three (3) antenna port signals, the three (3) antenna port signals being code division multiplexed on one sounding reference signal transmission comb resource.

In some examples, the scheduled entity may transmit the sounding reference signal transmission via three (3) antenna port signals, a first antenna port signal of the three (3) antenna port signals being transmitted on a first sounding reference signal transmission comb resource, and a second antenna port signal and a third antenna port signal of the three (3) antenna port signals being code division multiplexed on a second sounding reference signal transmission comb resource.

In some examples, the scheduled entity may transmit the sounding reference signal transmission via six (6) antenna port signals, at least a first two of the six (6) antenna port signals being code division multiplexed on a first sounding reference signal transmission comb resource and at least a second two of the six (6) antenna port signals being code division multiplexed on a second sounding reference signal transmission comb resource.

In some examples, the scheduled entity may transmit the sounding reference signal transmission via eight (8) antenna port signals, at least a first two of the eight (8) antenna port signals being code division multiplexed on a first sounding reference signal transmission comb resource and at least a second two of the eight (8) antenna port signals being code division multiplexed on a second sounding reference signal transmission comb resource.

In some examples, the scheduled entity may transmit the sounding reference signal transmission via six (6) antenna port signals, at least a first two of the six (6) antenna port signals being transmitted via a first antenna panel and at least a second two of the six (6) antenna port signals being transmitted via a second antenna panel.

In some examples, the scheduled entity may transmit the sounding reference signal transmission via eight (8) antenna port signals, at least a first two of the eight (8) antenna port signals being transmitted via a first antenna panel and at least a second two of the eight (8) antenna port signals being transmitted via a second antenna panel.

Figure 14:
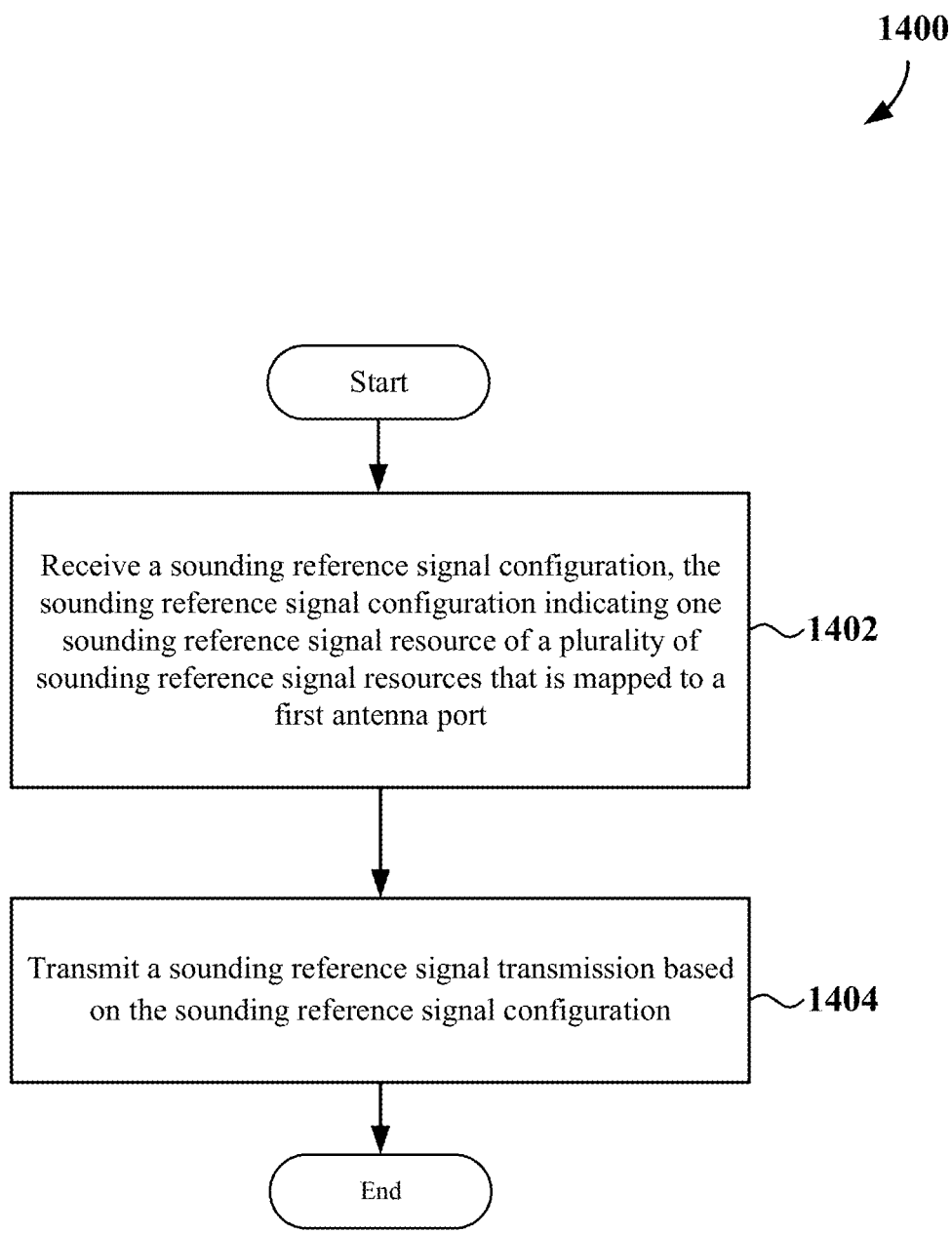
FIG. 14 is a flow chart illustrating an example wireless communication method for transmitting an SRS according to some aspects.

FIG. 14 is a flow chart illustrating an example method 1400 for a scheduled entity in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the scheduled entity 1100 illustrated in FIG. 11. In some examples, the method 1400 may be carried out by any suitable apparatus or means for carrying out the functions or algorithm described below.

At block 1402, a scheduled entity may receive a sounding reference signal configuration, the sounding reference signal configuration indicating one sounding reference signal resource of a plurality of sounding reference signal resources that is mapped to a first antenna port. In some examples, the SRS configuration circuitry 1142 in cooperation with the communication and processing circuitry 1141 and the transceiver 1110, shown and described in FIG. 11, may provide a means to receive a sounding reference signal configuration.

At block 1404, the scheduled entity may transmit a sounding reference signal transmission based on the sounding reference signal configuration. In some examples, the SRS processing circuitry 1143 in cooperation with the communication and processing circuitry 1141 and the transceiver 1110, shown and described in FIG. 11, may provide a means to transmit a sounding reference signal transmission based on the sounding reference signal configuration.

In some examples, the sounding reference signal configuration may include a first bit map indicating a first set of candidate sounding reference signal resources for the first antenna port, the plurality of sounding reference signal resources including the first set of candidate sounding reference signal resources.

In some examples, the sounding reference signal configuration may include a second bit map indicating a second set of candidate sounding reference signal resources for a second antenna port, the plurality of sounding reference signal resources including the second set of candidate sounding reference signal resources.

In some examples, the sounding reference signal configuration may include a first bit map indicating three (3), six (6), or eight (8) candidate sounding reference signal resources for a first port. In some examples, the sounding reference signal configuration may include a second bit map indicating three (3), six (6), or eight (8) candidate sounding reference signal resources for a second port.

Figure 15:
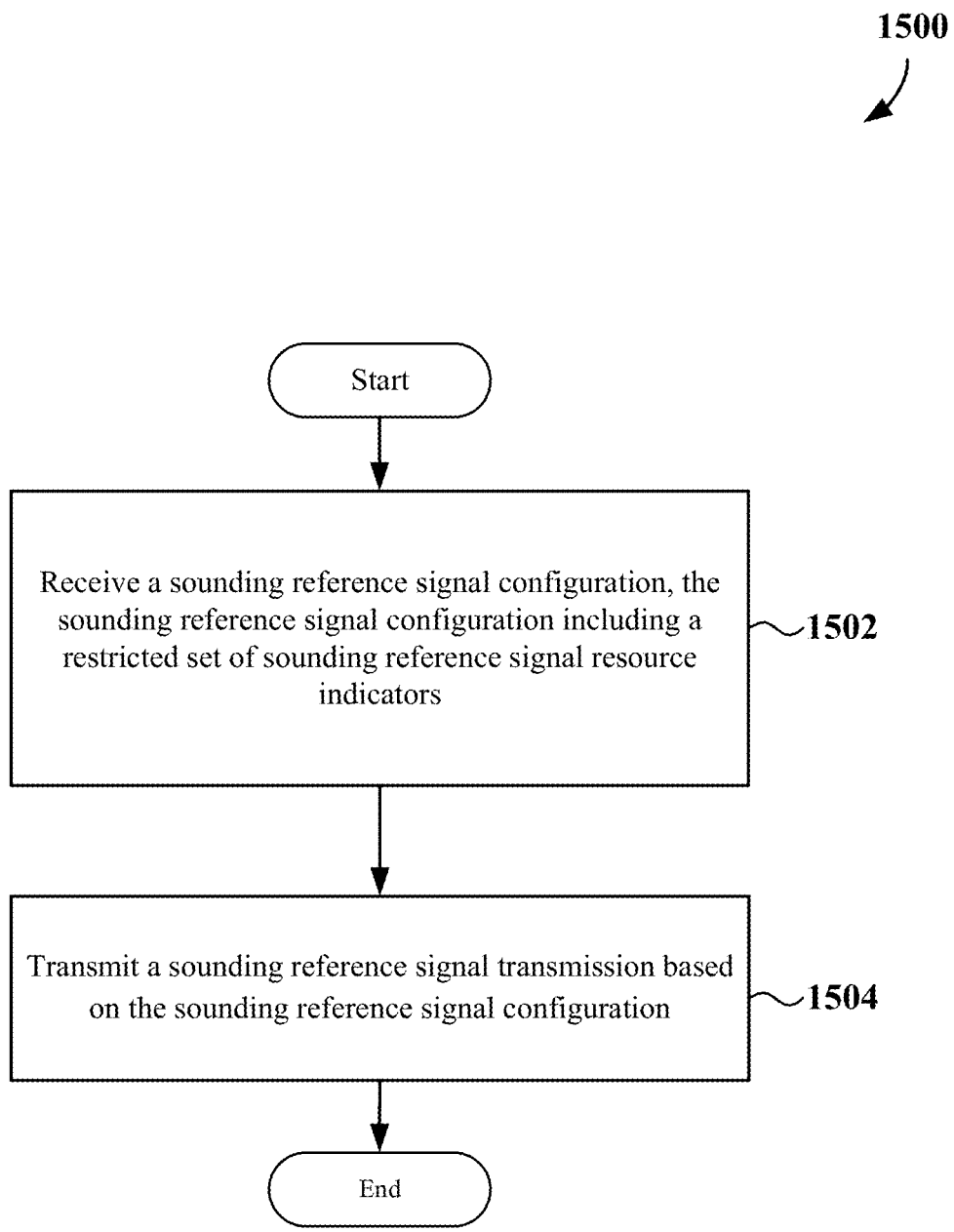
FIG. 15 is a flow chart illustrating an example wireless communication method for transmitting an SRS according to some aspects.

FIG. 15 is a flow chart illustrating an example method 1500 for a scheduled entity in accordance with some aspects of the present disclosure. As described below, some or all illustrated features may be omitted in a particular implementation within the scope of the present disclosure, and some illustrated features may not be required for implementation of all examples. In some examples, the method 1500 may be carried out by the scheduled entity 1100 illustrated in FIG. 11. In some examples, the method 1500 may be carried out by any suitable apparatus or means for carrying out the functions or algorithm described below.

At block 1502, a scheduled entity may receive a sounding reference signal configuration, the sounding reference signal configuration including a restricted set of sounding reference signal resource indicators. In some examples, the SRS configuration circuitry 1142 in cooperation with the communication and processing circuitry 1141 and the transceiver 1110, shown and described in FIG. 11, may provide a means to receive a sounding reference signal configuration.

At block 1504, the scheduled entity may transmit a sounding reference signal transmission based on the sounding reference signal configuration. In some examples, the SRS processing circuitry 1143 in cooperation with the communication and processing circuitry 1141 and the transceiver 1110, shown and described in FIG. 11, may provide a means to transmit a sounding reference signal transmission based on the sounding reference signal configuration.

In some examples, the restricted set of sounding reference signal resource indicators excludes sounding reference signal resource indicators for a designated antenna layer. In some examples, the restricted set of sounding reference signal resource indicators excludes sounding reference signal resource indicators for a range of antenna layers. In some examples, the restricted set of sounding reference signal resource indicators excludes a designated sounding reference signal resource indicator. In some examples, the restricted set of sounding reference signal resource indicators excludes a range of sounding reference signal resource indicators. In some examples, the restricted set of sounding reference signal resource indicators is designated for six (6) antenna ports. In some examples, the restricted set of sounding reference signal resource indicators is designated for eight (8) antenna ports.

In some examples, the scheduling entity may transmit a medium access control-control element (MAC-CE) that includes the sounding reference signal configuration.

In some examples, the restricted set of sounding reference signal resource indicators may include a first sounding reference signal resource indicator table. In some examples, the restricted set of sounding reference signal resource indicators may include a second sounding reference signal resource indicator table.

In some examples, the scheduled entity may receive an indication specifying that the scheduled entity is to use the first sounding reference signal resource indicator table or the second sounding reference signal resource indicator table for the sounding reference signal transmission. In some examples, the scheduled entity may receive a medium access control-control element (MAC-CE) that includes the indication.

In some examples, the first sounding reference signal resource indicator table is associated with a first set of restricted set of sounding reference signal resource indicators. In some examples, the second sounding reference signal resource indicator table is associated with a second set of restricted set of sounding reference signal resource indicators.

Figure 16:
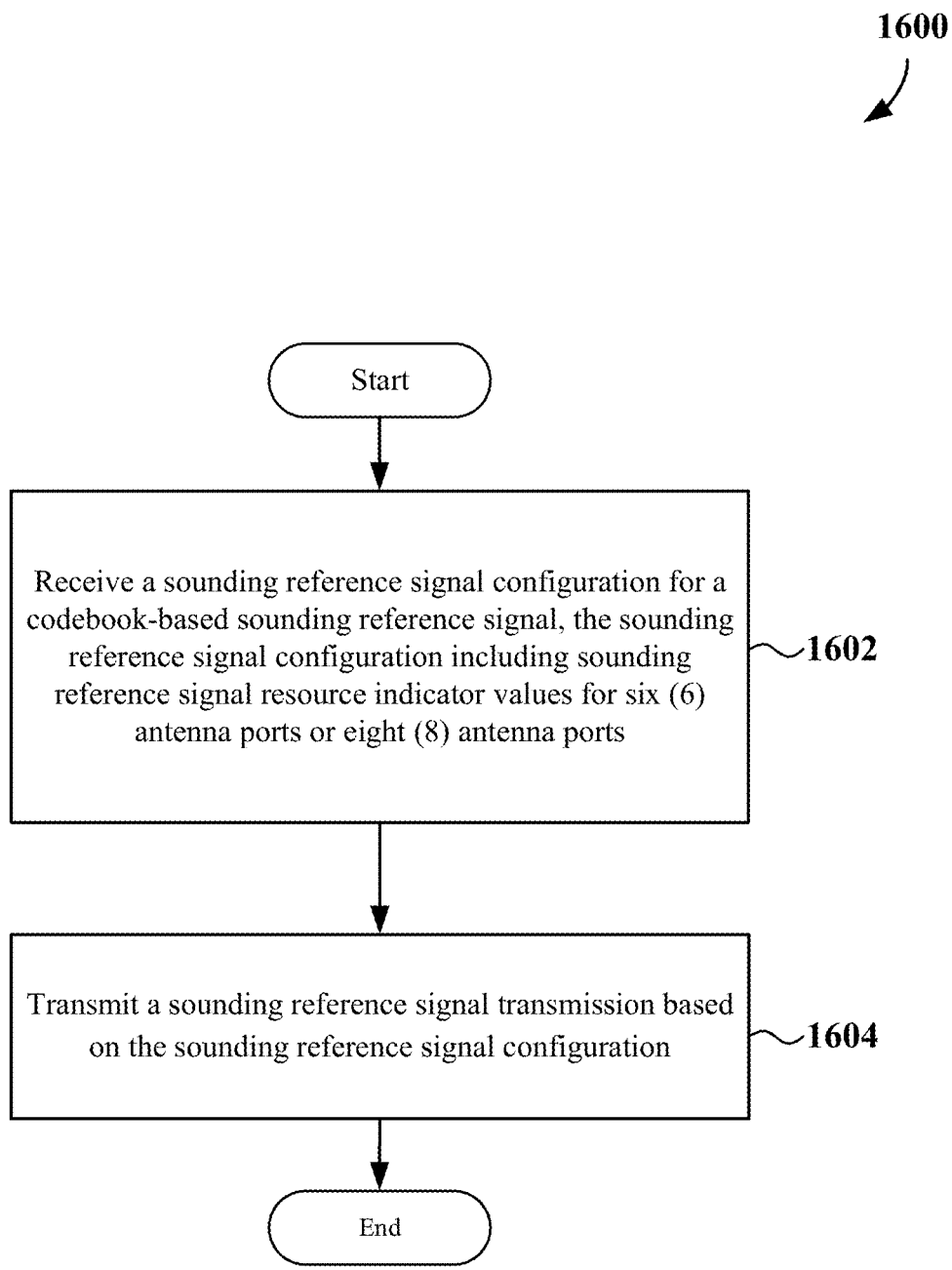
FIG. 16 is a flow chart illustrating an example wireless communication method for transmitting an SRS according to some aspects.

FIG. 16 is a flow chart illustrating an example method 1600 for a scheduled entity in accordance with some aspects of the present disclosure. As described below, some or all illustrated features may be omitted in a particular implementation within the scope of the present disclosure, and some illustrated features may not be required for implementation of all examples. In some examples, the method 1600 may be carried out by the scheduled entity 1100 illustrated in FIG. 11. In some examples, the method 1600 may be carried out by any suitable apparatus or means for carrying out the functions or algorithm described below.

At block 1602, a scheduled entity may receive a sounding reference signal configuration for a codebook-based sounding reference signal, the sounding reference signal configuration including sounding reference signal resource indicator values for six (6) antenna ports or eight (8) antenna ports. In some examples, the SRS configuration circuitry 1142 in cooperation with the communication and processing circuitry 1141 and the transceiver 1110, shown and described in FIG. 11, may provide a means to receive a sounding reference signal configuration.

At block 1604, the scheduled entity may transmit a sounding reference signal transmission based on the sounding reference signal configuration. In some examples, the SRS processing circuitry 1143 in cooperation with the communication and processing circuitry 1141 and the transceiver 1110, shown and described in FIG. 11, may provide a means to transmit a sounding reference signal transmission based on the sounding reference signal configuration.

In some examples, the sounding reference signal configuration specifies a maximum of six (6) sounding reference signal resource indicator values in a resource set for six (6) antenna ports. In some examples, the sounding reference signal configuration specifies a maximum of eight (8) sounding reference signal resource indicator values in a resource set for eight (8) antenna ports. In some examples, the sounding reference signal configuration specifies full power mode restrictions for six (6) antenna ports. In some examples, the sounding reference signal configuration specifies full power mode restrictions for eight (8) antenna ports.

In one configuration, the scheduled entity 1100 includes means for receiving a sounding reference signal configuration, the sounding reference signal configuration indicating whether the scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values, and means for transmitting the sounding reference signal transmission based on the sounding reference signal configuration. In one configuration, the scheduled entity 1100 includes means for receiving a sounding reference signal configuration, the sounding reference signal configuration including a restricted set of sounding reference signal resource indicators, and means for transmitting a sounding reference signal transmission based on the sounding reference signal configuration. In one aspect, the aforementioned means may be the processor 1104 shown in FIG. 11 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable medium 1106, or any other suitable apparatus or means described in any one or more of FIGS. 1, 2, 4, 8, and 10, and 11, and utilizing, for example, the methods and/or algorithms described herein in relation to FIGS. 12-16.

Figure 17:
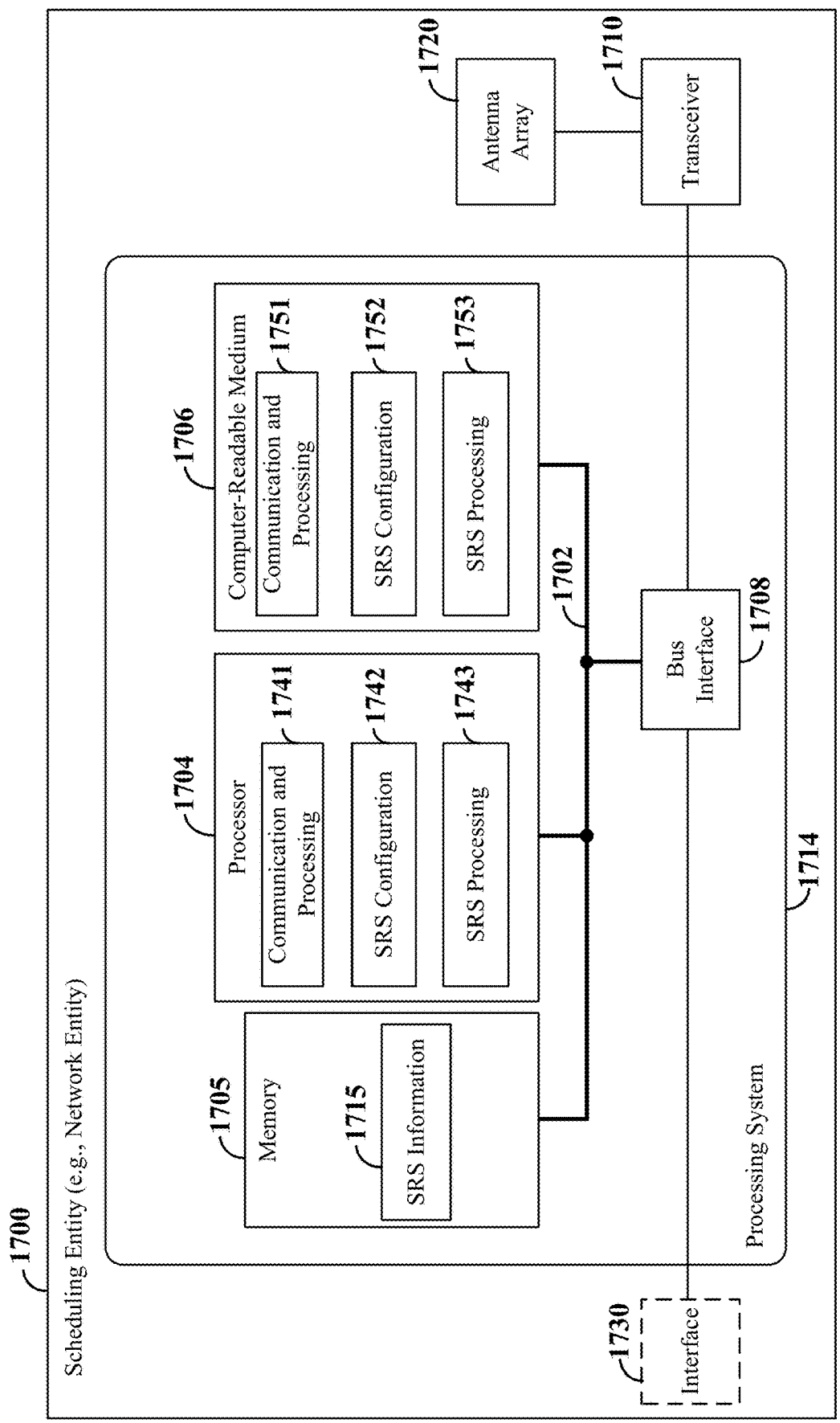
FIG. 17 is a block diagram conceptually illustrating an example of a hardware implementation for a scheduling entity employing a processing system according to some aspects.

FIG. 17 is a conceptual diagram illustrating an example of a hardware implementation for scheduling entity 1700 employing a processing system 1714. In some implementations, the scheduling entity 1700 may correspond to any of the network entities, base stations (e.g., gNBs), central units, distributed units, radio units, or scheduling entities (e.g., a sidelink scheduling UE) shown in any of FIGS. 1, 2, 4, 10, and 23.

In accordance with various aspects of the disclosure, an element, or any portion of an element, or any combination of elements may be implemented with the processing system 1714. The processing system may include one or more processors 1704. The processing system 1714 may be substantially the same as the processing system 1114 illustrated in FIG. 11, including a bus interface 1708, a bus 1702, memory 1705, a processor 1704, a computer-readable medium 1706, a transceiver 1710, and an antenna array 1720. The memory 1705 may store SRS information 1715 (e.g., table information) used by the processor 1704 in cooperation with the transceiver 1710 for the SRS-related operations described herein. Furthermore, the scheduling entity 1700 may include an interface 1730 (e.g., a network interface) that provides a means for communicating with at least one other apparatus within a core network and with at least one radio access network.

The scheduling entity 1700 may be configured to perform any one or more of the operations described herein (e.g., as described above in conjunction with FIGS. 1-10 and as described below in conjunction with FIGS. 18-22). In some aspects of the disclosure, the processor 1704, as utilized in the scheduling entity 1700, may include circuitry configured for various functions.

The processor 1704 may be configured to generate, schedule, and modify a resource assignment or grant of time-frequency resources (e.g., a set of one or more resource elements). For example, the processor 1704 may schedule time—frequency resources within a plurality of time division duplex (TDD) and/or frequency division duplex (FDD) subframes, slots, and/or mini-slots to carry user data traffic and/or control information to and/or from multiple scheduled entities. The processor 1704 may be configured to schedule resources for the transmission of downlink signals. The processor 1704 may further be configured to schedule resources for the transmission of uplink signals.

In some aspects of the disclosure, the processor 1704 may include communication and processing circuitry 1741. The communication and processing circuitry 1741 may be configured to communicate with a scheduled entity. The communication and processing circuitry 1741 may include one or more hardware components that provide the physical structure that performs various processes related to communication (e.g., signal reception and/or signal transmission) as described herein. The communication and processing circuitry 1741 may further include one or more hardware components that provide the physical structure that performs various processes related to signal processing (e.g., processing a received signal and/or processing a signal for transmission) as described herein. The communication and processing circuitry 1741 may further be configured to execute communication and processing software 1751 included on the computer-readable medium 1706 to implement one or more functions described herein.

The communication and processing circuitry 1741 may further be configured to receive an indication from the UE. For example, the indication may be included in a MAC-CE carried in a Uu PUSCH or a PSCCH, or included in a Uu RRC message or an SL RRC message, or included in a dedicated Uu PUCCH or PUSCH. The communication and processing circuitry 1741 may further be configured to receive a scheduling request from a UE for an uplink grant or a sidelink grant.

In some implementations wherein the communication involves receiving information, the communication and processing circuitry 1741 may obtain information from a component of the scheduling entity 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, other information, or any combination thereof. In some examples, the communication and processing circuitry 1741 may receive information via one or more channels. In some examples, the communication and processing circuitry 1741 may include functionality for a means for receiving. In some examples, the communication and processing circuitry 1741 may include functionality for a means for decoding.

In some implementations wherein the communication involves sending (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, other information, or any combination thereof. In some examples, the communication and processing circuitry 1741 may send information via one or more channels. In some examples, the communication and processing circuitry 1741 may include functionality for a means for sending (e.g., a means for transmitting). In some examples, the communication and processing circuitry 1741 may include functionality for a means for encoding.

The processor 1704 may include SRS configuration circuitry 1742 configured to perform SRS configuration-related operations as discussed herein (e.g., one or more of the operations described above in conjunction with FIGS. 7-10). The SRS configuration circuitry 1742 may be configured to execute SRS configuration software 1752 included on the computer-readable medium 1706 to implement one or more functions described herein.

The SRS configuration circuitry 1742 may include functionality for a means for defining an SRS configuration (e.g., as described above in conjunction with FIGS. 7-10). For example, the SRS configuration circuitry 1742 may specify that a UE is to use a particular SRS-related table (e.g., Table 1, Table 2, Table 7, Table 11, Table 12, Table 16, and so on).

The SRS configuration circuitry 1742 may include functionality for a means for transmitting an SRS configuration (e.g., as described above in conjunction with FIGS. 7-10). For example, the SRS configuration circuitry 1742 together with the communication and processing circuitry 1741 and the transceiver 1710 may transmit an RRC message that includes the SRS configuration on a PDSCH.

The SRS configuration circuitry 1742 may include functionality for a means for transmitting an indication (e.g., as described above in conjunction with FIGS. 7-10). For example, the SRS configuration circuitry 1742 together with the communication and processing circuitry 1741 and the transceiver 1710 may transmit a MAC-CE including an indication specifying an SRS resource indicator table that a scheduled entity is to use.

The processor 1704 may include SRS processing circuitry 1743 configured to perform SRS processing-related operations as discussed herein (e.g., one or more of the operations described above in conjunction with FIGS. 7-10). The SRS processing circuitry 1743 may be configured to execute SRS processing software 1753 included on the computer-readable medium 1706 to implement one or more functions described herein.

The SRS processing circuitry 1743 may include functionality for a means for receiving an SRS (e.g., as described above in conjunction with FIGS. 7-10). In some examples, the SRS processing circuitry 1744 may monitor SRS resources (e.g., uplink resources or sidelink resources) allocated for an SRS. The SRS processing circuitry 1744 may then decode the energy received on those resources to recover the SRS.

The SRS processing circuitry 1743 may include functionality for a means for generating a channel estimate based on a SRS. For example, the SRS processing circuitry 1743 may compare the received SRS with the known original SRS transmitted by the UE. The SRS processing circuitry 1743 may then generate a channel estimate based on any differences between the received SRS and the known original SRS. In some examples, the SRS processing circuitry 1743 may generate a channel estimate, determine a position of a device, estimate cross-link interference, or perform some other SRS-based operation.

Figure 18:
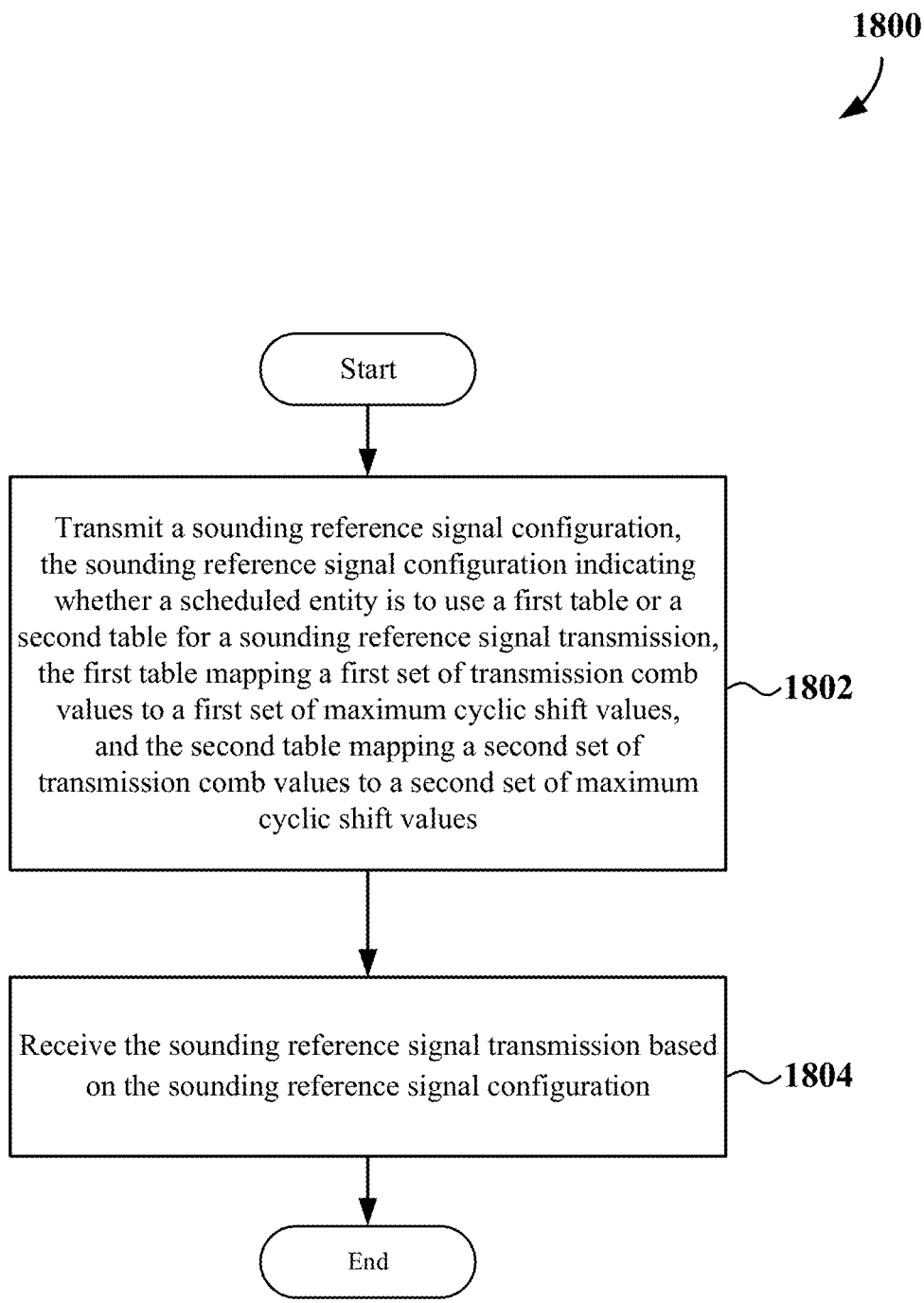
FIG. 18 is a flow chart illustrating an example wireless communication method for configuring an SRS according to some aspects.

FIG. 18 is a flow chart illustrating an example method 1800 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1800 may be carried out by the scheduling entity 1700 illustrated in FIG. 17. In some examples, the method 1800 may be carried out by any suitable apparatus or means for carrying out the functions or algorithm described below.

At block 1802, a scheduling entity may transmit a sounding reference signal configuration, the sounding reference signal configuration indicating whether a scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values. In some examples, the SRS configuration circuitry 1742 in cooperation with the communication and processing circuitry 1741 and the transceiver 1710, shown and described in FIG. 17, may provide a means to transmit a sounding reference signal configuration.

At block 1804, the scheduling entity may receive the sounding reference signal transmission based on the sounding reference signal configuration. In some examples, the SRS processing circuitry 1743 in cooperation with the communication and processing circuitry 1741 and the transceiver 1710, shown and described in FIG. 17, may provide a means to receive the sounding reference signal transmission based on the sounding reference signal configuration.

In some examples, the first table is associated with a first quantity of antenna ports. In some examples, the second table is associated with a second quantity of antenna ports that is different from the first quantity of antenna ports. In some examples, the second quantity of antenna ports is three (3), six (6), or eight (8).

In some examples, the scheduling entity may select the first table for the sounding reference signal transmission based on whether the scheduled entity is to use a first quantity of antenna ports for the sounding reference signal transmission. In some examples, the scheduling entity may select the second table for the sounding reference signal transmission based on whether the scheduled entity is to use a second quantity of antenna ports for the sounding reference signal transmission.

In some examples, the scheduling entity may receive the sounding reference signal transmission via a quantity of antenna ports. In some examples, each maximum cyclic shift value in the second table is an integer multiple of the quantity of antenna ports. In some examples, the sounding reference signal configuration may include an indication of the quantity of antenna ports.

In some examples, the scheduling entity may receive the sounding reference signal transmission via three (3) antenna port signals code division multiplexed on at least one sounding reference signal transmission comb resource. In some examples, the scheduling entity may receive the sounding reference signal transmission via six (6) antenna port signals code division multiplexed on at least one sounding reference signal transmission comb resource. In some examples, the scheduling entity may receive the sounding reference signal transmission via eight (8) antenna port signals code division multiplexed on at least one sounding reference signal transmission comb resource.

In some examples, the sounding reference signal configuration indicates whether a scheduled entity is to code division multiplex three (3), six (6), or eight (8) antenna port signals on at least one sounding reference signal transmission comb resource. In some examples, the sounding reference signal configuration indicates one sounding reference signal resource of a plurality of sounding reference signal resources that is mapped to a first antenna port. In some examples, the sounding reference signal configuration may include a restricted set of sounding reference signal resource indicators. In some examples, the sounding reference signal configuration is for a codebook-based sounding reference signal and may include sounding reference signal resource indicator values for six (6) antenna ports or eight (8) antenna ports.

Figure 19:
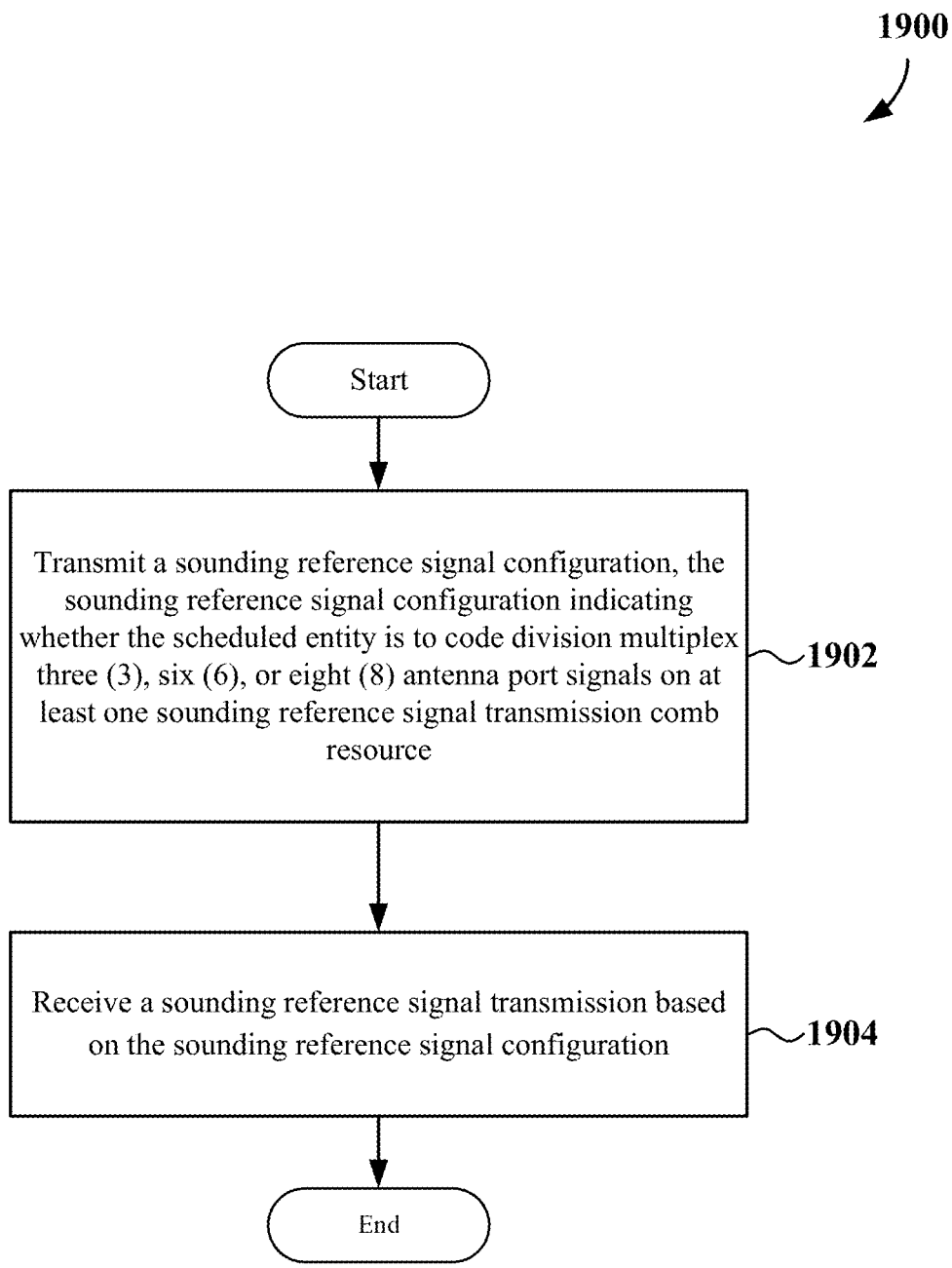
FIG. 19 is a flow chart illustrating an example wireless communication method for configuring an SRS according to some aspects.

FIG. 19 is a flow chart illustrating an example method 1900 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1900 may be carried out by the scheduling entity 1700 illustrated in FIG. 17. In some examples, the method 1900 may be carried out by any suitable apparatus or means for carrying out the functions or algorithm described below.

At block 1902, a scheduling entity may transmit a sounding reference signal configuration, the sounding reference signal configuration indicating whether the scheduled entity is to code division multiplex three (3), six (6), or eight (8) antenna port signals on at least one sounding reference signal transmission comb resource. In some examples, the SRS configuration circuitry 1742 in cooperation with the communication and processing circuitry 1741 and the transceiver 1710, shown and described in FIG. 17, may provide a means to transmit a sounding reference signal configuration.

At block 1904, the scheduling entity may receive a sounding reference signal transmission based on the sounding reference signal configuration. In some examples, the SRS processing circuitry 1743 in cooperation with the communication and processing circuitry 1741 and the transceiver 1710, shown and described in FIG. 17, may provide a means to receive a sounding reference signal transmission based on the sounding reference signal configuration.

In some examples, the scheduling entity may receive the sounding reference signal transmission via three (3) antenna port signals, the three (3) antenna port signals being code division multiplexed on one sounding reference signal transmission comb resource.

In some examples, the scheduling entity may receive the sounding reference signal transmission via three (3) antenna port signals, a first antenna port signal of the three (3) antenna port signals being transmitted on a first sounding reference signal transmission comb resource, and a second antenna port signal and a third antenna port signal of the three (3) antenna port signals being code division multiplexed on a second sounding reference signal transmission comb resource.

In some examples, the scheduling entity may receive the sounding reference signal transmission via six (6) antenna port signals, at least a first two of the six (6) antenna port signals being code division multiplexed on a first sounding reference signal transmission comb resource and at least a second two of the six (6) antenna port signals being code division multiplexed on a second sounding reference signal transmission comb resource.

In some examples, the scheduling entity may receive the sounding reference signal transmission via eight (8) antenna port signals, at least a first two of the eight (8) antenna port signals being code division multiplexed on a first sounding reference signal transmission comb resource and at least a second two of the eight (8) antenna port signals being code division multiplexed on a second sounding reference signal transmission comb resource.

In some examples, the scheduling entity may receive the sounding reference signal transmission via six (6) antenna port signals, at least a first two of the six (6) antenna port signals being transmitted via a first antenna panel and at least a second two of the six (6) antenna port signals being transmitted via a second antenna panel.

In some examples, the scheduling entity may receive the sounding reference signal transmission via eight (8) antenna port signals, at least a first two of the eight (8) antenna port signals being transmitted via a first antenna panel and at least a second two of the eight (8) antenna port signals being transmitted via a second antenna panel.

Figure 20:
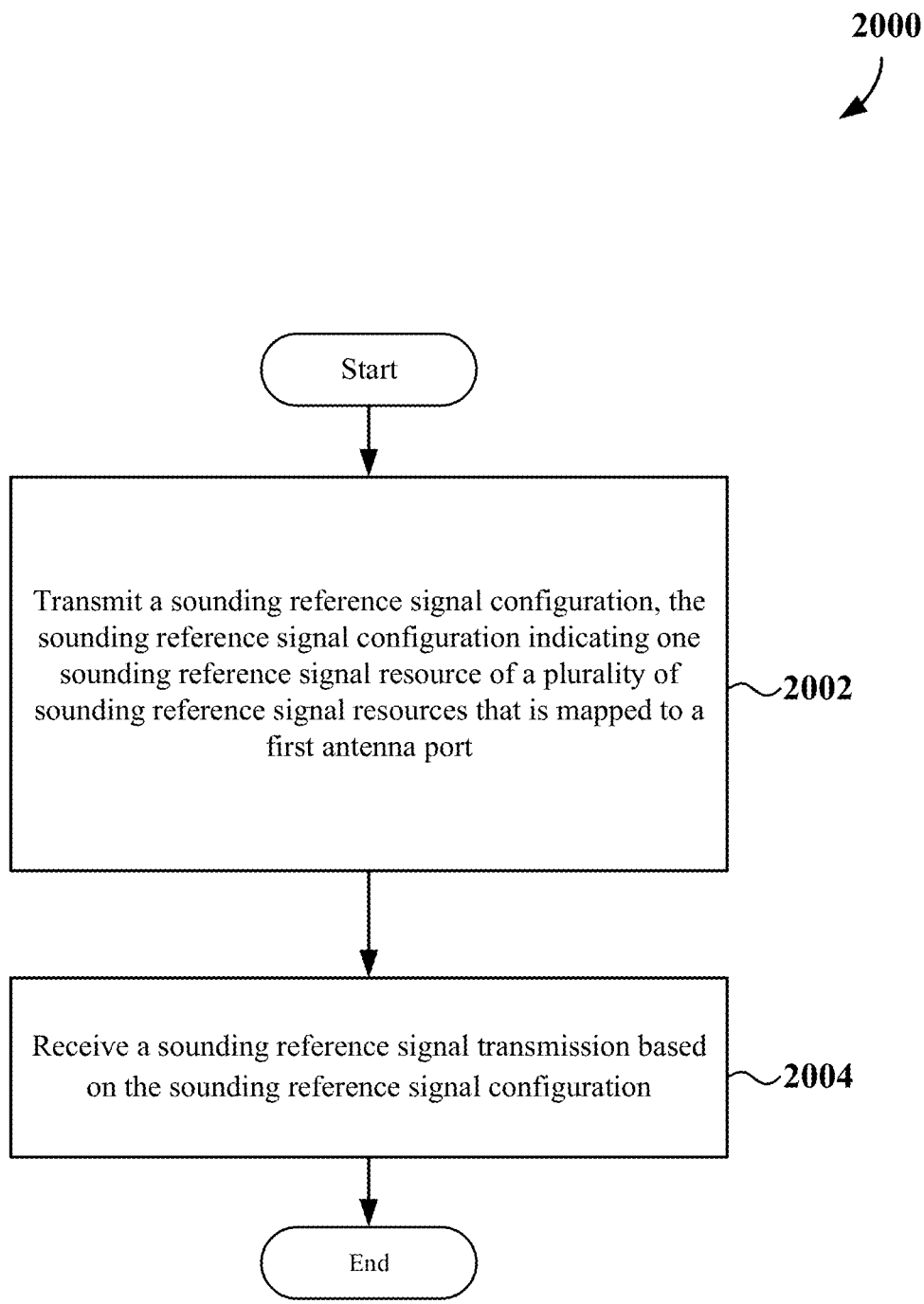
FIG. 20 is a flow chart illustrating an example wireless communication method for configuring an SRS according to some aspects.

FIG. 20 is a flow chart illustrating an example method 2000 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 2000 may be carried out by the scheduling entity 1700 illustrated in FIG. 17. In some examples, the method 2000 may be carried out by any suitable apparatus or means for carrying out the functions or algorithm described below.

At block 2002, a scheduling entity may transmit a sounding reference signal configuration, the sounding reference signal configuration indicating one sounding reference signal resource of a plurality of sounding reference signal resources that is mapped to a first antenna port. In some examples, the SRS configuration circuitry 1742 in cooperation with the communication and processing circuitry 1741 and the transceiver 1710, shown and described in FIG. 17, may provide a means to transmit a sounding reference signal configuration.

At block 2004, the scheduling entity may receive a sounding reference signal transmission based on the sounding reference signal configuration. In some examples, the SRS processing circuitry 1743 in cooperation with the communication and processing circuitry 1741 and the transceiver 1710, shown and described in FIG. 17, may provide a means to receive a sounding reference signal transmission based on the sounding reference signal configuration.

In some examples, the sounding reference signal configuration may include a first bit map indicating a first set of candidate sounding reference signal resources for the first antenna port, the plurality of sounding reference signal resources including the first set of candidate sounding reference signal resources.

In some examples, the sounding reference signal configuration may include a second bit map indicating a second set of candidate sounding reference signal resources for a second antenna port, the plurality of sounding reference signal resources including the second set of candidate sounding reference signal resources.

In some examples, the sounding reference signal configuration may include a first bit map indicating three (3), six (6), or eight (8) candidate sounding reference signal resources for a first port. In some examples, the sounding reference signal configuration may include a second bit map indicating three (3), six (6), or eight (8) candidate sounding reference signal resources for a second port.

Figure 21:
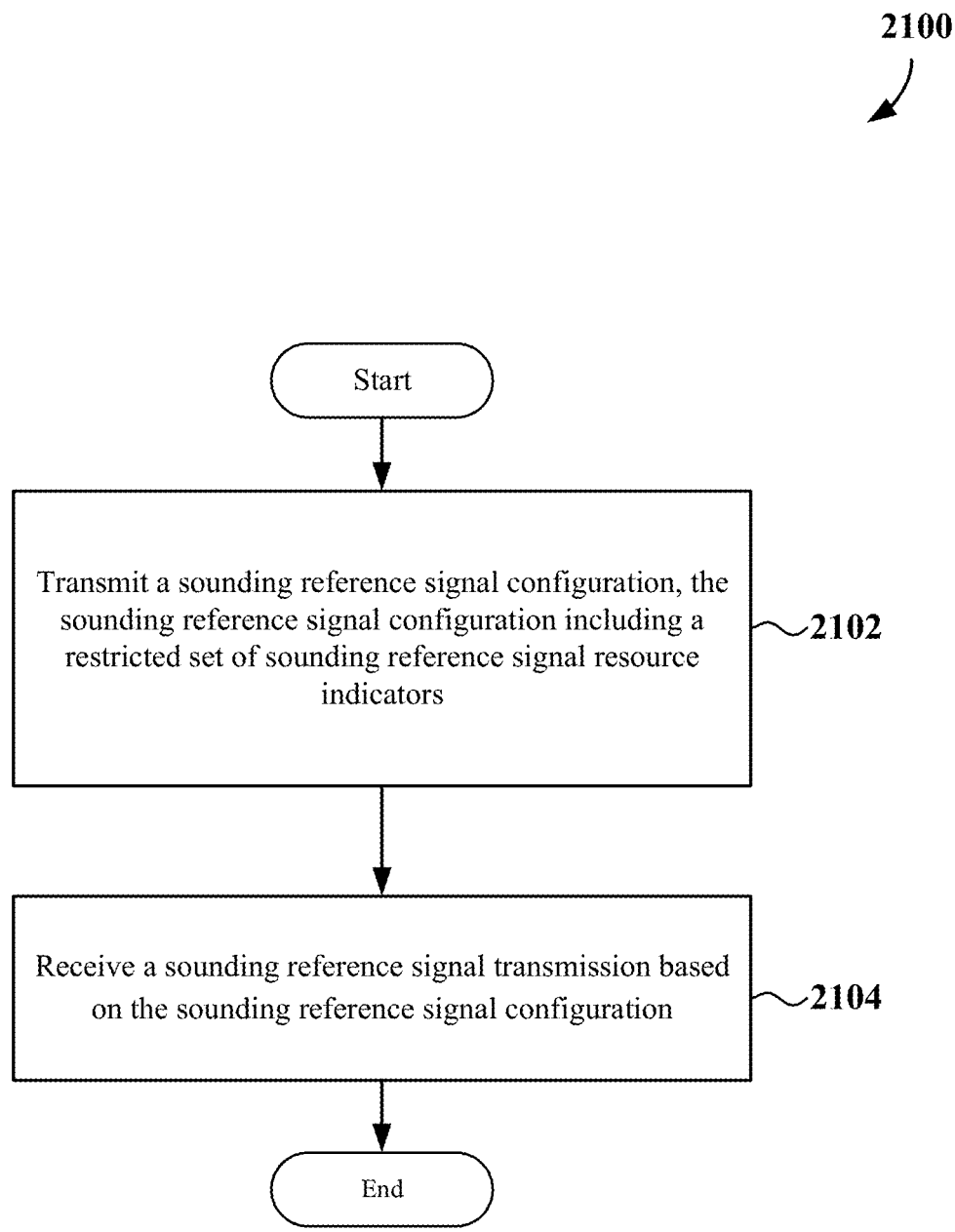
FIG. 21 is a flow chart illustrating an example wireless communication method for configuring an SRS according to some aspects.

FIG. 21 is a flow chart illustrating an example method 2100 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 2100 may be carried out by the scheduling entity 1700 illustrated in FIG. 17. In some examples, the method 2100 may be carried out by any suitable apparatus or means for carrying out the functions or algorithm described below.

At block 2102, a scheduling entity may transmit a sounding reference signal configuration, the sounding reference signal configuration including a restricted set of sounding reference signal resource indicators. In some examples, the SRS configuration circuitry 1742 in cooperation with the communication and processing circuitry 1741 and the transceiver 1710, shown and described in FIG. 17, may provide a means to transmit a sounding reference signal configuration.

At block 2104, the scheduling entity may receive a sounding reference signal transmission based on the sounding reference signal configuration. In some examples, the SRS processing circuitry 1743 in cooperation with the communication and processing circuitry 1741 and the transceiver 1710, shown and described in FIG. 17, may provide a means to receive a sounding reference signal transmission based on the sounding reference signal configuration.

In some examples, the restricted set of sounding reference signal resource indicators excludes sounding reference signal resource indicators for a designated antenna layer. In some examples, the restricted set of sounding reference signal resource indicators excludes sounding reference signal resource indicators for a range of antenna layers. In some examples, the restricted set of sounding reference signal resource indicators excludes a designated sounding reference signal resource indicator. In some examples, the restricted set of sounding reference signal resource indicators excludes a range of sounding reference signal resource indicators. In some examples, the restricted set of sounding reference signal resource indicators is designated for six (6) antenna ports. In some examples, the restricted set of sounding reference signal resource indicators is designated for eight (8) antenna ports.

In some examples, the scheduling entity may transmit a medium access control-control element (MAC-CE) that includes the sounding reference signal configuration.

In some examples, the restricted set of sounding reference signal resource indicators may include a first sounding reference signal resource indicator table. In some examples, the restricted set of sounding reference signal resource indicators may include a second sounding reference signal resource indicator table.

In some examples, the scheduling entity may transmit an indication specifying that the scheduled entity is to use the first table or the second table for the sounding reference signal transmission. In some examples, the scheduling entity may transmit a medium access control-control element (MAC-CE) that includes the indication.

In some examples, the first sounding reference signal resource indicator table is associated with a first set of restricted set of sounding reference signal resource indicators. In some examples, the second sounding reference signal resource indicator table is associated with a second set of restricted set of sounding reference signal resource indicators.

Figure 22:
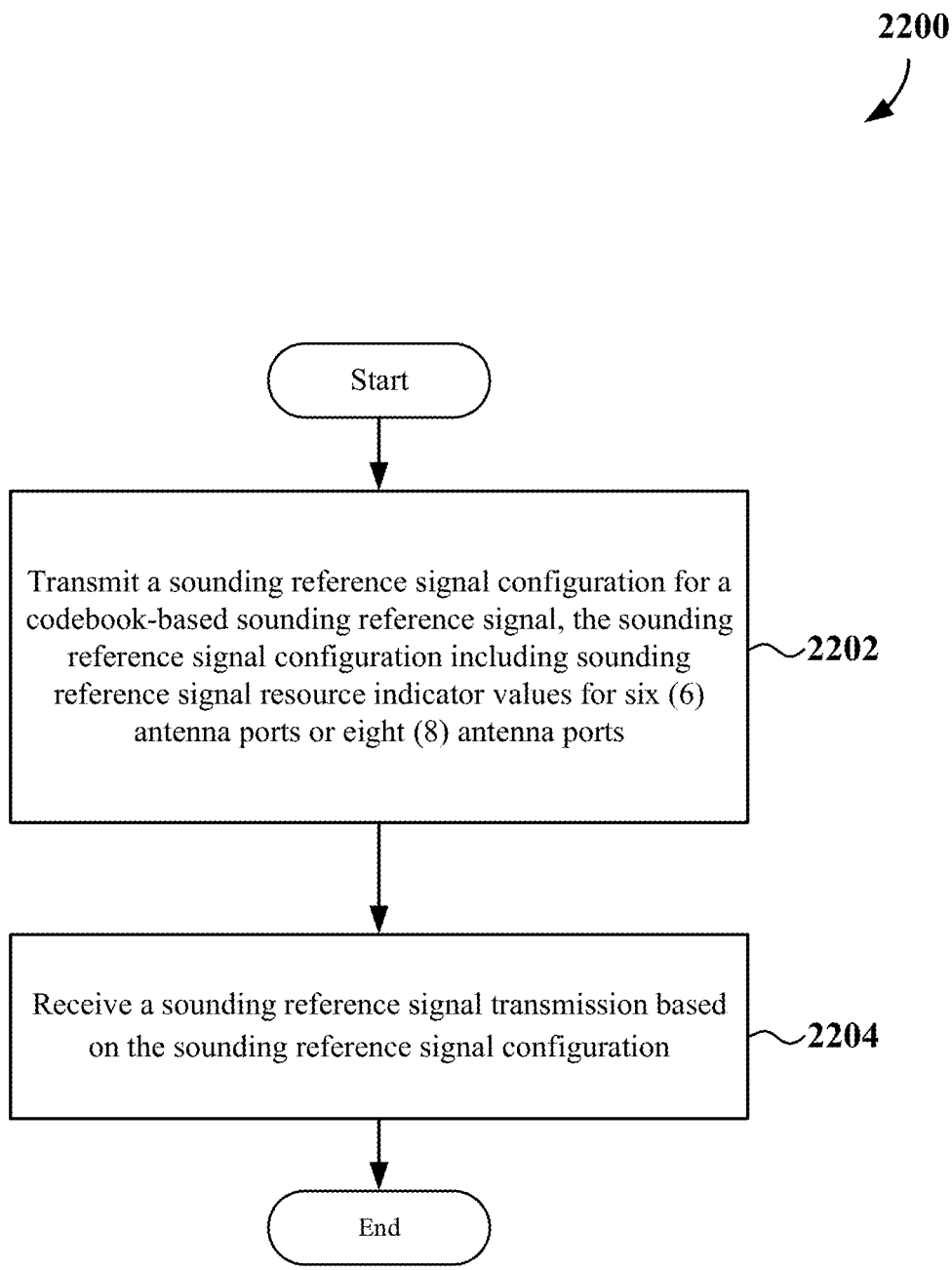
FIG. 22 is a flow chart illustrating an example wireless communication method for configuring an SRS according to some aspects.

FIG. 22 is a flow chart illustrating an example method 2200 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 2200 may be carried out by the scheduling entity 1700 illustrated in FIG. 17. In some examples, the method 2200 may be carried out by any suitable apparatus or means for carrying out the functions or algorithm described below.

At block 2202, a scheduling entity may transmit a sounding reference signal configuration for a codebook-based sounding reference signal, the sounding reference signal configuration including sounding reference signal resource indicator values for six (6) antenna ports or eight (8) antenna ports. In some examples, the SRS configuration circuitry 1742 in cooperation with the communication and processing circuitry 1741 and the transceiver 1710, shown and described in FIG. 17, may provide a means to transmit a sounding reference signal configuration.

At block 2204, the scheduling entity may receive a sounding reference signal transmission based on the sounding reference signal configuration. In some examples, the SRS processing circuitry 1743 in cooperation with the communication and processing circuitry 1741 and the transceiver 1710, shown and described in FIG. 17, may provide a means to receive a sounding reference signal transmission based on the sounding reference signal configuration.

In some examples, the sounding reference signal configuration specifies a maximum of six (6) sounding reference signal resource indicator values in a resource set for six (6) antenna ports. In some examples, the sounding reference signal configuration specifies a maximum of eight (8) sounding reference signal resource indicator values in a resource set for eight (8) antenna ports. In some examples, the sounding reference signal configuration specifies full power mode restrictions for six (6) antenna ports. In some examples, the sounding reference signal configuration specifies full power mode restrictions for eight (8) antenna ports.

In one configuration, the scheduling entity 1700 includes means for transmitting a sounding reference signal configuration, the sounding reference signal configuration indicating whether a scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values, and means for receiving the sounding reference signal transmission based on the sounding reference signal configuration. In one configuration, the scheduling entity 1700 includes means for transmitting a sounding reference signal configuration, the sounding reference signal configuration including a restricted set of sounding reference signal resource indicators, and means for receiving a sounding reference signal transmission based on the sounding reference signal configuration. In one aspect, the aforementioned means may be the processor 1704 shown in FIG. 17 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1704 is merely provided as an example, and other means for carrying out the described functions may be included within various aspects of the present disclosure, including but not limited to the instructions stored in the computer-readable medium 1706, or any other suitable apparatus or means described in any one or more of FIGS. 1, 2, 4, 10, and 17, and utilizing, for example, the methods and/or algorithms described herein in relation to FIGS. 18-22.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, the DUs, and the RUs also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 23:
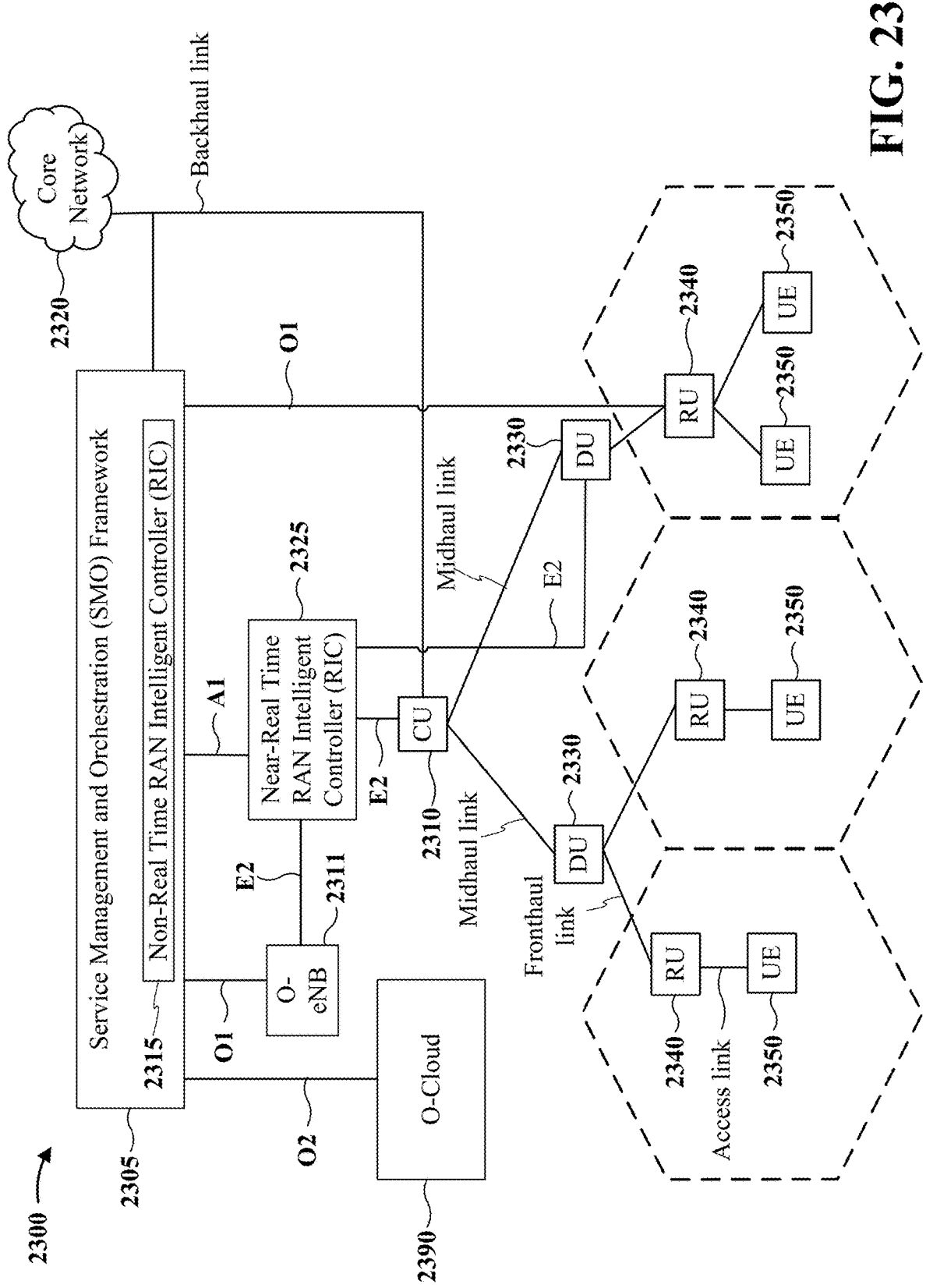
FIG. 23 is a diagram providing a high-level illustration of one example of a configuration of a disaggregated base station according to some aspects.

FIG. 23 shows a diagram illustrating an example disaggregated base station 2300 architecture. The disaggregated base station 2300 architecture may include one or more central units (CUs) 2310 that can communicate directly with a core network 2320 via a backhaul link, or indirectly with the core network 2320 through one or more disaggregated base station units (such as a Near-Real Time (Near-RT) RAN Intelligent Controller (RIC) 2325 via an E2 link, or a Non-Real Time (Non-RT) RIC 2315 associated with a Service Management and Orchestration (SMO) Framework 2305, or both). A CU 2310 may communicate with one or more distributed units (DUs) 2330 via respective midhaul links, such as an F1 interface. The DUs 2330 may communicate with one or more radio units (RUs) 2340 via respective fronthaul links. The RUs 2340 may communicate with respective UEs 2350 via one or more radio frequency (RF) access links. In some implementations, the UE 2350 may be simultaneously served by multiple RUs 2340.

Each of the units, i.e., the CUs 2310, the DUs 2330, the RUs 2340, as well as the Near-RT RICs 2325, the Non-RT RICs 2315 and the SMO Framework 2305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 2310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2310. The CU 2310 may be configured to handle user plane functionality (i.e., Central Unit-User Plane (CU-UP)), control plane functionality (i.e., Central Unit-Control Plane (CU-CP)), or a combination thereof. In some implementations, the CU 2310 can be logically split into one or more CU-UP units and one or more CU-CP units. The CU-UP unit can communicate bidirectionally with the CU-CP unit via an interface, such as the E1 interface when implemented in an O-RAN configuration. The CU 2310 can be implemented to communicate with the distributed unit (DU) 2330, as necessary, for network control and signaling.

The DU 2330 may correspond to a logical unit that includes one or more base station functions to control the operation of one or more RUs 2340. In some aspects, the DU 2330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 2330 may further host one or more low PHY layers. Each layer (or module) can be implemented with an interface configured to communicate signals with other layers (and modules) hosted by the DU 2330, or with the control functions hosted by the CU 2310.

Lower-layer functionality can be implemented by one or more RUs 2340. In some deployments, an RU 2340, controlled by a DU 2330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2340 can be implemented to handle over the air (OTA) communication with one or more UEs 2350. In some implementations, real-time and non-real-time aspects of control and user plane communication with the RU(s) 2340 can be controlled by the corresponding DU 2330. In some scenarios, this configuration can enable the DU(s) 2330 and the CU 2310 to be implemented in a cloud-based RAN architecture, such as a vRAN architecture.

The SMO Framework 2305 may be configured to support RAN deployment and provisioning of non-virtualized and virtualized network elements. For non-virtualized network elements, the SMO Framework 2305 may be configured to support the deployment of dedicated physical resources for RAN coverage requirements which may be managed via an operations and maintenance interface (such as an O1 interface). For virtualized network elements, the SMO Framework 2305 may be configured to interact with a cloud computing platform (such as an open cloud (O-Cloud) 2390) to perform network element life cycle management (such as to instantiate virtualized network elements) via a cloud computing platform interface (such as an O2 interface). Such virtualized network elements can include, but are not limited to, CUs 2310, DUs 2330, RUs 2340 and Near-RT RICs 2325. In some implementations, the SMO Framework 2305 can communicate with a hardware aspect of a 4G RAN, such as an open eNB (O-eNB) 2311, via an O1 interface. Additionally, in some implementations, the SMO Framework 2305 can communicate directly with one or more RUs 2340 via an O1 interface. The SMO Framework 2305 also may include a Non-RT RIC 2315 configured to support functionality of the SMO Framework 2305.

The Non-RT RIC 2315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2325. The Non-RT RIC 2315 may be coupled to or communicate with (such as via an A1 interface) the Near-RT RIC 2325. The Near-RT RIC 2325 may be configured to include a logical function that enables near-real-time control and optimization of RAN elements and resources via data collection and actions over an interface (such as via an E2 interface) connecting one or more CUs 2310, one or more DUs 2330, or both, as well as an O-eNB, with the Near-RT RIC 2325.

In some implementations, to generate AI/ML models to be deployed in the Near-RT RIC 2325, the Non-RT RIC 2315 may receive parameters or external enrichment information from external servers. Such information may be utilized by the Near-RT RIC 2325 and may be received at the SMO Framework 2305 or the Non-RT RIC 2315 from non-network data sources or from network functions. In some examples, the Non-RT RIC 2315 or the Near-RT RIC 2325 may be configured to tune RAN behavior or performance. For example, the Non-RT RIC 2315 may monitor long-term trends and patterns for performance and employ AI/ML models to perform corrective actions through the SMO Framework 2305 (such as reconfiguration via 01) or via creation of RAN management policies (such as A1 policies).

Referring again to FIG. 17, in some examples, the scheduling entity 1700 shown and described above in connection with FIG. 17 may be a disaggregated base station. For example, the scheduling entity 1700 shown in FIG. 17 may include the CU and optionally one or more DUs/RUs of the disaggregated base station. Other DUs/RUs associated with the scheduling entity 1700 may be distributed throughout the network. In some examples, the DUs/RUs may correspond to TRPs associated with the network entity. In some examples, the CU and/or DU/RU of the disaggregated base station (e.g., within the scheduling entity 1700) may generate an SRS configuration and provide the SRS configuration to a user equipment.

The methods shown in FIGS. 12-16 and 18-22 may include additional aspects, such as any single aspect or any combination of aspects described below and/or in connection with one or more other processes described elsewhere herein. The following provides an overview of several aspects of the present disclosure.

Aspect 1: A method for wireless communication at a scheduled entity, the method including: receiving a sounding reference signal configuration, the sounding reference signal configuration indicating whether the scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values; and transmitting the sounding reference signal transmission based on the sounding reference signal configuration.

Aspect 2: The method of aspect 1, wherein: the first table is associated with a first quantity of antenna ports; and the second table is associated with a second quantity of antenna ports that is different from the first quantity of antenna ports.

Aspect 3: The method of aspect 2, wherein the second quantity of antenna ports is three (3), six (6), or eight (8).

Aspect 4: The method of any of aspects 1 through 3, wherein: the method further comprises transmitting the sounding reference signal transmission via a quantity of antenna ports; and each maximum cyclic shift value in the second table is an integer multiple of the quantity of antenna ports.

Aspect 5: The method of aspect 4, wherein the sounding reference signal configuration comprises an indication of the quantity of antenna ports.

Aspect 6: The method of any of aspects 1 through 5, further comprising: transmitting the sounding reference signal transmission via three (3) antenna port signals code division multiplexed on at least one sounding reference signal transmission comb resource.

Aspect 7: The method of any of aspects 1 through 5, further comprising: transmitting the sounding reference signal transmission via six (6) antenna port signals code division multiplexed on at least one sounding reference signal transmission comb resource.

Aspect 8: The method of any of aspects 1 through 5, further comprising: transmitting the sounding reference signal transmission via eight (8) antenna port signals code division multiplexed on at least one sounding reference signal transmission comb resource.

Aspect 9: The method of any of aspects 1 through 5, wherein the sounding reference signal configuration indicates whether the scheduled entity is to code division multiplex three (3), six (6), or eight (8) antenna port signals on at least one sounding reference signal transmission comb resource.

Aspect 10: The method of any of aspects 1 through 9, wherein the sounding reference signal configuration indicates one sounding reference signal resource of a plurality of sounding reference signal resources that is mapped to a first antenna port.

Aspect 11: The method of any of aspects 1 through 10, wherein the sounding reference signal configuration comprises a restricted set of sounding reference signal resource indicators.

Aspect 12: The method of any of aspects 1 through 5, wherein the sounding reference signal configuration is for a codebook-based sounding reference signal and comprises sounding reference signal resource indicator values for six (6) antenna ports or eight (8) antenna ports.

Aspect 14: A method for wireless communication at a scheduling entity, the method comprising: transmitting a sounding reference signal configuration, the sounding reference signal configuration indicating whether a scheduled entity is to use a first table or a second table for a sounding reference signal transmission, the first table mapping a first set of transmission comb values to a first set of maximum cyclic shift values, and the second table mapping a second set of transmission comb values to a second set of maximum cyclic shift values; and receiving the sounding reference signal transmission based on the sounding reference signal configuration.

Aspect 15: The method of aspect 14, further comprising: selecting the first table for the sounding reference signal transmission based on whether the scheduled entity is to use a first quantity of antenna ports for the sounding reference signal transmission; or selecting the second table for the sounding reference signal transmission based on whether the scheduled entity is to use a second quantity of antenna ports for the sounding reference signal transmission.

Aspect 16: The method of aspect 15, wherein the second quantity of antenna ports is three (3) antenna ports, six (6) antenna ports, or eight (8) antenna ports.

Aspect 17: The method of any of aspects 14 through 16, wherein: the sounding reference signal configuration comprises an indication of a quantity of antenna ports that the scheduled entity is to use to transmit the sounding reference signal transmission; and each maximum cyclic shift value in the second table is an integer multiple of the quantity of antenna ports.

Aspect 18: The method of any of aspects 14 through 17, further comprising: transmitting the sounding reference signal transmission via three (3) antenna port signals code division multiplexed on at least one sounding reference signal transmission comb resource.

Aspect 19: The method of any of aspects 14 through 17, further comprising: transmitting the sounding reference signal transmission via six (6) antenna port signals code division multiplexed on at least one sounding reference signal transmission comb resource.

Aspect 20: The method of any of aspects 14 through 17, further comprising: transmitting the sounding reference signal transmission via eight (8) antenna port signals code division multiplexed on at least one sounding reference signal transmission comb resource.

Aspect 21: The method of any of aspects 14 through 17, wherein the sounding reference signal configuration indicates whether the scheduled entity is to code division multiplex three (3), six (6), or eight (8) antenna port signals on at least one sounding reference signal transmission comb resource.

Aspect 22: The method of any of aspects 14 through 21, wherein the sounding reference signal configuration indicates one sounding reference signal resource of a plurality of sounding reference signal resources that is mapped to a first antenna port.

Aspect 23: The method of any of aspects 14 through 22, wherein the sounding reference signal configuration comprises a restricted set of sounding reference signal resource indicators.

Aspect 24: The method of any of aspects 14 through 17, wherein the sounding reference signal configuration is for a codebook-based sounding reference signal and comprises sounding reference signal resource indicator values for six (6) antenna ports or eight (8) antenna ports.

Aspect 26: A method for wireless communication at a scheduled entity, the method comprising: receiving a sounding reference signal configuration, the sounding reference signal configuration indicating whether the scheduled entity is to code division multiplex three (3), six (6), or eight (8) antenna port signals on at least one sounding reference signal transmission comb resource; and transmitting a sounding reference signal transmission based on the sounding reference signal configuration.

Aspect 27: The method of aspect 26, wherein the transmitting the sounding reference signal transmission comprises: transmitting the sounding reference signal transmission via three (3) antenna port signals, the three (3) antenna port signals being code division multiplexed on one sounding reference signal transmission comb resource.

Aspect 28: The method of aspect 26, wherein the transmitting the sounding reference signal transmission comprises: transmitting the sounding reference signal transmission via three (3) antenna port signals, a first antenna port signal of the three (3) antenna port signals being transmitted on a first sounding reference signal transmission comb resource, and a second antenna port signal and a third antenna port signal of the three (3) antenna port signals being code division multiplexed on a second sounding reference signal transmission comb resource.

Aspect 29: The method of aspect 26, wherein the transmitting the sounding reference signal transmission comprises: transmitting the sounding reference signal transmission via six (6) antenna port signals, at least a first two of the six (6) antenna port signals being code division multiplexed on a first sounding reference signal transmission comb resource and at least a second two of the six (6) antenna port signals being code division multiplexed on a second sounding reference signal transmission comb resource.

Aspect 30: The method of aspect 26, wherein the transmitting the sounding reference signal transmission comprises: transmitting the sounding reference signal transmission via eight (8) antenna port signals, at least a first two of the eight (8) antenna port signals being code division multiplexed on a first sounding reference signal transmission comb resource and at least a second two of the eight (8) antenna port signals being code division multiplexed on a second sounding reference signal transmission comb resource.

Aspect 31: The method of aspect 26, wherein the transmitting the sounding reference signal transmission comprises: transmitting the sounding reference signal transmission via six (6) antenna port signals, at least a first two of the six (6) antenna port signals being transmitted via a first antenna panel and at least a second two of the six (6) antenna port signals being transmitted via a second antenna panel.

Aspect 32: The method of aspect 26, wherein the transmitting the sounding reference signal transmission comprises: transmitting the sounding reference signal transmission via eight (8) antenna port signals, at least a first two of the eight (8) antenna port signals being transmitted via a first antenna panel and at least a second two of the eight (8) antenna port signals being transmitted via a second antenna panel.

Aspect 34: A method for wireless communication at a scheduling entity, the method comprising: transmitting a sounding reference signal configuration, the sounding reference signal configuration indicating whether a scheduled entity is to code division multiplex three (3), six (6), or eight (8) antenna port signals on at least one sounding reference signal transmission comb resource; and receiving a sounding reference signal transmission based on the sounding reference signal configuration.

Aspect 35: The method of aspect 34, wherein the receiving the sounding reference signal transmission comprises: receiving the sounding reference signal transmission via three (3) antenna port signals, the three (3) antenna port signals being code division multiplexed on one sounding reference signal transmission comb resource.

Aspect 36: The method of aspect 34, wherein the receiving the sounding reference signal transmission comprises: receiving the sounding reference signal transmission via three (3) antenna port signals, a first antenna port signal of the three (3) antenna port signals being transmitted on a first sounding reference signal transmission comb resource, and a second antenna port signal and a third antenna port signal of the three (3) antenna port signals being code division multiplexed on a second sounding reference signal transmission comb resource.

Aspect 37: The method of aspect 34, wherein the receiving the sounding reference signal transmission comprises: receiving the sounding reference signal transmission via six (6) antenna port signals, at least a first two of the six (6) antenna port signals being code division multiplexed on a first sounding reference signal transmission comb resource and at least a second two of the six (6) antenna port signals being code division multiplexed on a second sounding reference signal transmission comb resource.

Aspect 38: The method of aspect 34, wherein the receiving the sounding reference signal transmission comprises: receiving the sounding reference signal transmission via eight (8) antenna port signals, at least a first two of the eight (8) antenna port signals being code division multiplexed on a first sounding reference signal transmission comb resource and at least a second two of the eight (8) antenna port signals being code division multiplexed on a second sounding reference signal transmission comb resource.

Aspect 39: The method of aspect 34, wherein the receiving the sounding reference signal transmission comprises: receiving the sounding reference signal transmission via six (6) antenna port signals, at least a first two of the six (6) antenna port signals being transmitted via a first antenna panel and at least a second two of the six (6) antenna port signals being transmitted via a second antenna panel.

Aspect 40: The method of aspect 34, wherein the receiving the sounding reference signal transmission comprises: receiving the sounding reference signal transmission via eight (8) antenna port signals, at least a first two of the eight (8) antenna port signals being transmitted via a first antenna panel and at least a second two of the eight (8) antenna port signals being transmitted via a second antenna panel.

Aspect 42: A method for wireless communication at a scheduled entity, the method comprising: receiving a sounding reference signal configuration, the sounding reference signal configuration indicating one sounding reference signal resource of a plurality of sounding reference signal resources that is mapped to a first antenna port; and transmitting a sounding reference signal transmission based on the sounding reference signal configuration.

Aspect 43: The method of aspect 42, wherein the sounding reference signal configuration comprises a first bit map indicating a first set of candidate sounding reference signal resources for the first antenna port, the plurality of sounding reference signal resources comprising the first set of candidate sounding reference signal resources.

Aspect 44: The method of aspect 43, wherein the sounding reference signal configuration comprises a second bit map indicating a second set of candidate sounding reference signal resources for a second antenna port, the plurality of sounding reference signal resources comprising the second set of candidate sounding reference signal resources.

Aspect 45: The method of any of aspects 42 through 44, wherein the sounding reference signal configuration comprises: a first bit map indicating three (3), six (6), or eight (8) candidate sounding reference signal resources for the first antenna port; and a second bit map indicating three (3), six (6), or eight (8) candidate sounding reference signal resources for a second antenna port.

Aspect 47: A method for wireless communication at a scheduling entity, the method comprising: transmitting a sounding reference signal configuration, the sounding reference signal configuration indicating one sounding reference signal resource of a plurality of sounding reference signal resources that is mapped to a first antenna port; and receiving a sounding reference signal transmission based on the sounding reference signal configuration.

Aspect 48: The method of aspect 47, wherein the sounding reference signal configuration comprises a first bit map indicating a first set of candidate sounding reference signal resources for the first antenna port, the plurality of sounding reference signal resources comprising the first set of candidate sounding reference signal resources.

Aspect 49: The method of aspect 48, wherein the sounding reference signal configuration comprises a second bit map indicating a second set of candidate sounding reference signal resources for a second antenna port, the plurality of sounding reference signal resources comprising the second set of candidate sounding reference signal resources.

Aspect 50: The method of any of aspects 47 through 49, wherein the sounding reference signal configuration comprises: a first bit map indicating three (3), six (6), or eight (8) candidate sounding reference signal resources for the first antenna port; and a second bit map indicating three (3), six (6), or eight (8) candidate sounding reference signal resources for a second antenna port.

Aspect 52: A method for wireless communication at a scheduled entity, the method comprising: receiving a sounding reference signal configuration, the sounding reference signal configuration comprising a restricted set of sounding reference signal resource indicators; and transmitting a sounding reference signal transmission based on the sounding reference signal configuration.

Aspect 53: The method of aspect 52, wherein the restricted set of sounding reference signal resource indicators excludes sounding reference signal resource indicators for a designated antenna layer.

Aspect 54: The method of any of aspects 52 through 53, wherein the restricted set of sounding reference signal resource indicators excludes sounding reference signal resource indicators for a range of antenna layers.

Aspect 55: The method of any of aspects 52 through 54, wherein the restricted set of sounding reference signal resource indicators excludes a designated sounding reference signal resource indicator.

Aspect 56: The method of any of aspects 52 through 55, wherein the restricted set of sounding reference signal resource indicators excludes a range of sounding reference signal resource indicators.

Aspect 57: The method of any of aspects 52 through 56, wherein the restricted set of sounding reference signal resource indicators is designated for six (6) antenna ports.

Aspect 58: The method of any of aspects 52 through 56, wherein the restricted set of sounding reference signal resource indicators is designated for eight (8) antenna ports.

Aspect 59: The method of any of aspects 52 through 58, wherein the receiving the sounding reference signal configuration comprises: receiving a medium access control-control element (MAC-CE) that includes the sounding reference signal configuration.

Aspect 60: The method of any of aspects 52 through 59, wherein the restricted set of sounding reference signal resource indicators comprises: a first sounding reference signal resource indicator table; and a second sounding reference signal resource indicator table.

Aspect 61: The method of aspect 60, further comprising: receiving an indication specifying that the scheduled entity is to use the first sounding reference signal resource indicator table or the second sounding reference signal resource indicator table for the sounding reference signal transmission.

Aspect 62: The method of aspect 61, wherein the receiving the indication comprises: receiving a medium access control-control element (MAC-CE) that includes the indication.

Aspect 63: The method of any of aspects 60 through 62, wherein: the first sounding reference signal resource indicator table is associated with a first set of restricted set of sounding reference signal resource indicators; and the second sounding reference signal resource indicator table is associated with a second set of restricted set of sounding reference signal resource indicators.

Aspect 65: A method for wireless communication at a scheduling entity, the method comprising: transmitting a sounding reference signal configuration, the sounding reference signal configuration comprising a restricted set of sounding reference signal resource indicators; and receiving a sounding reference signal transmission based on the sounding reference signal configuration.

Aspect 66: The method of aspect 65, wherein the restricted set of sounding reference signal resource indicators excludes sounding reference signal resource indicators for a designated antenna layer.

Aspect 67: The method of any of aspects 65 through 66, wherein the restricted set of sounding reference signal resource indicators excludes sounding reference signal resource indicators for a range of antenna layers.

Aspect 68: The method of any of aspects 65 through 67, wherein the restricted set of sounding reference signal resource indicators excludes a designated sounding reference signal resource indicator.

Aspect 69: The method of any of aspects 65 through 68, wherein the restricted set of sounding reference signal resource indicators excludes a range of sounding reference signal resource indicators.

Aspect 70: The method of any of aspects 65 through 69, wherein the restricted set of sounding reference signal resource indicators is designated for six (6) antenna ports.

Aspect 71: The method of any of aspects 65 through 69, wherein the restricted set of sounding reference signal resource indicators is designated for eight (8) antenna ports.

Aspect 72: The method of any of aspects 65 through 71, wherein the transmitting the sounding reference signal configuration comprises: transmitting a medium access control-control element (MAC-CE) that includes the sounding reference signal configuration.

Aspect 73: The method of any of aspects 65 through 72, wherein the restricted set of sounding reference signal resource indicators comprises: a first sounding reference signal resource indicator table; and a second sounding reference signal resource indicator table.

Aspect 74: The method of aspect 73, further comprising: transmitting an indication specifying that the scheduled entity is to use the first sounding reference signal resource indicator table or the second sounding reference signal resource indicator table for the sounding reference signal transmission.

Aspect 75: The method of aspect 74, wherein the transmitting the indication comprises: transmitting a medium access control-control element (MAC-CE) that includes the indication.

Aspect 76: The method of any of aspects 73 through 75, wherein: the first sounding reference signal resource indicator table is associated with a first set of restricted set of sounding reference signal resource indicators; and the second sounding reference signal resource indicator table is associated with a second set of restricted set of sounding reference signal resource indicators.

Aspect 78: A method for wireless communication at a scheduled entity, the method comprising: receiving a sounding reference signal configuration for a codebook-based sounding reference signal, the sounding reference signal configuration comprising sounding reference signal resource indicator values for six (6) antenna ports or eight (8) antenna ports; and transmitting a sounding reference signal transmission based on the sounding reference signal configuration.

Aspect 79: The method of aspect 78, wherein the sounding reference signal configuration specifies a maximum of six (6) sounding reference signal resource indicator values in a resource set for six (6) antenna ports.

Aspect 80: The method of any of aspects 78 through 79, wherein the sounding reference signal configuration specifies a maximum of eight (8) sounding reference signal resource indicator values in a resource set for eight (8) antenna ports.

Aspect 81: The method of any of aspects 78 through 80, wherein the sounding reference signal configuration specifies full power mode restrictions for six (6) antenna ports.

Aspect 82: The method of any of aspects 78 through 81, wherein the sounding reference signal configuration specifies full power mode restrictions for eight (8) antenna ports.

Aspect 84: A method for wireless communication at a scheduling entity, the method comprising: transmitting a sounding reference signal configuration for a codebook-based sounding reference signal, the sounding reference signal configuration comprising sounding reference signal resource indicator values for six (6) antenna ports or eight (8) antenna ports; and receiving a sounding reference signal transmission based on the sounding reference signal configuration.

Aspect 85: The method of aspect 84, wherein the sounding reference signal configuration specifies a maximum of six (6) sounding reference signal resource indicator values in a resource set for six (6) antenna ports.

Aspect 86: The method of any of aspects 84 through 85, wherein the sounding reference signal configuration specifies a maximum of eight (8) sounding reference signal resource indicator values in a resource set for eight (8) antenna ports.

Aspect 87: The method of any of aspects 84 through 86, wherein the sounding reference signal configuration specifies full power mode restrictions for six (6) antenna ports.

Aspect 88: The method of any of aspects 84 through 87, wherein the sounding reference signal configuration specifies full power mode restrictions for eight (8) antenna ports.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 8, 10, 11, 17, and 23 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
one or more memories that store processor-executable code; and
one or more processors configured to execute the processor-executable code and cause the user equipment to:
receive a sounding reference signal configuration, the sounding reference signal configuration indicating whether the user equipment is to use a first table or a second table for a sounding reference signal transmission, the first table mapping a first set of transmission comb values to a first set of maximum cyclic shift values, and the second table mapping a second set of transmission comb values to a second set of maximum cyclic shift values; and
transmit the sounding reference signal transmission based on the sounding reference signal configuration.

2. The user equipment of claim 1, wherein:
the first table is associated with a first quantity of antenna ports; and
the second table is associated with a second quantity of antenna ports that is different from the first quantity of antenna ports.

3. The user equipment of claim 2, wherein the second quantity of antenna ports is three, six, or eight.

4. The user equipment of claim 1, wherein:
the one or more processors are further configured to execute the processor-executable code and cause the user equipment to transmit the sounding reference signal transmission via a quantity of antenna ports; and
each maximum cyclic shift value in the second table is an integer multiple of the quantity of antenna ports.

5. The user equipment of claim 4, wherein the sounding reference signal configuration comprises an indication of the quantity of antenna ports.

6. The user equipment of claim 1, wherein the one or more processors are further configured to execute the processor-executable code and cause the user equipment to:
transmit the sounding reference signal transmission via three antenna port signals code division multiplexed on at least one sounding reference signal transmission comb resource.

7. The user equipment of claim 1, wherein the one or more processors are further configured to execute the processor-executable code and cause the user equipment to:
transmit the sounding reference signal transmission via six antenna port signals code division multiplexed on at least one sounding reference signal transmission comb resource.

8. The user equipment of claim 1, wherein the one or more processors are further configured to execute the processor-executable code and cause the user equipment to:
transmit the sounding reference signal transmission via eight antenna port signals code division multiplexed on at least one sounding reference signal transmission comb resource.

9. The user equipment of claim 1, wherein the sounding reference signal configuration indicates whether the user equipment is to code division multiplex three, six, or eight antenna port signals on at least one sounding reference signal transmission comb resource.

10. The user equipment of claim 1, wherein the sounding reference signal configuration indicates one sounding reference signal resource of a plurality of sounding reference signal resources that is mapped to a first antenna port.

11. The user equipment of claim 1, wherein the sounding reference signal configuration comprises a restricted set of sounding reference signal resource indicators.

12. The user equipment of claim 1, wherein the sounding reference signal configuration is for a codebook-based sounding reference signal and comprises sounding reference signal resource indicator values for six antenna ports or eight antenna ports.

13. A method for wireless communication at a user equipment, the method comprising:
- receiving a sounding reference signal configuration, the sounding reference signal configuration indicating whether the user equipment is to use a first table or a second table for a sounding reference signal transmission, the first table mapping a first set of transmission comb values to a first set of maximum cyclic shift values, and the second table mapping a second set of transmission comb values to a second set of maximum cyclic shift values; and
- transmitting the sounding reference signal transmission based on the sounding reference signal configuration.

14. The method of claim 13, wherein the transmitting the sounding reference signal transmission comprises:
- transmitting the sounding reference signal transmission via transmitting the sounding reference signal transmission via three, six, or eight antenna port signals code division multiplexed on at least one sounding reference signal transmission comb resource.

15. The method of claim 13, wherein:
- the transmitting the sounding reference signal transmission comprises transmitting the sounding reference signal transmission via a quantity of antenna ports; and
- each maximum cyclic shift value in the second table is an integer multiple of the quantity of antenna ports.

16. The method of claim 15, wherein the sounding reference signal configuration comprises an indication of the quantity of antenna ports.

17. The method of claim 13, wherein:
- the first table is associated with a first quantity of antenna ports; and
- the second table is associated with a second quantity of antenna ports that is different from the first quantity of antenna ports.

18. The method of claim 17, wherein the second quantity of antenna ports is three, six, or eight.

19. The method of claim 13, wherein the transmitting the sounding reference signal transmission comprises:
- transmitting the sounding reference signal transmission via three antenna port signals code division multiplexed on at least one sounding reference signal transmission comb resource.

20. The method of claim 13, wherein the transmitting the sounding reference signal transmission comprises:
- transmitting the sounding reference signal transmission via six antenna port signals code division multiplexed on at least one sounding reference signal transmission comb resource.

21. The method of claim 13, wherein the transmitting the sounding reference signal transmission comprises:
- transmitting the sounding reference signal transmission via eight antenna port signals code division multiplexed on at least one sounding reference signal transmission comb resource.

22. The method of claim 13, wherein the sounding reference signal configuration indicates whether the user equipment is to code division multiplex three, six, or eight antenna port signals on at least one sounding reference signal transmission comb resource.

23. The method of claim 13, wherein the sounding reference signal configuration indicates one sounding reference signal resource of a plurality of sounding reference signal resources that is mapped to a first antenna port.

24. The method of claim 13, wherein the sounding reference signal configuration comprises a restricted set of sounding reference signal resource indicators.

25. The method of claim 13, wherein the sounding reference signal configuration is for a codebook-based sounding reference signal and comprises sounding reference signal resource indicator values for six antenna ports or eight antenna ports.

26. A user equipment comprising:
- means for receiving a sounding reference signal configuration, the sounding reference signal configuration indicating whether the user equipment is to use a first table or a second table for a sounding reference signal transmission, the first table mapping a first set of transmission comb values to a first set of maximum cyclic shift values, and the second table mapping a second set of transmission comb values to a second set of maximum cyclic shift values; and
- means for transmitting the sounding reference signal transmission based on the sounding reference signal configuration.

* * * * *